(12) United States Patent
Boardman et al.

(10) Patent No.: US 10,186,049 B1
(45) Date of Patent: Jan. 22, 2019

(54) DETERMINING CHANGES IN OBJECT STRUCTURE OVER TIME USING MOBILE DEVICE IMAGES

(71) Applicant: URC Ventures, Inc., Redmonds, WA (US)

(72) Inventors: David Boardman, Redmond, WA (US); Brian Sanderson Clipp, Chappel Hill, NC (US); Charles Erignac, Kirkland, WA (US); Jan-Michael Frahm, Chapel Hill, NC (US); Jared Scott Heinly, Durham, NC (US); Anthony James Jacobson, Kirkland, WA (US); Srinivas Kapaganty, Suwanee, GA (US)

(73) Assignee: URC Ventures, Inc., Redmond, WA (US)

( * ) Notice: Subject to any disclaimer, the term of this patent is extended or adjusted under 35 U.S.C. 154(b) by 0 days.

(21) Appl. No.: 15/912,406

(22) Filed: Mar. 5, 2018

Related U.S. Application Data

(60) Provisional application No. 62/467,692, filed on Mar. 6, 2017.

(51) Int. Cl.
*G06K 9/00* (2006.01)
*G06T 7/62* (2017.01)
(Continued)

(52) U.S. Cl.
CPC ............ *G06T 7/62* (2017.01); *G06F 3/04842* (2013.01); *G06T 7/55* (2017.01); *G06T 7/75* (2017.01)

(58) Field of Classification Search
USPC ........................................................ 382/154
See application file for complete search history.

(56) References Cited

U.S. PATENT DOCUMENTS 5,831,621 A   11/1998   Pito
7,944,547 B2   5/2011   Wang
(Continued)

FOREIGN PATENT DOCUMENTS

WO   2012/061945 A1   5/2012

OTHER PUBLICATIONS

Koch, R., et al., "Realistic Surface Reconstruction of 3D Scenes from Uncalibrated Image Sequences," 2000, The Journal of Visualization and Computer Animation, 13 pages.
(Continued)

*Primary Examiner* — Alex Liew
(74) *Attorney, Agent, or Firm* — VLP Law Group LLP; James A. D. White

(57) ABSTRACT

Techniques are described for analyzing images acquired via mobile devices in various ways, including to estimate measurements for one or more attributes of one or more objects in the images, as well as determine changes over time in objects and their measurements based on images acquired at different times. For example, the described techniques may be used to measure the volume of a stockpile of material or other large object, based on images acquired via a mobile device that moves around some or all of the object. The calculation of object volume and/or other determined object information may include generating and manipulating one or more computer models of the object from selected images, and determining changes may include comparing different models for different times. In addition, further automated activities may include displaying, presenting or otherwise providing information about some or all of the determined information.

28 Claims, 40 Drawing Sheets
(23 of 40 Drawing Sheet(s) Filed in Color)

(51) Int. Cl.
*G06T 7/55* (2017.01)
*G06F 3/0484* (2013.01)
*G06T 7/73* (2017.01)

(56) References Cited

U.S. PATENT DOCUMENTS

| | | | |
|---|---|---|---|
| 8,384,714 | B2 | 2/2013 | De Aguiar et al. |
| 8,594,375 | B1* | 11/2013 | Padwick .............. G06K 9/0063 |
| | | | 382/103 |
| 2002/0145607 | A1 | 10/2002 | Dimsdale |
| 2002/0180865 | A1 | 12/2002 | Lee et al. |
| 2002/0190982 | A1 | 12/2002 | Kotcheff et al. |
| 2003/0218607 | A1 | 11/2003 | Baumberg |
| 2007/0132874 | A1 | 6/2007 | Forman et al. |
| 2007/0263907 | A1 | 11/2007 | McMakin et al. |
| 2008/0031512 | A1 | 2/2008 | Mundermann et al. |
| 2008/0100622 | A1 | 5/2008 | Gordon |
| 2008/0180448 | A1 | 7/2008 | Anguelov et al. |
| 2010/0074483 | A1* | 3/2010 | Janes .................... A61B 6/481 |
| | | | 382/128 |
| 2011/0221936 | A1 | 9/2011 | Steinberg et al. |
| 2012/0044247 | A1 | 2/2012 | Naimark |
| 2012/0133665 | A1 | 5/2012 | Wexler et al. |
| 2012/0321171 | A1* | 12/2012 | Ito ....................... H04N 13/0011 |
| | | | 382/154 |
| 2013/0002832 | A1 | 1/2013 | Lasenby et al. |
| 2013/0048722 | A1 | 2/2013 | Davis et al. |
| 2013/0060540 | A1 | 3/2013 | Frahm et al. |
| 2013/0294667 | A1* | 11/2013 | Zheng .................. G06T 7/0012 |
| | | | 382/131 |
| 2014/0049535 | A1 | 2/2014 | Wang et al. |
| 2014/0270480 | A1 | 9/2014 | Boardman et al. |
| 2015/0262359 | A1* | 9/2015 | Fujiwara ............... G06T 7/0016 |
| | | | 382/132 |

OTHER PUBLICATIONS

Lynx a Camera by Lynx Laboratories—Kickstarter, retrieved on Mar. 13, 2013, from http://www.kickstarter.com/projects/915328712/lynx-a-camera, 16 pages.

Lynx Laboratories, retrieved on Mar. 13, 2013, from http://lynxlaboratories.com/object.php, 4 pages.

Lynx Laboratories, retrieved on Mar. 13, 2013, from http://lynxlaboratories.com/aboutLunxA.php, 2 pages.

Niem, W., et al., "Automatic Reconstruction of 3D Objects Using a Mobile Monoscopic Camera," 1997, IEEE, 8 pages.

* cited by examiner

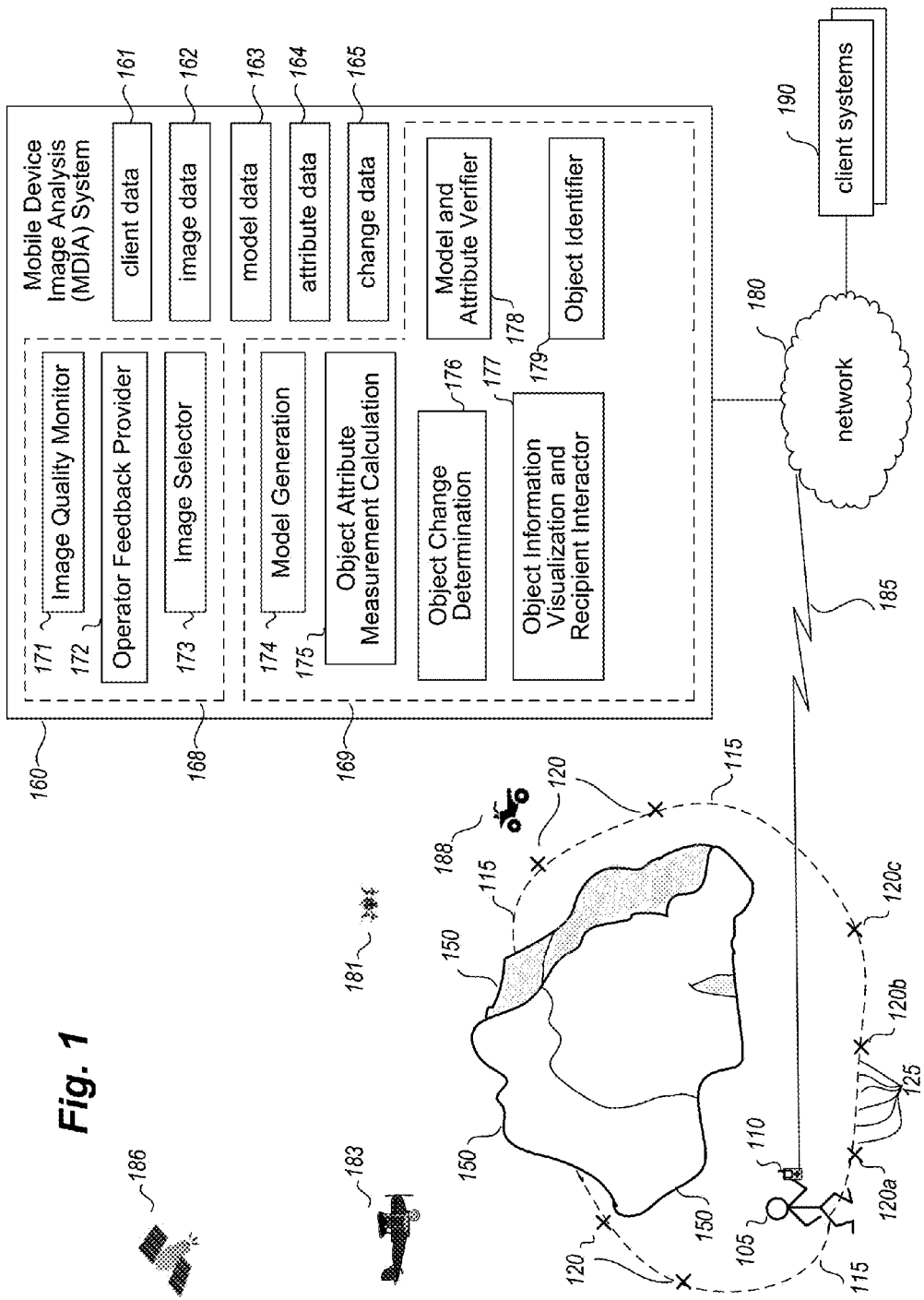

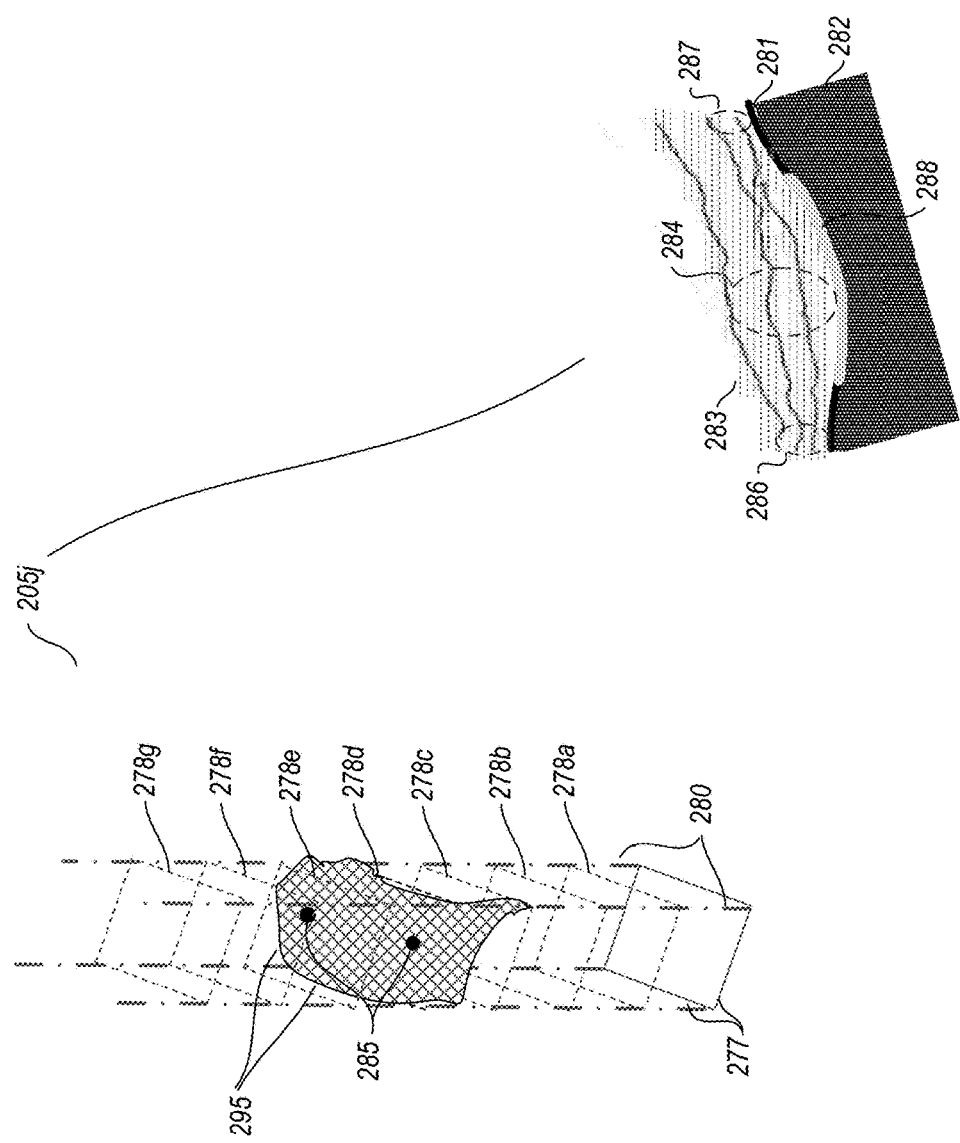

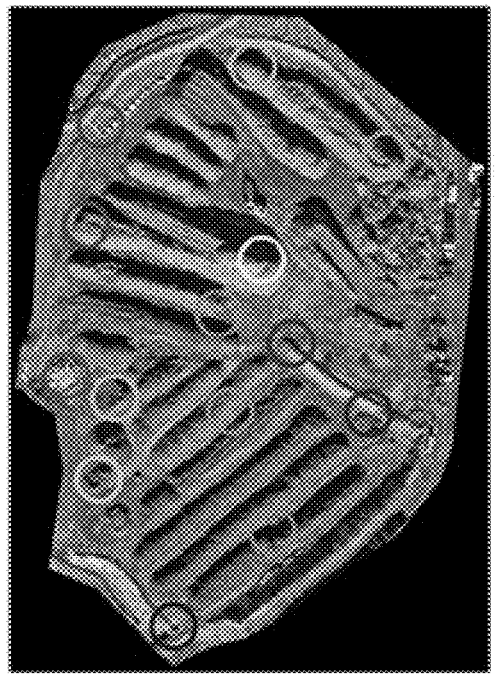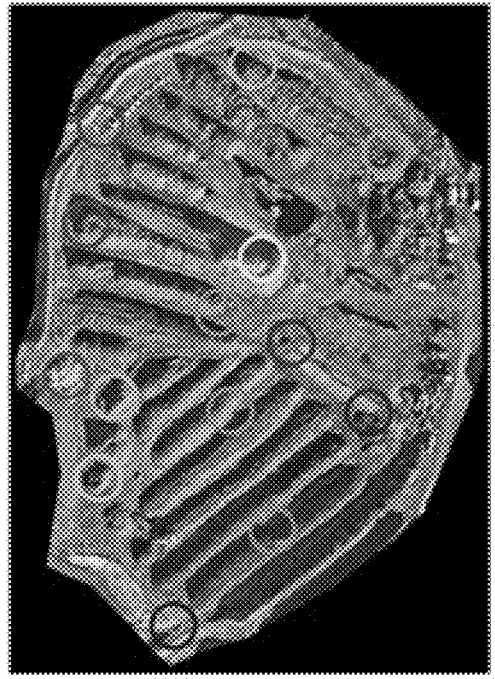
Fig. 10F

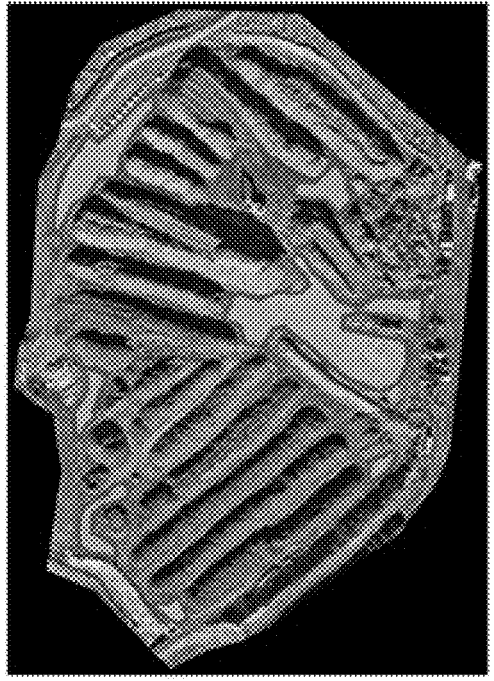
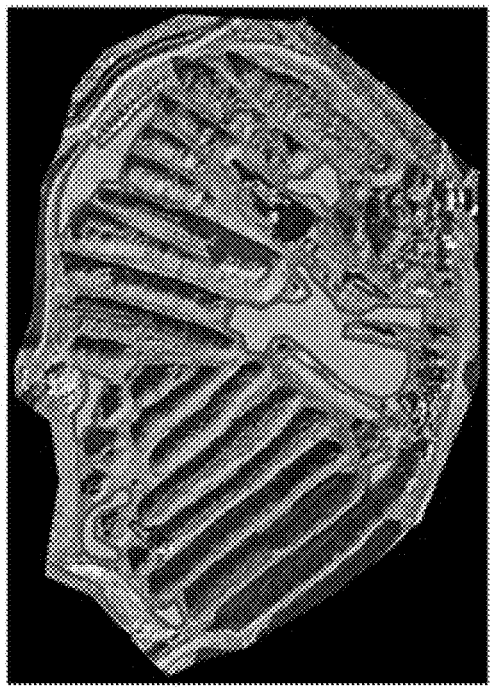
Fig. 10G

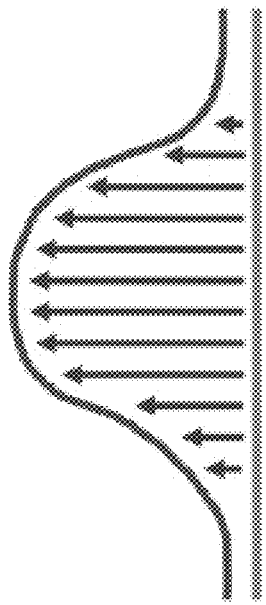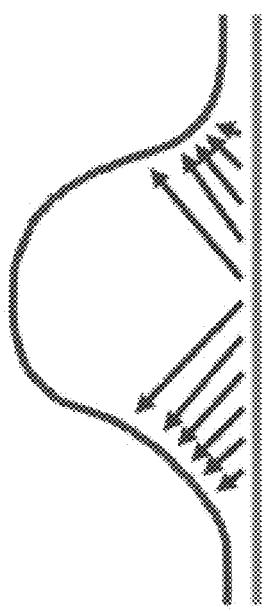
Fig. 10I

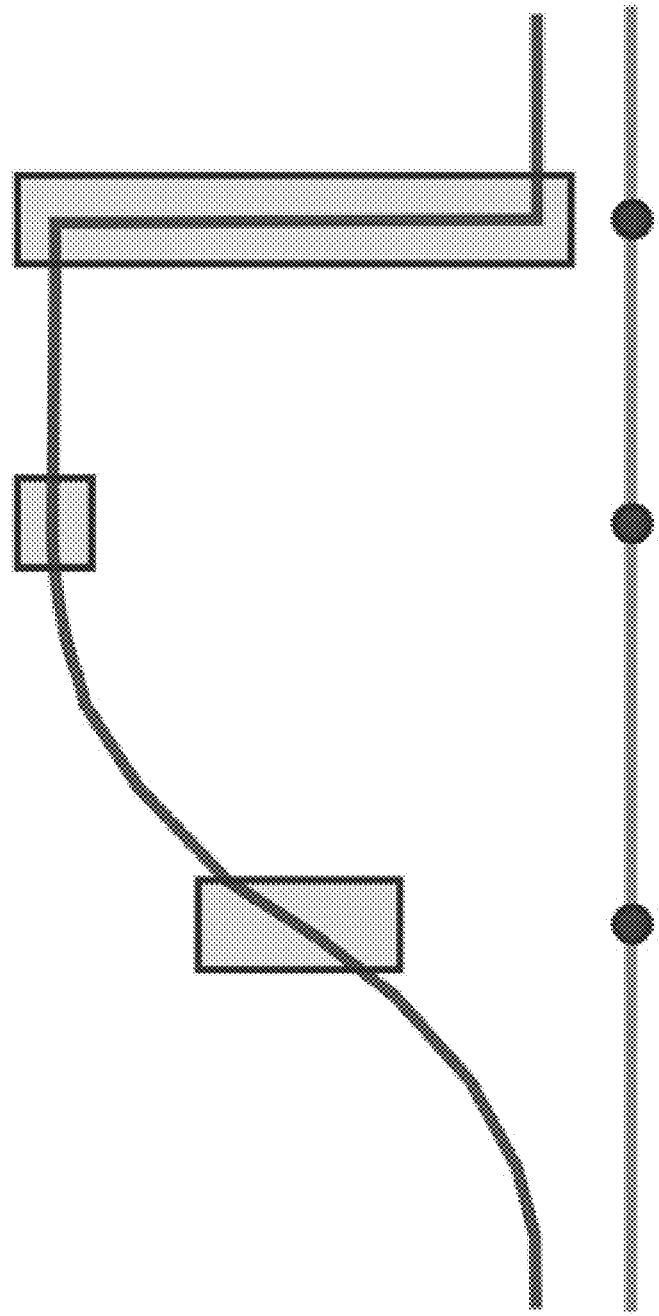

DETERMINING CHANGES IN OBJECT STRUCTURE OVER TIME USING MOBILE DEVICE IMAGES

CROSS-REFERENCE TO RELATED APPLICATIONS

This application claims the benefit of U.S. Provisional Patent Application No. 62/467,692, filed Mar. 6, 2017 and entitled "Determining Changes In Object Measurements Over Time Using Mobile Device Images," which is hereby incorporated by reference in its entirety.

TECHNICAL FIELD

The following disclosure relates generally to techniques for analyzing images acquired via mobile devices, such as to assess volume or other attributes of an object included in the images, and to automated determination of changes in such attributes over time using images acquired at different times.

BACKGROUND

A variety of techniques exist to identify and measure attributes of physical objects from locations separate from those objects, including for man-made and naturally occurring objects in outdoors environments. Such identification and measurement techniques may, for example, use various types of specialized measurement equipment (e.g., theodolites, rangefinders, radar, lidar, sonar, 3D scanners, etc.). However, such techniques have various problems, including that the specialized measurement equipment may be expensive and/or difficult to use, and that some types of object attributes are difficult to measure.

Portable electronics equipment is becoming increasingly inexpensive and includes increasingly advanced technology, including for many consumer electronics devices. However, such devices do not typically include specialized or dedicated measurement equipment to identify and measure various attributes of physical objects.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 is a network diagram illustrating an example embodiment of using described techniques to acquire images of an object via a mobile device and to analyze the acquired images to assess volume and/or other attributes of the object.

FIGS. 2A-2J illustrate examples of acquiring images of an object via a mobile device, selecting acquired images to further use, analyzing the acquired images to assess measurements of volume and/or other attributes of the object, and performing further automated verification of such attribute measurements.

FIGS. 10A to 10J illustrate examples of determining and tracking information about changing object measurements over time.

Figure 11E:
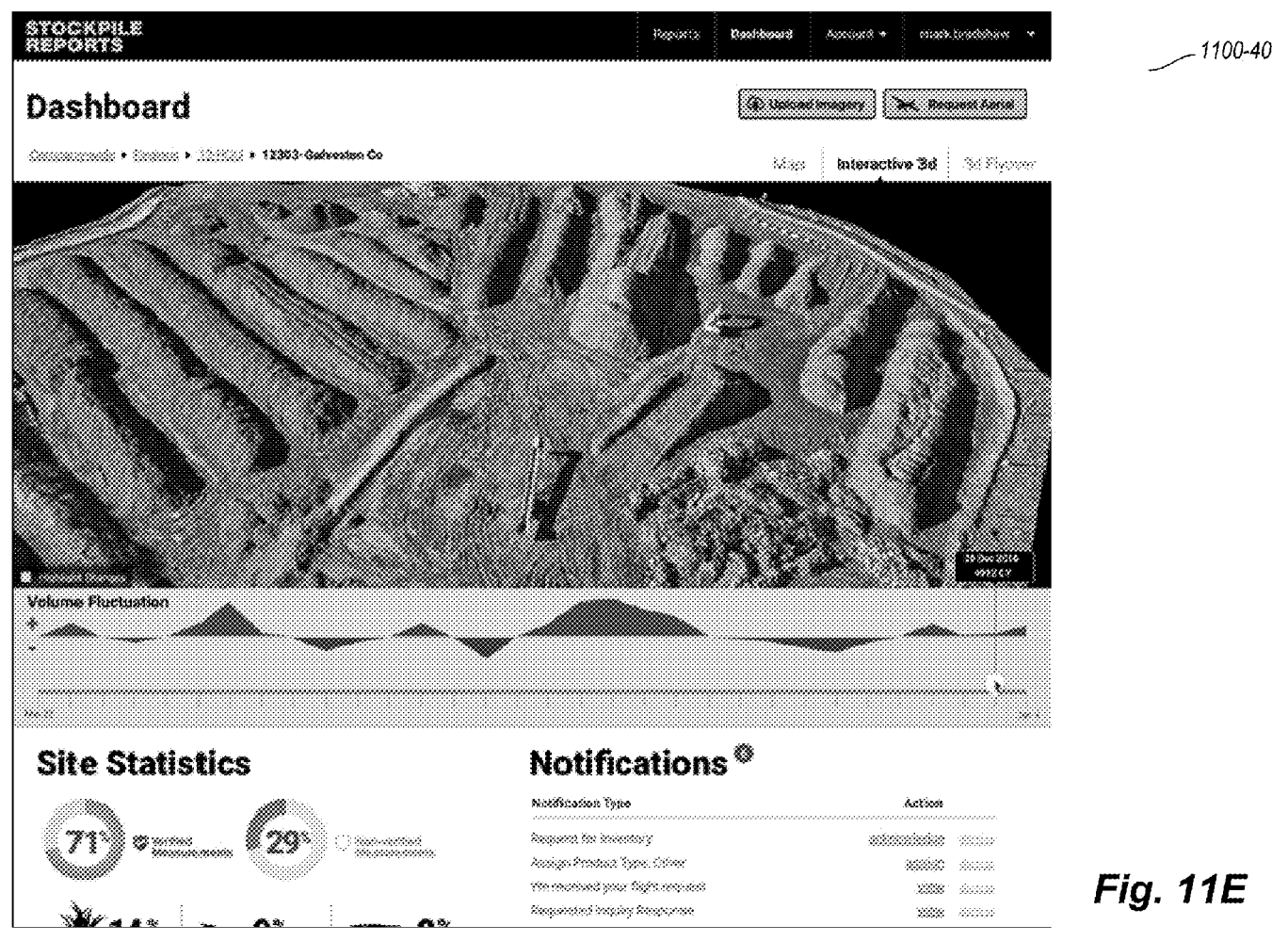
Figure 11K:
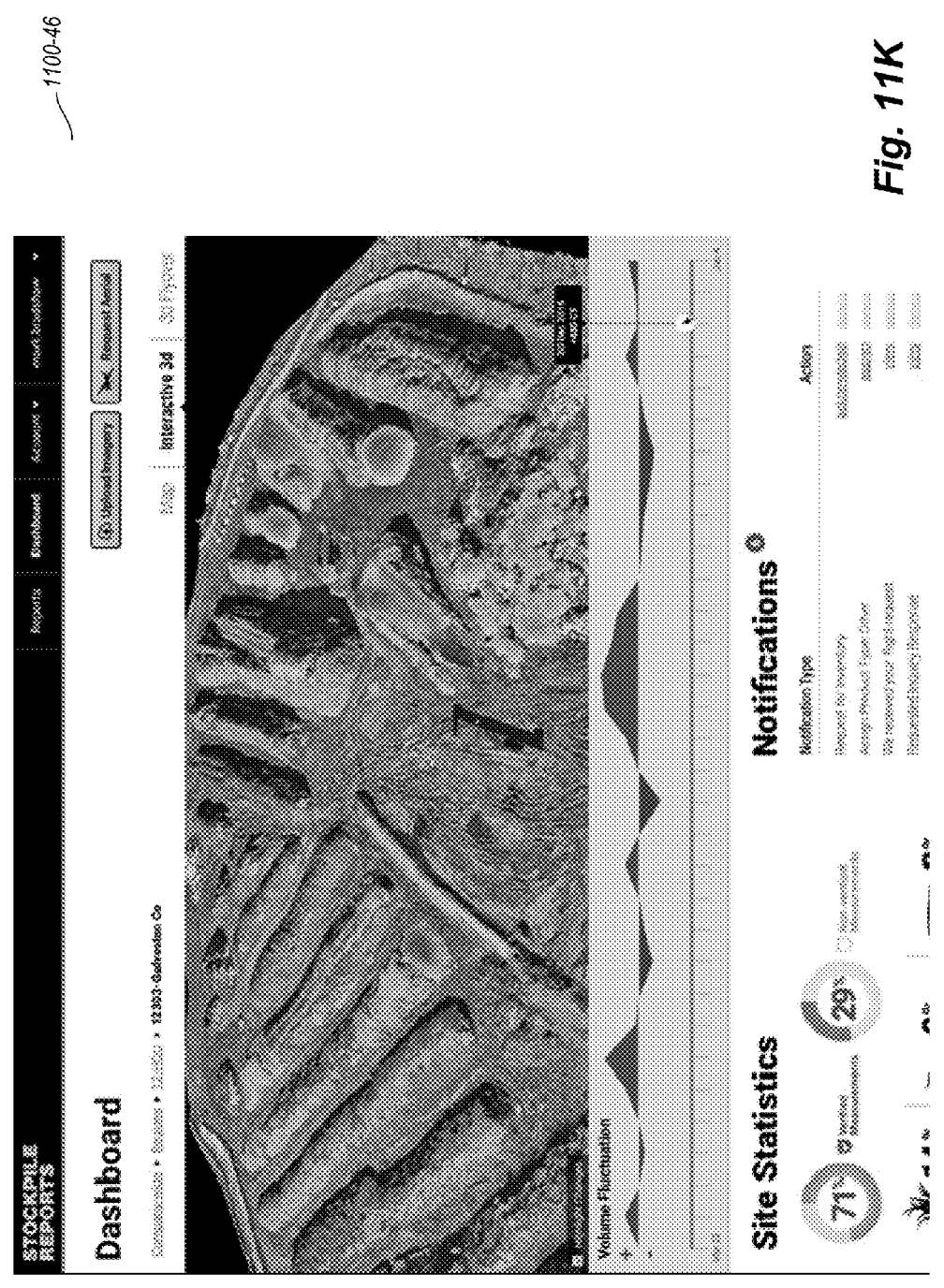

FIGS. 11A to 11K are example user interfaces for displaying and controlling information about changing object measurements over time.

DETAILED DESCRIPTION

Figure 2A:
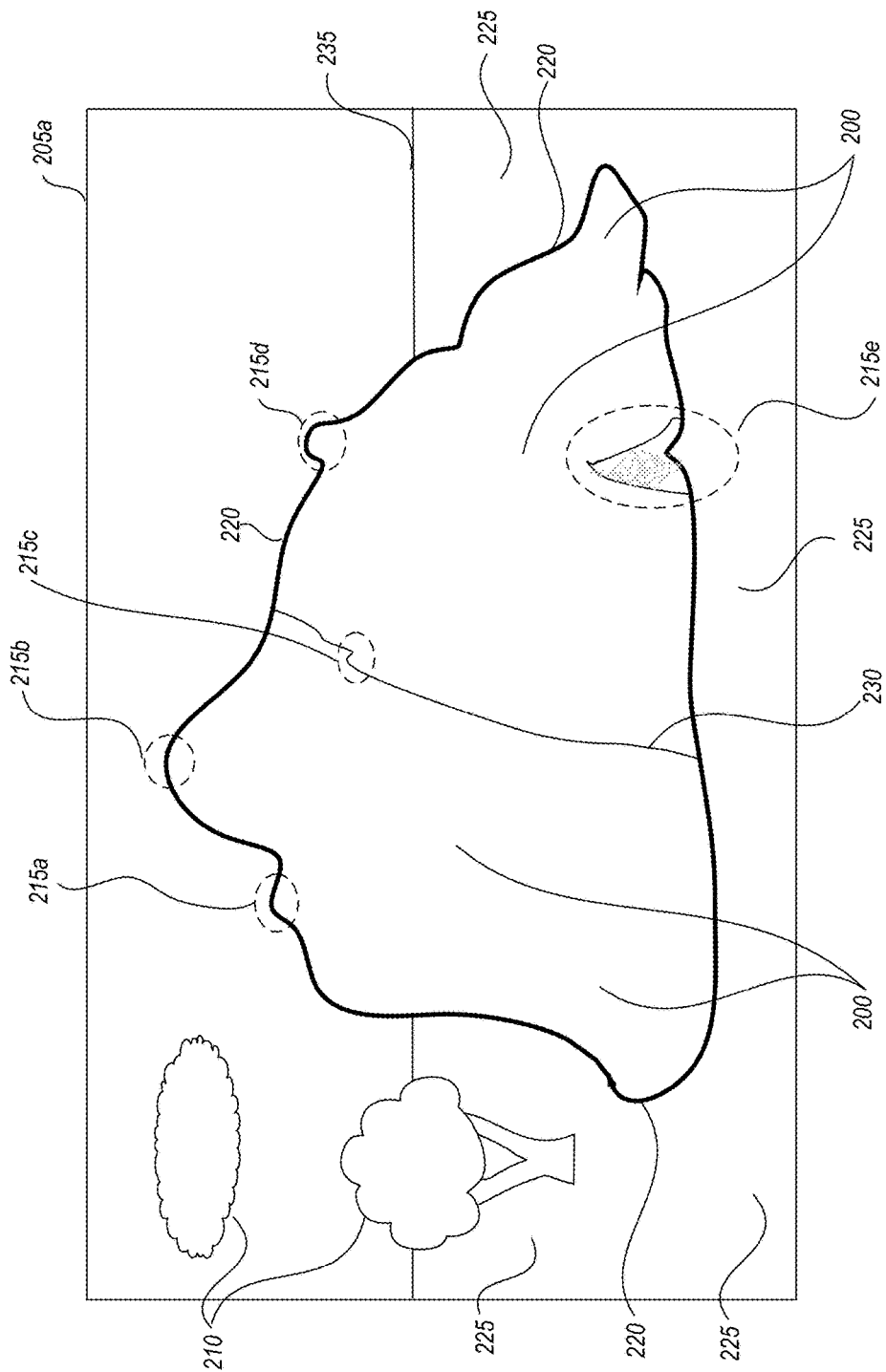

Techniques are described for analyzing images acquired via mobile devices in various ways, including in some embodiments to estimate measurements for one or more attributes of one or more objects included in the images and/or to analyze information from images at different times to determine changes in the objects and their attribute measurements. As one non-exclusive example, the described techniques may in some embodiments be used to measure the volume of a stockpile of material (e.g., a construction aggregate, such as sand, gravel, crushed stone, etc.), based on images acquired via a mobile device that is carried by a human user as he or she passes around some or all of the stockpile or that is otherwise moved around some or all of the stockpile, although other embodiments may be performed for other types of objects and/or for other types of attributes and/or may use other types of devices to capture images, as discussed further below. The calculation of object volume and/or other estimated object attribute measurements may be performed in various manners in various embodiments, including to generate a 3D (three-dimensional) computer model of the object from acquired images, as well as in some cases to generate one or more additional related computer models (e.g., of some or all of an underlying base surface on which the object is situated), and to perform various types of manipulations and/or analyses of the generated computer model(s). The described techniques may further include performing automated determination of changes over time in objects and their attribute measurements in various manners, such as based on analyzing computer model(s) or other information obtained from images acquired at different times. Additional details related to acquiring images via mobile devices and to analyzing such images and resulting computer models in particular manners are described below, and some or all of the described techniques are performed in at least some embodiments by automated operations of a Mobile Device Image Analysis ("MDIA") system.

As noted above, after a group of images to represent an object has been acquired, automated operations are performed in at least some embodiments to analyze those images in the group by one or more object attribute measurement, analysis and verification components of the MDIA system (e.g., one or more MDIA system object attribute measurement, analysis and verification components that execute as part of a software application on the mobile device acquiring the images or on one or more remote server computing systems), such as an MDIA system Object Attribute Calculator component, as discussed in greater detail below with respect to FIG. 1 and elsewhere. In at least some embodiments, such automated operations include extracting data from the images to represent the object and an underlying surface in a 3D space, and using the extracted data to generate one or more computer models or other computer representations of the object and/or of some or all of the underlying surface (e.g., based on visible portions of the surface surrounding the object), such as a 3D point cloud model, a bare earth model, a polygon mesh model, a 2½D representation, one or more surface models (e.g., based on piecewise planar functions, collections of triangles, meshes, NURBS, or non-uniform rational B-splines; T-Splines; or other curved representations of surface topology) or other solid models, etc. Such generated models may then be used to determine one or more of various characteristics of the object, including to calculate the object volume and/or to estimate other attribute measurements, to determine contour lines for the object surface and otherwise identify surface attributes, to determine a type and/or class of material of the object, to determine color information and/or other surface feature information (and to optionally modify one or more of the generated models to include and display such information), etc. Non-exclusive examples of attributes of an object that may be calculated or otherwise estimated include volume, surface area, height (e.g., maximum height, an average height, etc.), length (e.g., maximum length along a longest identified radial axis, average length in one or more directions, etc.), width (e.g., maximum width along a radial axis perpendicular to the longest identified radial axis in the x-y plane, average width in one or more directions, etc.), weight (e.g., based on volume and a unit weight for a specified amount of a determined material for the object), radioactivity (e.g., based on volume and a unit radioactivity for a specified amount of a determined material for the object), temperature, water content or other moisture content, monetary value or cost (e.g., based on volume and a unit value/cost for a specified amount of a determined material for the object), etc. Additional details are included below related to techniques for calculating an object volume and/or determining other types of object information.

As is also noted above, after one or more computer models are generated to represent an object and optionally at least some of an underlying surface on which the object is situated, automated operations are performed in at least some embodiments by one or more object attribute measurement, analysis and verification components of the MDIA system (e.g., an MDIA system Attribute Measurement Change Determination component, as discussed in greater detail below with respect to FIGS. 1 and 8 and elsewhere) to determine changes over time in one or more objects and their attribute measurements in various manners, such as based on comparing and otherwise analyzing such computer model(s) and/or other information obtained from images acquired at different times. For example, one or more computer model(s) may be generated to represent one or more objects at each of multiple times (e.g., based on different image acquisition sessions that take place at each of those times), and differences between those computer models may be determined and used to identify changes in the one or more objects over time, such as with respect to one or more object attribute measurements of interest (e.g., volume, surface area, material type, etc.). Additional details are included below regarding such automated operations to determine changes over time in one or more objects and their attribute measurements, including with respect to FIGS. 10A-10J.

In addition, information may be presented or otherwise provided to users regarding various types of determined information, including information about determined changes over time in one or more objects and their attribute measurements. For example, one or more object attribute measurement, analysis and verification components of the MDIA system (e.g., an MDIA system Attribute Measurement Information Visualization component, as discussed in greater detail below with respect to FIGS. 1 and 9 and elsewhere) may generate and provide information for display in a GUI ("graphical user interface") that provides user-selectable controls and other options to allow a user to interactively request or specify types of information to display and to visually review information about one or more objects, such as determined object attribute measurements at one or more times, and/or information about changes in such object attribute measurements and the underlying objects. Such information may in some embodiments and situations be presented along with one or more acquired images of the one or more objects at one or more times and/or visual representations of the one or more objects rendered from created computer models, such as to overlay information on the image(s) or other visual representations to highlight one or more types of determined information that is being presented. The user-selectable controls or other information may further allow the user to control what information is presented and/or how it is presented in various manners in various embodiments. Additional details are included below regarding such automated operations to present or otherwise provide information via a GUI or in other manners, and to allow the user(s) to modify or otherwise control the information presentation, including with respect to FIGS. 11A-11K.

Furthermore, additional automated operations to perform various types of verifications of generated computer model(s) of objects and/or of resulting object attribute measurements may be used in at least some embodiments, such as based on analyzing one or more types of information that reflect accuracy and/or completeness of the computer model(s). As one non-exclusive example, a degree of confidence in the completeness and accuracy of the object's generated computer model may be calculated as part of verifying a volume measurement and/or other attribute measurement(s) resulting from that computer model, such as by calculating or otherwise assessing a score (e.g., based on a percentage or an amount) of the object's volume and/or surface area that is represented in the computer model by data acquired from the images (e.g., by 3D data points from the acquired images) rather than by interpolation or other estimation, and determining if the assessed amount(s) satisfy one or more first defined model coverage thresholds. As another non-exclusive example, a degree of confidence in the boundary that is identified between the object and the underlying surface and in the accuracy and completeness of a corresponding generated computer model of the underlying surface may be calculated as part of verifying a volume measurement and/or other attribute measurement(s) resulting from the generated computer model(s), such as by calculating or otherwise assessing a score (e.g., based on a percentage or an amount) of the determined boundary having surrounding, adjacent surface with a sufficiently low slope relative to that of the overall underlying surface, and determining if the assessed amount satisfies one or more second defined boundary accuracy thresholds. Such automated verification techniques and/or various additional automated verification techniques may be used together in any combination or alone in varying embodiments, and in some embodiments may be performed before automated determination of changes in attribute measurements over time (e.g., to determine such changes only for attribute measurements that satisfy one or more specified verification criteria).

Furthermore, other types of verifications of generated computer model(s) of objects and/or of resulting object attribute measurements may be used in at least some embodiments, whether in addition to or instead of automated operations to determine confidence in surface area coverage, volume coverage and/or object boundaries as discussed above. As one non-exclusive example, another type of verification that may be performed in some embodiments includes analyzing images of an object to determine if the object is covered or otherwise blocked at least in part by vegetation or other extraneous materials that obscure the underlying surface of the object, such as by analyzing colors, textures, etc. of the images to identify such extraneous materials, and then determining a percentage or other amount of the surface covered by such extraneous materials (as such extraneous materials may reduce or prevent an ability to identify the actual surface of the object). As another non-exclusive example, another type of verification that may be performed in some embodiments includes analyzing images of an object to determine if water or other materials (e.g., snow, ice, leaves, vegetation, etc.) are covering or otherwise blocking at least part of the surface area of the toe that immediately surrounds the object exterior, such as by analyzing colors, textures, etc. of the images to identify such extraneous materials, and then determining a percentage or other amount of the toe surface area covered by such extraneous materials (as such extraneous materials may reduce or prevent an ability to identify the actual base surface surrounding the object and on which the object is situated). As yet another non-exclusive example, another type of verification that may be performed in some embodiments includes analyzing images of an object to determine if at least a portion of one or more other objects are adjacent to or overlapping with the object being modeled, so as to cover or otherwise block at least part of the object, such as by analyzing colors, textures, etc. of the images to identify such other adjacent and/or overlapping objects, and then determining a percentage or other amount of the object or its boundary that are adjacent to and/or overlap with such other objects (as such other adjacent and/or overlapping objects may reduce or prevent an ability to identify actual portions of the object being modeled). Changes over time may further be determined for some or all types of verification information, as well as presented via a GUI or otherwise provided to one or more users. Additional details regarding performing various types of verifications of generated computer model(s) of objects and/or of resulting object attribute measurements are included in U.S. patent application Ser. No. 15/076,493, filed Mar. 21, 2016 and entitled "Verifying Object Measurements Determined from Mobile Device Images," which is herein incorporated by reference in its entirety.

Various techniques may further be used in some embodiments to identify extraneous materials on an object, extraneous materials surrounding an object, and/or other adjacent and/or overlapping objects, including using machine learning to classify portions of images and the materials that they depict (e.g., by generating and training a vegetation model to detect whether a portion of an object's surface is covered or otherwise obscured at least in part in one or more images by vegetation growing on the object, for later use in calculating a percentage of the object's surface that is covered by such vegetation; by generating and training a water model to detect whether a portion of adjacent toe surface around an object is covered or otherwise obscured at least in part in one or more images by water on that toe surface, for later use in calculating a percentage of the adjacent toe surface that is covered by such water; by generating and training an overlapping pile or other object model to detect whether a portion of an object's surface is covered or otherwise obscured at least in part in one or more images by one or more other objects that overlap in part with the object being modeled, for later use in calculating a percentage of the object's surface that is covered by such overlapping objects; etc.), or more specifically to identify one or more particular defined situations as discussed above. For example, occluding objects can be identified by analyzing the 3D point cloud (or other computer representation) of a target object being modeled. By doing so, other extraneous object that are not part of the target object being modeled may be identified by analyzing their connectivity to the modeled surface of the target object, such as to detect that corresponding 3D points for the extraneous objects are above the target object (e.g., if multiple different surfaces are found moving vertically for a particular point on the underlying surface) and to label the extraneous objects accordingly (e.g., as non-target object obstacles). These groups of points can further be analyzed and classified into different classes of occluding extraneous objects, for example vegetation, construction equipment, etc., such as by corresponding image-based classifiers that analyze at least one of color or texture or shape of an exterior of an object in one or more images. Similarly, the 3D point cloud (or other computer model representation) of a target object may be analyzed for subsets that are shaped like vegetation (e.g., leaf structures, etc.). It will also be appreciated that the obstacle detection can use the 3D point cloud and the images to analyze the obstructing objects using both their 3D geometry and their appearance information in the images. This can, for example, be achieved by combining the point cloud analysis and the image based classifiers. Additionally, instead of the point cloud, such a classifier could use depth map (or equivalent disparity) information to infer 3D point and appearance information for the classifier. The operation of such classifiers can be initiated and/or improved by, for example, performing learning of one or more particular types of occluding extraneous objects from training data of the same site of the target object or other sites.

In addition, after the process of calculating an object volume and/or determining other types of object information has been completed, further automated operations may be performed by one or more components of the MDIA system to provide information about determined object attribute measurements and/or about automated verification of such object attribute measurement(s), such as by an MDIA system Object Information Visualization and Recipient Interactor component as discussed in greater detail below with respect to FIG. 1 and elsewhere. For example, when the analysis of an object is performed by the MDIA system on behalf of a client of the MDIA system, the MDIA system may generate one or more reports for the client or otherwise provide corresponding information to the client in manners other than via a GUI. Such reports or other information may, for example, be provided in a manner specified by a client, and may be delivered to the client in various manners (e.g., sent to the mobile device or an associated computing device of the operator for display; retrievable by an authorized user of the client from one or more server computing systems of the MDIA system; printed or otherwise distributed in non-electronic manners; etc.).

The automated operations described herein may in at least some embodiments include various additional interactions with one or more end users (e.g., clients of the MDIA system or their representatives), such as end users who have or will receive information about the attribute measurements. Such interactions may include, for example, receiving additional input from the end user to supplement information used to generate the computer model(s), such as one or more of the following: information about portions of the object, such as based on specialized knowledge of the end user about portions of the object that are not visible or otherwise not covered in the acquired images (e.g., a shape of a top of an object that is higher than a level of the camera during image acquisition and not covered in the acquired images, valleys or other lower areas of the object's surface that are blocked by higher closer portions of the object, portions of the object's surface that are blocked by intervening objects that are not part of the object being modeled, interior holes or other external objects that are within the object being modeled but not visible from the images being acquired, etc.), based on information that the end user may be adept at identifying in images (e.g., by providing user input on a touch-sensitive screen or using other input techniques for one or more displayed images of an object to specify particular types of information of interest, such as a boundary of the object, areas of vegetation or other extraneous materials on the surface of the pile, areas of other objects or materials between the camera and the object that are blocking portions of the object, areas of water or other extraneous materials on the surface adjacent to or near the object, areas of adjacent or overlapping other objects that may obscure portions of the object being modeled, etc.), etc.; information about portions of the underlying surface on which the object being modeled is situated that are not visible under the object (e.g., holes or other depressions in the surface, hills or bulges or other protrusions in the surface, etc.); etc. Such information from the end user may then be used to modify the generated computer model (e.g., to supplement and/or override image-acquired data) and/or to assess the accuracy of corresponding portions of the computer model. Such end user interactions may further include, for example, receiving instructions from the end user to override an automated volume measurement and/or other attribute measurements and/or to override an automated verification (or lack thereof) of such a measurement or to otherwise specify such a verification or lack thereof, such as based on specialized knowledge of the end user—such receiving of end user input may include, for example, receiving and accepting one or more alternative user-specified attribute measurement(s) to use instead of or in addition to automatically determined attribute measurement(s), accepting a verification or lack of verification by the end user of the attribute measurement(s), receiving a determination by the end user of a verification or lack of verification of the attribute measurement(s) to use (e.g., instead of an automated determination from the verification activities), etc. In addition, to assist the user in providing such input, various types of computer-generated information may be displayed or otherwise provided to the user, such as a 3D rendering of an object showing one or more of the following: contour lines; a determined object boundary, and optionally areas of surrounding toe with a slope that is too high; an object surface, and optionally corresponding image-acquired data, as well as areas in which there is not sufficient data coverage for volume and/or surface area measurements; etc. Additional details are included herein related to techniques for interacting with an end user, including adjusting automated determination activities by the MDIA system and/or automatically determined information from the MDIA system based on corresponding input from the end user.

In addition, the information that is determined for one or more objects may in some embodiments and situations be used in manners other than to provide corresponding information to a client of the MDIA system, such as to provide information about particular objects and/or aggregated information about multiple objects (e.g., objects together at a single site controlled by a particular operator who creates or manages the objects, objects in a geographic area, objects of a particular type, etc.) to one or more external entities that do not own the objects being modeled or initiate the modeling of the objects. Additional details are included below related to techniques for generating and providing information about objects of interest to clients and/or other entities.

While some of the example embodiments discussed herein include a stockpile or other pile of material, other types of objects may be assessed in a similar manner in at least some embodiments, including buildings and other man-made structures, holes or pits or other cavities in the ground (e.g., material extraction from strip mining) or other negative spaces, etc. Furthermore, an object of interest being assessed may be of various types of materials, such as for a stockpile or other pile to include materials of various types and sizes (e.g., construction aggregates, grain or other product, sawdust, logs, tires, trash, recyclable materials, etc.). In addition, images that are acquired may be of various types and resolutions, including still images and/or video image frames, and may capture various types of light or other energy (e.g., visible light, infrared, ultraviolet, radioactivity, etc.). Similarly, images may be acquired using image acquisition capabilities of various types of devices in various embodiments, including one or more of the following: a mobile device that is carried by a human user as he or she passes around some or all of an object (e.g., a digital camera that takes individual digital photo images and/or digital video consisting of successive frames of digital images, including a camera that is carried by a human user or a body-mounted camera; a device with computing capabilities and image acquisition capabilities, such as a smart phone, a tablet computer, a pad computer, a slate computer, etc.); a vehicle-mounted camera, such as on a ground or aerial drone that is partially or wholly autonomous, or on a ground or aerial vehicle driven or piloted or guided by a human (e.g., an airplane, a truck, an ATV, etc.); a satellite; etc. Furthermore, while images of an exterior surface of an above-ground object are acquired in some embodiments from beside (e.g., ground-level) or above the object, in other embodiments the images may be acquired in other manners, including acquiring an interior surface of an object from within the object (e.g., from within a building, such as a 1-room structure, or a multi-room structure by using the described techniques to identify the interior room surfaces corresponding to exterior walls of the structure; from within a hole or pit or other cavity; etc.) or above the object (e.g., ground level outside a hole or pit or other cavity, etc.), and including from a device that moves along an exterior or interior surface of an object (e.g., a ground-based drone that drives on top of a pile or within a hole).

Furthermore, while some of the example embodiments discussed herein include analyzing a single object at a single time, the described techniques may be used in other manners in some embodiments. For example, a single object may be analyzed at different times, such as to further enable relative information for the object to be determined over time (e.g., to determine how a stockpile object grows and/or shrinks over time with respect to volume or one or more other attributes), with corresponding information made available to a client and/or used for further automated determination of related information. In addition, in at least some embodiments, multiple objects (e.g., nearby, on top of each other in whole or in part, behind or in front of each other in whole or in part, etc.) may be analyzed together in a series of images that are acquired, such as by traversing all of the multiple objects, and optionally traversing other portions of individual objects (e.g., for objects on top of each other in whole or in part). Additional details are included below regarding determining changes in one or more objects and their attribute measurements over time, such as by using images acquired at different times, as well as presenting corresponding information in various ways.

In addition, during the acquisition of a series of digital images of an object of interest, various types of user feedback and/or other instructions may in some embodiments be provided to a human user who is operating the mobile device acquiring the digital images, such as based on monitoring quality and/or other aspects of some or all of the digital images being acquired, including to assist the human user in improving future digital images to be acquired. The selection of particular images to use from a series of digital images of an object of interest may also be performed in various manners in various embodiments, including to select a subset of the digital images of the series while the digital images are being acquired and/or after all of the digital images are acquired, such as based on measured quality and/or other assessments of the selected images. In addition, the MDIA system may in some embodiments automatically provide user feedback and/or other instructions to one or more human users to initiate acquisition of one or more images of one or more objects for one or more specified times, such as for use in tracking changes at a particular time relative to information from one or more previous image acquisitions at one or more previous times (e.g., based on a defined scheduled or other automated determination, such as based on other information about changes that have occurred since one or more previous times). Additional details regarding such image selection and user feedback and instruction are included below.

For illustrative purposes, some embodiments are described below in which specific types of images are acquired for specific types of objects, and in which specific types of object attributes are estimated in particular manners. However, it will be understood that such described techniques may be used with other types of objects and images and for other types of object attributes in other manners in other embodiments, and that the invention is thus not limited to the exemplary details provided.

FIG. 1 is a diagram illustrating an example embodiment of an MDIA ("Mobile Device Image Analysis") System 160 that may be used to provide functionality to one or more clients related to the analysis of images acquired via mobile devices, such as to calculate volume or otherwise measure attributes of interest of one or more objects included in the acquired images, to perform automated operations to determine changes over time in one or more objects (e.g., with respect to one or more attributes of the one or more objects), and/or to perform automated operations to verify attribute measurements. The MDIA System 160 may be provided via one or more network-accessible configured devices, whether via one or more configured server computing systems or other configured systems (not shown) that are remote from a user representative 105 of a client, and/or based on configured use of one or more mobile devices 110 used by the user representative 105. A server computing system in such an example may include any computing device or system that may receive data and/or requests, and take corresponding actions (e.g., store the data, respond to the request, etc.), as discussed in greater detail elsewhere herein.

In particular, in this example, a user representative 105 is carrying a mobile device 110 that includes image acquisition capabilities (e.g., one or more cameras) and includes communication capabilities to enable a transmission 185 of information from the mobile device 110 to other systems (e.g., other remote server computing systems providing at least some of the MDIA System 160), such as via a cellular telephone network or other transmission method. In other embodiments, the image data that is captured by such a mobile device 110 may be provided to other systems in other manners, such as via a physical cable or dock or other physical connection (e.g., after the image acquisition for an object in an environment is completed). In addition, in some embodiments, some or all of the image data captured by a mobile device 110 may be first transmitted to another nearby computing device, such as another nearby computing device carried by the operator or located in a nearby location (e.g., a nearby vehicle or building), and then transmitted from the nearby computing device to one or more remote server computing systems or other remote systems—such a transmission from the mobile device to the nearby computing device may occur, for example, via a physical connection (e.g., a cable, wire or other connector), via a wireless transmission (e.g., Bluetooth, infrared, near field communications, a wireless transmission mechanism with a limited transmission range, etc.), etc. Furthermore, while the mobile device acquiring images is in this example carried by a human user, in other embodiments some or all of the images that are acquired may be acquired in other manners, whether in addition to or instead of such a human user, such as via one or more mobile devices that are carried by or otherwise part of one or more of automated aerial drone(s) 181, human-piloted aircraft(s) 183, ground vehicle(s) 188 (whether automated drone or with human pilots), satellite(s) 186, etc.

In this example, a stockpile object 150 (e.g., consisting of construction aggregate material) is shown, such as in an outdoors environment, and the user representative 105 is proceeding to encircle some or all of the exterior of the stockpile object 150 in order to obtain various images of the stockpile exterior. For example, the user may travel a path 115 around the exterior of the object, whether based on a path selected wholly by the user or instead based at least in part on user feedback or instructions provided by the MDIA System 160 to the user. The user and/or the mobile device may further acquire a variety of images to encompass the exterior of the object during the traveling of the path. As one example, the user may occasionally manually activate the image acquisition capabilities of the mobile device 110, such as at a variety of locations 120 around the exterior along the traversal path 115. As another example, the user may travel the path 115 and the mobile device may automatically acquire such images at such locations, such as based on a period of time elapsing since the last image, a distance traveled by the user since the last image, or other information related to the images that have been previously captured. Alternatively, the mobile device may acquire image data in a continuous or substantially continuous manner, such as to shoot video that includes successive image frames in rapid succession (e.g., 60 frames a second, 30 frames a second, 1 frame a second, 1 frame every 5 seconds, 1000 frames a second, etc.). Thus, for example, various of the images acquired may instead occur at relatively close intervals, such as those illustrated with respect to locations 125 (while the locations 125 are not illustrated throughout the entire exterior of the object, it will be appreciated that such substantially continuous image acquisition may be performed at the same rate for some or all of the traversal of the object exterior).

The mobile device 110 may further transmit some or all of the acquired images to the MDIA System 160, such as via transmission 185 over one or more networks 180, including to be stored in image data 162. After a group of images have been selected to represent an object, the MDIA System 160 may further perform processing to generate one or more models or other representations to represent the object, such as a 3D point cloud model, a bare earth model, a surface model, etc., and may store corresponding information in model data 163. After the one or more models have been generated, the MDIA System 160 may further estimate or otherwise measure one or more attribute values for the object 150, and store such information with attribute data 164, as well as determine changes over time for one or more attributes and/or objects and store such information with change data 165. In addition, one or more clients of the MDIA System 160 may provide various client data 161 to the MDIA System 160, such as related to types of data of interest to be generated for the client. Such clients and their authorized representative users may, for example, use various client computing systems 190 to communicate with the MDIA System 160 over one or more networks 180, such as to perform registration activities and/or to obtain results of object attribute measurements performed for the client. The data 161-165 may be stored in various manners, such as all or in part on the mobile device 110, all or in part on one or more server computing systems remote from the mobile device 110, on one or more storage systems separate from the configured devices that execute some or all of the components of the MDIA System 160, etc.

The MDIA System 160 in this example includes various components 171-179, which may perform various automated operations of the MDIA System 160. In some embodiments, some or all of the components 171-179 may execute on one or more server computing systems (or other computing systems) remote from the object 150, while in other embodiments one or more of the components 171-179 may instead execute on one or more configured devices of the user representative 105, including the mobile device 110. For example, the Image Quality Monitor component 171, Operator Feedback Provider component 172, and Image Selector component 173 may optionally be grouped as part of an image acquisition sub-system 168 of the system 160, with some or all of those image acquisition components being executed on the mobile device. In addition, the Model Generator component 174, Object Attribute Measurement Calculator component 175, Object Change Determination component 176, Object Information Visualization and Recipient Interactor component 177, Model and/or Attribute Verification component 178 and Object Identifier component 179 may optionally be grouped as part of an object attribute measurement, analysis and verification sub-system 169 of the system 160, with some or all of those object components 174-179 being executed on one or more server computing systems remote from the mobile device. It will be appreciated that the functionality of the MDIA System 160 may be structured in other manners in other embodiments, including to have more or less components and/or to have more or less functionality than is described in this example.

The Image Selector component 173 may be configured to perform automated operations to select some or all of the images that are acquired by the mobile device 110, for use as the group of images to represent the object 150, whether concurrently with the acquisition of the images or after all of the images have been acquired—if the Image Selector component 173 executes on the mobile device 110 (or other device of the user 105 that is associated with the mobile device 110, such as a smart phone that obtains image data from a mobile device camera and transmits the image data to remote servers), and if image data for object 150 is to be transmitted over the network(s) 180 to one or more remote server computing systems, the amount of bandwidth used for the transmission may be reduced in such a situation, as only the selected group of images (or information extracted from the images of the selected group and/or from other images) may be transmitted. In other embodiments, all of the acquired images (or all that satisfy minimum quality standards) may instead be transmitted to one or more remote server computing systems for further analysis, including in embodiments in which the Image Selector component 173 executes on those remote server computing systems and selects some or all of the acquired images after the item acquisition session has been completed.

The Image Quality Monitor component 171 may be configured to perform further automated operations for acquired images in at least some embodiments, such as to monitor image quality with respect to one or more metrics of interest, and to take corresponding actions if sufficient quality is not sustained. In addition, the component 171 may in some embodiments assist in providing feedback or other instructions to the user related to image quality problems that are detected if the component 171 executes concurrently with the image acquisition, such as by providing corresponding information to the Operator Feedback Provider component 172. For example, the Operator Feedback Provider component may be configured to perform further automated operations that include providing feedback to the user in various manners while the user 105 is travelling the path 115, such as when image quality problems are detected or to provide other types of information.

The Object Identifier component 179 may be configured to perform further automated operations to, for a group of acquired images that represent one or more objects, identify those one or more objects, such as to match those one or more objects to one or more previously modeled objects. As discussed in greater detail elsewhere herein, such objects may change over time with respect to one or more attributes (e.g., shape, size, composition of materials, moisture content, temperature, etc.), and various techniques may be used to determine if an object represented by a group of acquired images corresponds to a changed object that was previously modeled, or is instead a new object (e.g., an object that is newly formed such a previous acquisition of images for the same site, an object that is not newly formed but was not previously captured in acquired images, etc.). Such objects may further change in other manners at times, such to have an object that results from two or more other previous objects being combined, two or more objects that result from a previous object being split, a previous object that is removed or is otherwise no longer present, a new object that was not previously present, an object whose previous location has changed, etc.

The Model Generator component 174 may be configured to perform further automated operations to, after the group of images to represent the object 150 has been selected and are available in the image data 162, analyze the images of the selected group and generate one or more corresponding models or other representations, such as to generate a point cloud model for the object, to apply a bare earth model and/or a surface model to the point cloud model, etc. In some embodiments and situations, some or all of the generated models may be 3D models (e.g., for a point cloud model), while in other embodiments and situations, some or all of the generated models may have other forms (e.g., 2½D representations)—use of the term "model" herein is intended to include any representation of data for an object that may be stored, unless otherwise indicated. The Object Attribute Measurement Calculator component 175 may be configured to perform further automated operations to, after the one or more models are generated, use the generated model(s) to measure values for one or more attributes of interest of the object 150, such as a volume attribute or other related attributes.

The Object Change Determination component 176 may be configured to perform automated operations to analyze information from images acquired at different times for one or more objects to determine changes in the object(s) over time (e.g., changes in one or more object attribute measurements), such as by comparing one or more generated models for one of the times to one or more other generated models for each of one or more other times. The Object Information Visualization and Recipient Interactor component 177 may be further configured to perform automated operations to present or otherwise provide information to users regarding various types of determined information, including information about determined changes over time in one or more objects and their attribute measurements, as well as to control what information is presented and/or how it is presented in various manners. The component 177 may further be used to provide corresponding information to the client in manners other than via a GUI, such as by generating a report that includes results information and sending it to a client system 190 and/or the mobile device 110, or instead to provide such information in other manners (upon later request by the client, such as to enable the client to login to the MDIA System and to review results of previously analyzed objects). In addition, during or after the process of generating attribute information, determining change information and/or verifying attribute information, the component 177 may in some embodiments perform various types of interactions with an end user, including to obtain various types of input from the end user that is subsequently used by the MDIA System 160 (e.g., by one or more of the object attribute measurement and verification components 169), as discussed in greater detail elsewhere herein.

The Model Verifier and/or Attribute Verifier component 178 may be configured to perform further automated operations to verify generated computer model(s) and/or object attribute measurements produced from such computer model(s). As discussed in greater detail elsewhere herein, such automated operations may include analyzing one or more types of information that reflect accuracy and/or completeness of the computer model(s) and their resulting object attribute measurements, such as to verify data coverage of a computer model of an object with respect to volume and/or surface area of the modeled object, and/or to verify boundary accuracy and completeness of a computer model of an object with respect to a separate underlying surface on which the object is situated.

While the example of FIG. 1 involves a single device (mobile device 110) and a single sensor (a camera or other imaging capability) to capture data regarding the object 150, in other situations and embodiments multiple devices and/or sensors may be used. As one example, different devices and/or sensors may be used to acquire different types of data (e.g., simultaneously), and the mobile device and/or remote server computing systems may combine or otherwise use such different types of data—non-exclusive examples of types of data that may be acquired include image data in one or more light spectrums, non-light energy data, location data (e.g., via GPS), depth or distance data to the object, color data, sound data, etc. In addition, in some embodiments and situations, different devices and/or sensors may be used to acquire the same or overlapping types of data (e.g., simultaneously), and the mobile device and/or remote server computing systems may combine or otherwise use such different types of data, including to determine differential information for a type of data. For example, the mobile device may include GPS capabilities (or other location determination capabilities), and one or more other devices in the environment (such as one or more devices in a fixed location) may similarly include GPS capabilities (or other location determination capabilities), to enable a position of the mobile device at a given time to be determined more accurately by tracking relative differences in the differing GPS data (e.g., to eliminate minor transitory variations or fluctuations from a GPS satellite or other common source of the GPS data). Such differential information may similarly be determined for some or all of the other types of data that may be captured. In addition, information such as GPS data or other location data may further be used to determine additional information about an object, such as to assist in determining scale information for the object—as one example, location data at different locations on a path or other exterior around the object may be used determine information about the width and/or length of the object, whether alone or in combination with additional data about depth or other distance measurements of the mobile device (or other device or sensor) to the object at particular such locations. However, such GPS data or other such location data may not have sufficient accuracy to create a 3D computer model with a desired level or threshold of accuracy in at least some embodiments and situations, such as to model features and other locations on a surface of an object to a scale of one or more inches or fractions of an inch, one or more feet, etc.

It will be appreciated that the details discussed with respect to FIG. 1 are provided for illustrative purposes, and that the described techniques are not limited to these example details.

FIGS. 2A-2H illustrate various example images that may be acquired with respect to an object of interest (e.g., such as for the stockpile object 150 of FIG. 1), as well as corresponding analysis of the images that may be performed in at least some embodiments.

With respect to FIG. 2A, an example image 205a is shown, which includes a side view of an object 200, with the object in this example representing a stockpile of construction aggregate materials (e.g., object 150 of FIG. 1). The image 205a further includes additional information that is not part of the object 200, such as other objects 210 (in this example a tree and a cloud), a base surface 225 on which the object 200 and at least some other objects (e.g., the tree 210) rest, a horizon line 235, etc.—it will be appreciated that the surface 225 may in some situations be flat and level, while in other situations the surface may be sloped or otherwise irregular.

In addition, in this example, the exterior of the stockpile object 200 may include various visible aspects, at least some of which are shown in the image 205a, and which may be detectable via an automated analysis of the image. For example, the surface of the object 200 may have varying textures, colors, and shades (although colors and textures are not illustrated in this example, and shading is shown only with respect to feature 215e), such as to reflect a type of material of the object, position of the sun or other lighting source, an angle of the object surface with respect to the viewpoint location of the imaging device, etc. In addition, the surface of the object 200 may have various irregularities or other features that may be identified in the image and used to track changes between images—in this example, various example features 215 are illustrated. Such features may include, for example, points along a top of a silhouette or other outline 220 of the object, such as feature 215b at an overall peak of the object 200, and feature 215a that corresponds to a local high point of the outline. In addition, other example features include feature 215d along the outline 220 of the object 200, such as based on its distinctive shape, feature 215c along a ridge line 230 of the object surface 220 that is not part of the object outline (from this view), feature 215e that indicates a local cavity or indentation on a portion of the surface (with shading added to show that it may have a darker color relative to other surrounding parts of the surface), etc. While feature 215e provides one example of a feature on the surface of the pile, a variety of other types of surface features may similarly be identified and used, including, for example, based on differing colors, shading, textures, angles, curvature, lack of continuity, etc. between different locations on the surface; based on cavities, indentation, protrusions, protuberances, lines, or other shapes; based on changes from one material type to another; etc. Thus, such features may include structural features that are identified based at least in part on their shape or other structure and/or appearance features with visible elements (e.g., patterns, colors, textures, etc.). It will be appreciated that a variety of types of features may be identified and selected in various manners, including in a manner specific to the type of image analysis that is performed.

Figure 2B:
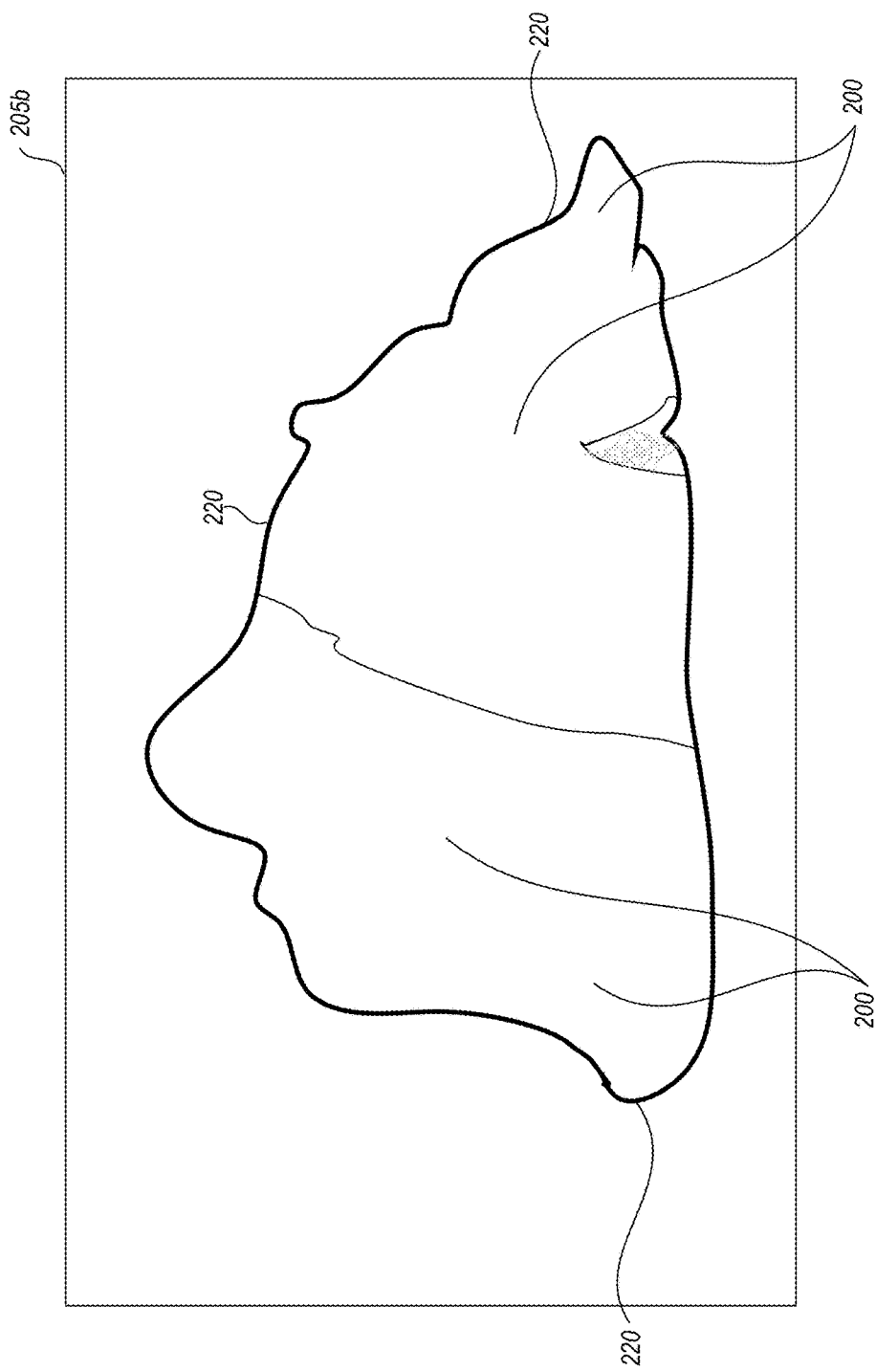

FIG. 2B continues the example of FIG. 2A, and in particular illustrates an example of an image 205b based on image 205a of FIG. 2A, but in which data for a portion of the image corresponding to the object 200 is shown, while data for other portions of the image have been removed, such as based on analysis of the image 205a. In other embodiments, such a separation of an object portion of the image from non-object portions of the image may not be performed at all, or may be performed at a time of generation of a corresponding model.

Figure 2C:
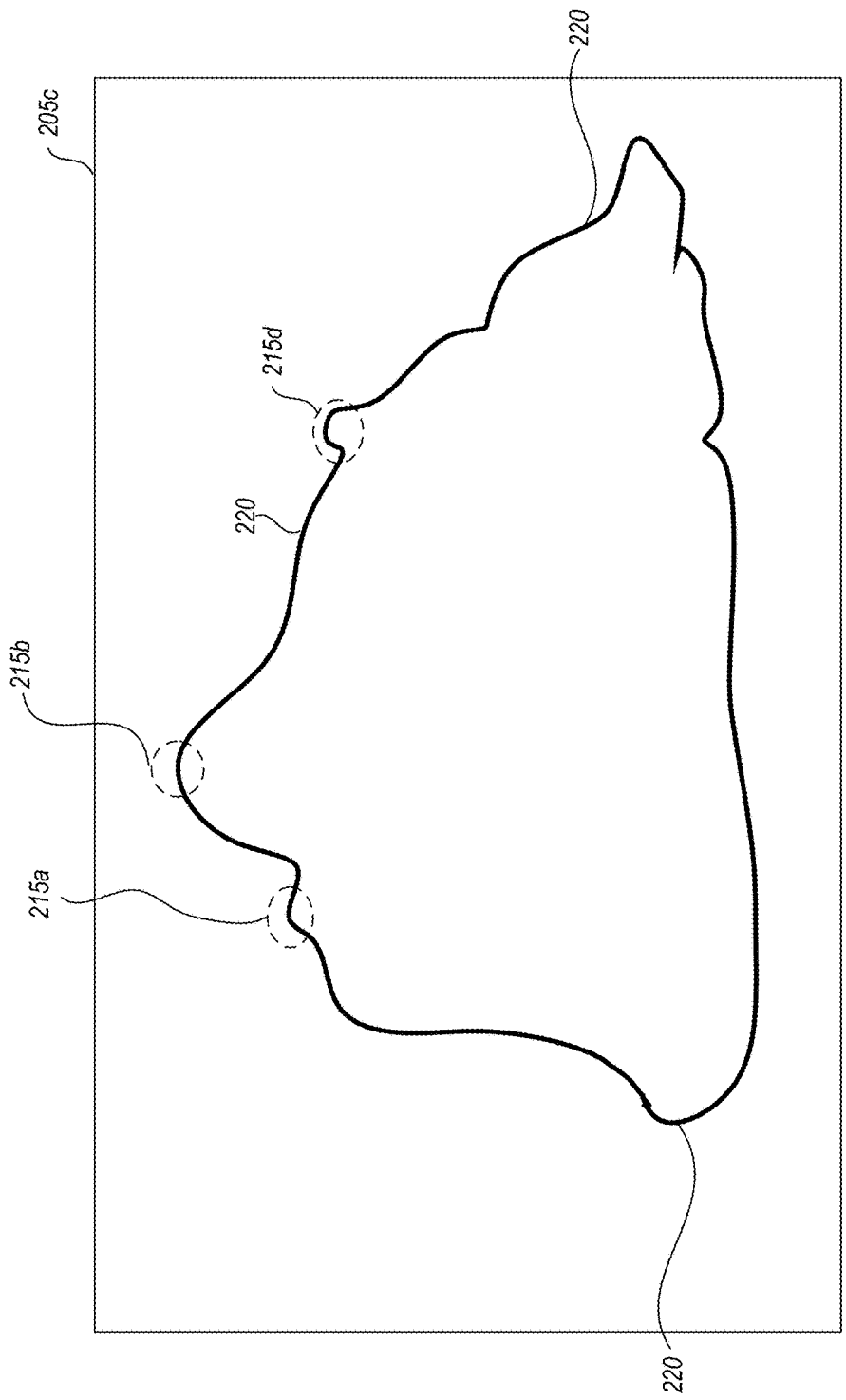

FIG. 2C continues the examples of FIGS. 2A-2B, and in this example illustrates an image 205c based on image 205a of FIG. 2A, but in which only a portion of the information about the object 200 is available. In particular, in this example, only outline or silhouette information 220 for the object 200 is shown, such as if lighting conditions prevent other surface features from being visible, and/or based on a type of image analysis (e.g., line detection) that is performed. It will be appreciated that some embodiments may not use such outline information, while other embodiments may do so. In this example, the outline information of FIG. 2C still allows some current features of the object to be identified, such as features 215a, 215b, and 215d—however, surface-related portions of the object are not visible in this example, such as ridge line 230 and features 215c and 215e.

Figure 2D:
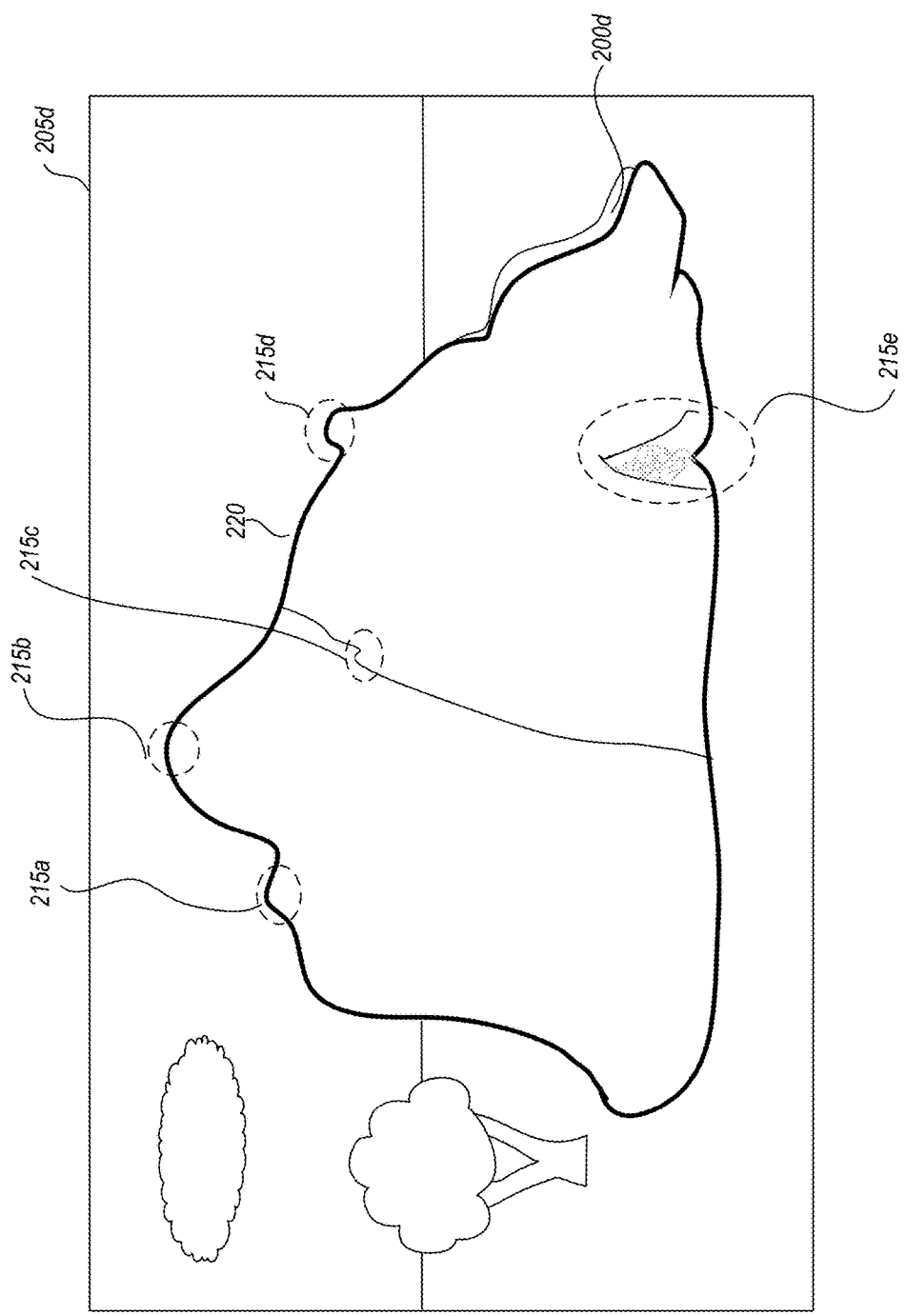

FIG. 2D continues the examples of FIGS. 2A-2C, and includes an example of a successive image 205d that may be acquired for the object 200 from a location very near that of the location at which image 205a of FIG. 2A was acquired, such as to correspond to one of the locations 125 illustrated in FIG. 1 relative to an initial starting location 120a (e.g., if image 205d is a digital image frame from a video taken by the mobile device that is near a frame corresponding to image 205a of FIG. 2A in the sequence of acquired frames). In the example of FIG. 2D, the image 205d varies only slightly as the user operator of a mobile device begins to move to the right, such as to illustrate a slight additional portion 200d of the object. Accordingly, at a time of image selection for the group of images to represent the object 200, only one of images 205a and 205d may be selected, such as due to a relatively small amount of additional information available in the second of the two images relative to the first of the two images.

Figure 2E:
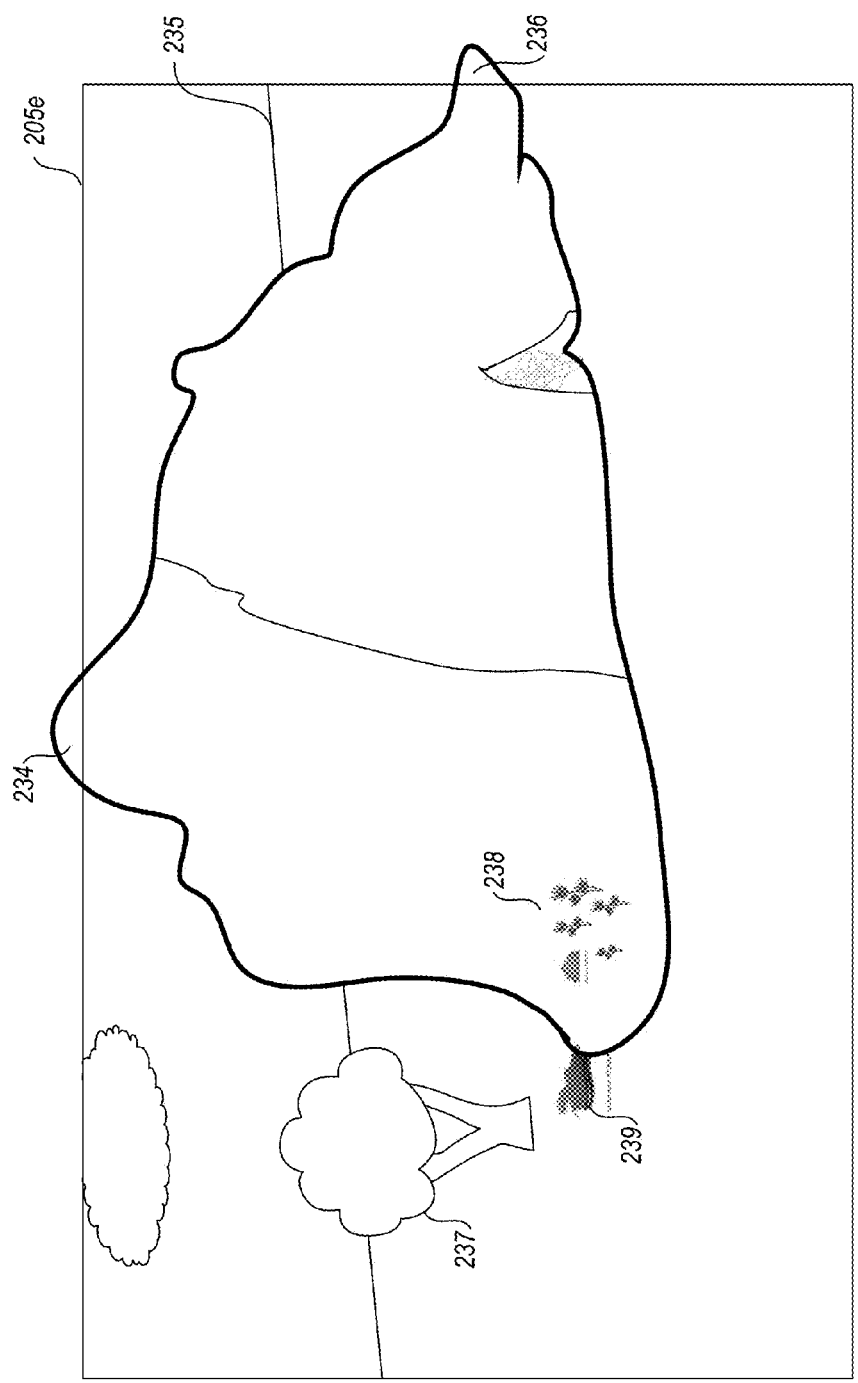

With respect to FIG. 2E, it illustrates an example of an image 205e similar to that of image 205a of FIG. 2A, but in which the image 205e has one or more quality problems, such as due to improper operator movement or positioning of the mobile device when taking the image 205e, and/or due to features of the environment being imaged. In particular, as is illustrated in FIG. 205e, the image 205e is tilted (e.g., as illustrated by the horizon line 235), and one or more portions 234 and 236 of the object 200 have not been captured in the image due to improper positioning of the mobile device capturing the image. Accordingly, for such an example image 205e, if image monitoring is being performed, the quality of the image may be determined to be below a specified threshold or to otherwise not meet one or more specified quality criteria, such as with respect to degree of motion between images and/or for other reasons, and the image 205e may be discarded from further consideration due to that failure. Missing portions 234 and 236 may, if not corrected and/or supplemented in other images, reduce an amount of data used to model the object (e.g., require data interpolation to estimate corresponding portions of the object, such as to estimate a flat top or more rounded top to reflect portion 234), and thus reduce a degree of completion and corresponding automated confidence value in the resulting model of the object, as discussed in greater detail elsewhere herein. In addition, FIG. 2E further provides examples of extraneous objects (in this example, a tree 237 external to the pile, vegetation 238 on the pile, and water 239 adjacent to the pile's boundary with the underlying surface) that for other images, depending on a location of the mobile device taking those images, could obscure a portion of the pile of materials and/or of the toe portion of the surrounding underlying surface, and thus provide other quality problems that similarly reduce an amount of data used to model the object, with resulting confidence reduction in related object attributes (e.g., the object volume). Other such potential blocking objects could include, for example, a human, animal, vehicle, equipment, etc. (not shown) used to create or maintain the pile (e.g., a conveyor belt or crane to carry materials to upper levels of the pile), etc. The puddle or other water 239 adjacent to the pile in a toe portion of the surrounding surface may cause quality problems, as reflections from the water in images could make it difficult to determine the boundary of the object and underlying surface from analysis of those images, and/or the presence of the water may make it difficult to determine a location of the underlying surrounding surface from analysis of those images, such as by reflecting the object or other material. Such quality problems may reduce an amount of data used to model the toe area and/or underlying surface, and thus reduce a degree of completion and corresponding automated confidence value in a resulting model of the toe and/or underlying surface (and thus related object attributes such as the object volume), as discussed in greater detail elsewhere herein. Similarly, missing portion 236 may, if not corrected and/or supplemented in other images, reduce an amount of data used for a resulting model of the toe and/or underlying surface, and thus also reduce a degree of completion and corresponding automated confidence value for object attributes (e.g., object volume). While not illustrated in FIG. 2E, other image problems may occur from an adjacent pile (or other object) that partially overlaps with a portion of the pile of interest, thus causing problems for both toe and underlying surface detection and modeling, and for modeling of the pile itself. In addition, or alternatively, user feedback may be provided to the user based on one or more such detected quality problems with image 205e (e.g., shortly after acquiring the image 205e and/or other related images), such as to indicate one or more of the problems that exist with respect to the FIG. 205e. For example, one or more of a variety of feedback messages may be displayed or otherwise indicated to the user, such as, for example, "user motion too fast", "image contrast too low", "object not centered in image", "mobile device tilted", "obscuring object(s) detected", "obscuring vegetation detected", "adjacent water detected", "overlapping adjacent object detected", etc.

Figure 2F:
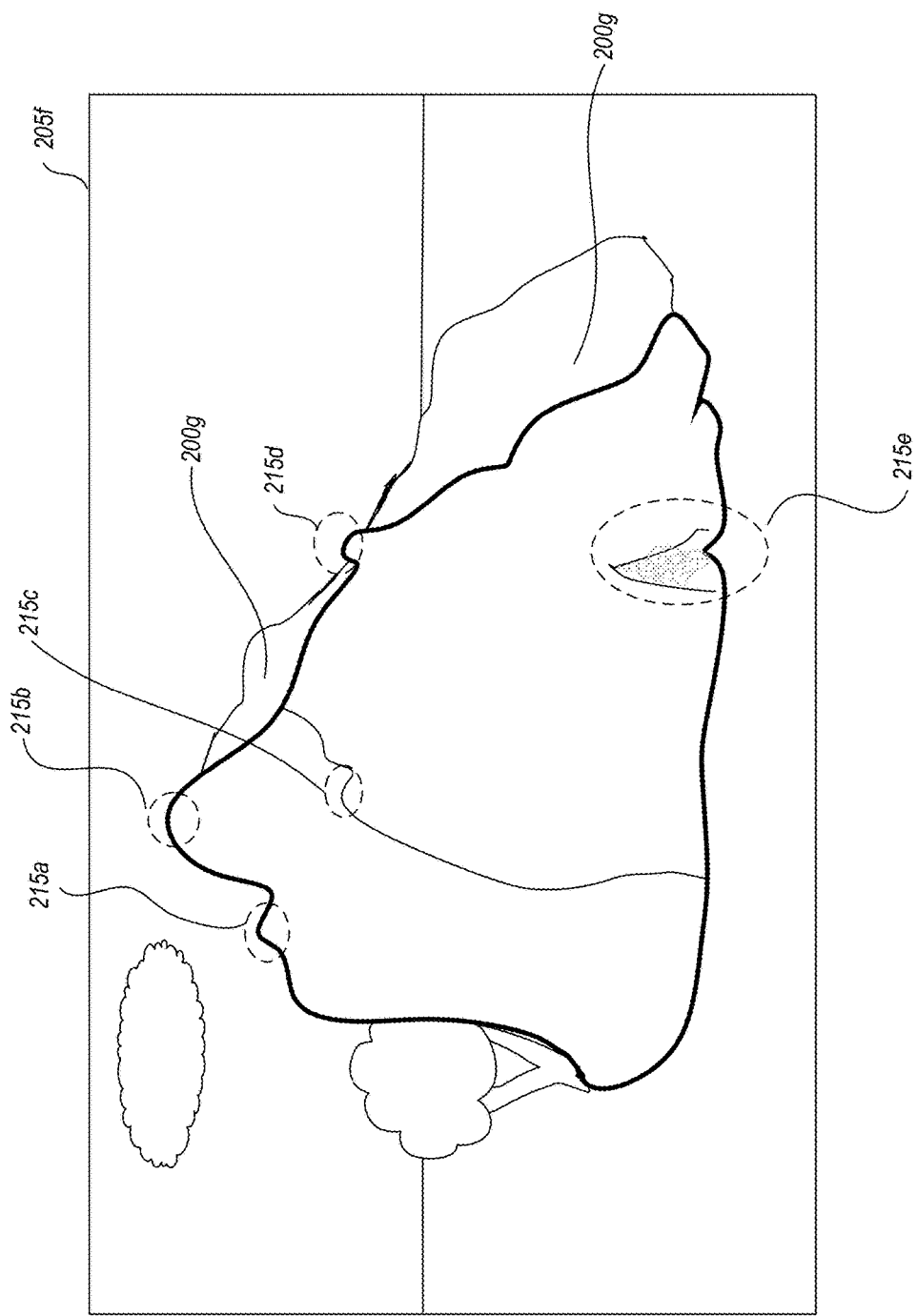

FIG. 2F continues the examples of FIGS. 2A-2E, and in particular illustrates an image 205f. In this example, the image 205f continues to correspond to object 200, but from a different viewpoint than that used for image 205a of FIG. 2A, such as from location 120b of FIG. 1. In this example, all of the features 215a-215e continue to be visible in image 205f, along with an additional portion 200g of the object 200 relative to that of image 205a, based on the change in location.

Figure 2G:
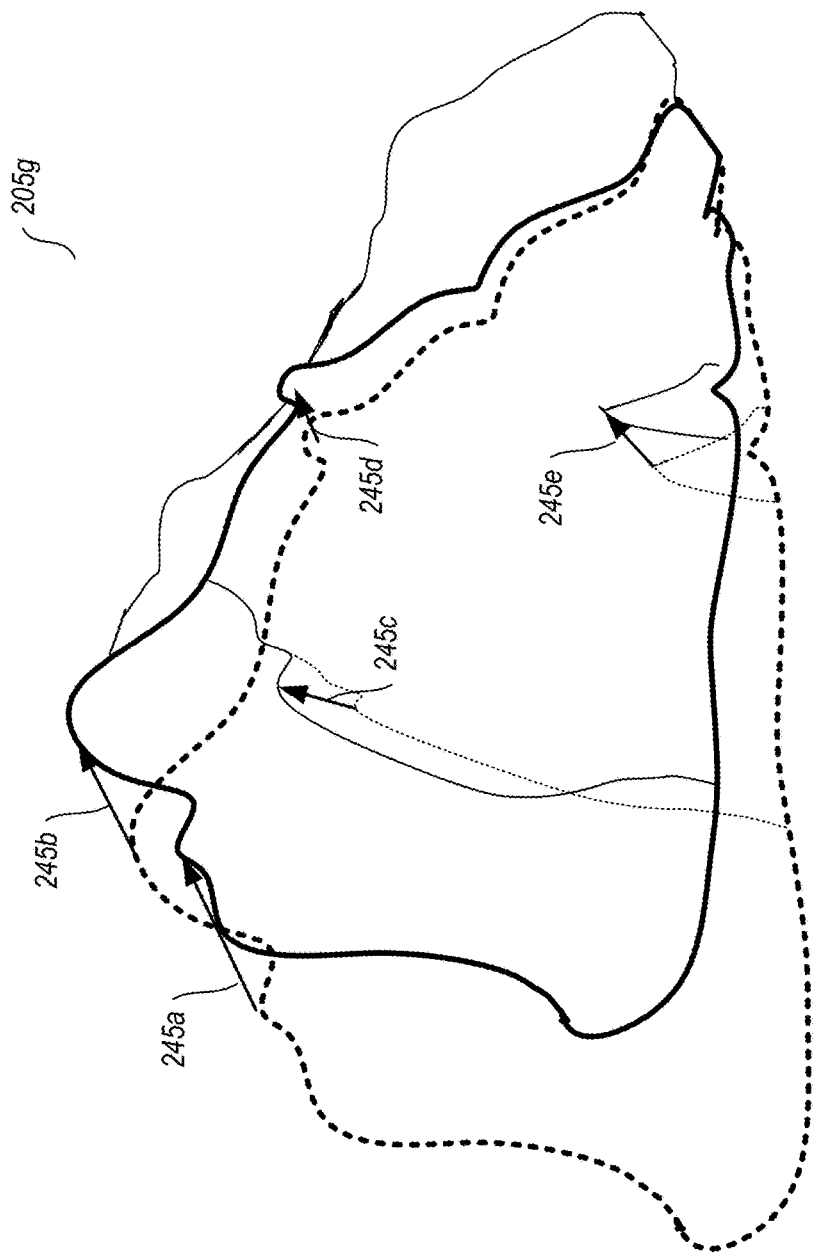

FIG. 2G continues the examples of FIGS. 2A-2F, and in particular provides a view 205g that combines portions of images 205a and 205f of FIGS. 2A and 2F, such as to illustrate relative changes between features 215a-215e from those images. In particular, outlines of the object 200 from both images are shown overlaid on each other in view 205g, with dotted lines being used for the outline from image 205a, and with solid lines being used for the outline from image 205f. In addition, arrows 245a-e have been added corresponding to features 215a-215e, respectively, to show an amount of movement of those features between the two images. Such information may be used in various manners, including to determine an amount of apparent motion between the images (e.g., based on the movement of the mobile device and/or the mobile device's operator), an amount of overlap between images and/or additional portions of the object exterior that may be available from one image to another, etc.

Figure 2H:
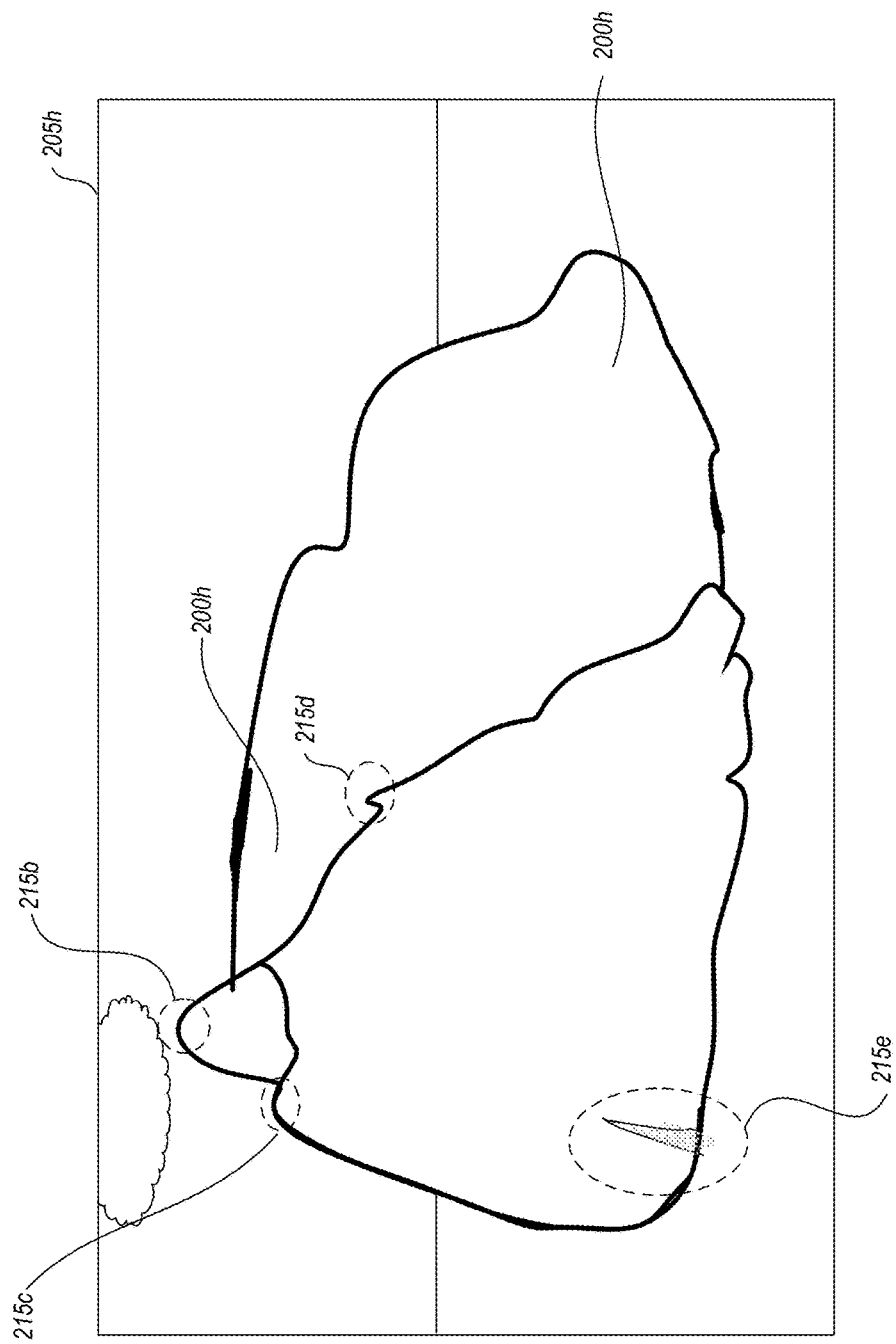

FIG. 2H continues the examples of FIGS. 2A-2G, and illustrates an example image 205h that corresponds to object 200 from an additional location, such as from location 120c of FIG. 1. In this example, it can be seen that feature 215a is no longer visible due to the change in the view, such as based on other portions of object 200 obscuring those features, and additional portions 200h of the object 200 are shown relative to that of image 205a. Accordingly, when selecting images for the group to represent the object 200, and if image 205a is selected as an initial starting image, images 205d, 205e, and 205h of FIGS. 2D, 2E, and 2H, respectively, may not be chosen as a next selected image for the group for different reasons. As previously noted, image 205e may be discarded to its quality problems, while image 205d may not be chosen due to its relative lack of additional information compared to image 205a (due to the small change in location from which the additional image is acquired). Conversely, image 205h may not suffice as a next image in the group after image 205a due to a relative large change in location for the two images, including to lose the ability to map features such as 215a between images 205a and 205h due to the change in location. Thus, in the examples of FIGS. 2A-2H, image 205g of FIG. 2G may be selected as the second image to include in the selected group to represent the object 200, after that of image 205a of FIG. 2A, and additional images may be further selected from other views 200 (e.g., to select image 205h as a next image after image 205g), so as to include further overlapping portions that, in aggregate, include all of the exterior of the object.

More generally, in at least some embodiments, a goal of photogrammetric reconstruction is to take a set of input images that capture a scene including one or more objects of interest, and to recover the geometric and photometric (including hyperspectral information if captured in the images and/or by associated sensors) properties of the scene, as well as the geometric and intrinsic properties of the cameras associated with the input images. The outputs of such a process include, but are not limited to, the following: 3D representation of the scene's geometry and structure; texture and material properties of the scene's contents; 3D camera poses from which the images were taken; and camera and lens characteristics, with such techniques referred to at times as a 'photogrammetric reconstruction pipeline'. Given an input set of images, the first step in the reconstruction pipeline is to determine which images observe common parts of the scene. This can be accomplished through, for example, the use of 2D feature extraction, image retrieval, feature matching, and geometric verification. A goal of feature extraction is to identify distinct 2D locations (keypoints) within an image, and generate unique yet meaningful representations (numeric descriptors) of those locations' appearances in the image. These identified locations are preferably repeatable, such that if the same scene content is observed in another image, the corresponding identified 2D feature locations preferably lie on the same parts of the scene's content. Likewise, the representations of the same scene element preferably have a similar numeric value. Feature detectors to find keypoint locations may identify distinguishable locations such as image or scene corners or points of high contrast to their surroundings. Additionally, they may summarize geometric characteristics of the locally detected area, such as scale, orientation, or skew. Such feature descriptors may, for example, summarize the intensity, gradient, or color of the keypoint's local neighborhood in the image. Once features are extracted from every image, pairs of images are determined that are likely to have the same content, which is accomplished in some embodiments by generating a numeric descriptor that represents the entire image, where the descriptor is typically formed by summarizing the 2D features found in the image, so that only those image pairs with similar global representations may be considered for further overlap verification. Given candidate pairs of images with potential image overlap, the next step in the reconstruction pipeline is to find associations between the 2D features within the images, such as by computing the distance between the 2D feature descriptors' numeric representations, and selecting those pairs of descriptors from opposite images that have sufficiently high similarity, although additional match criteria may be employed in some embodiments to help refine the set of matched features. It will be appreciated that the selection of various images may be performed in various manners and using various techniques, as discussed in greater detail elsewhere.

Figure 2I:
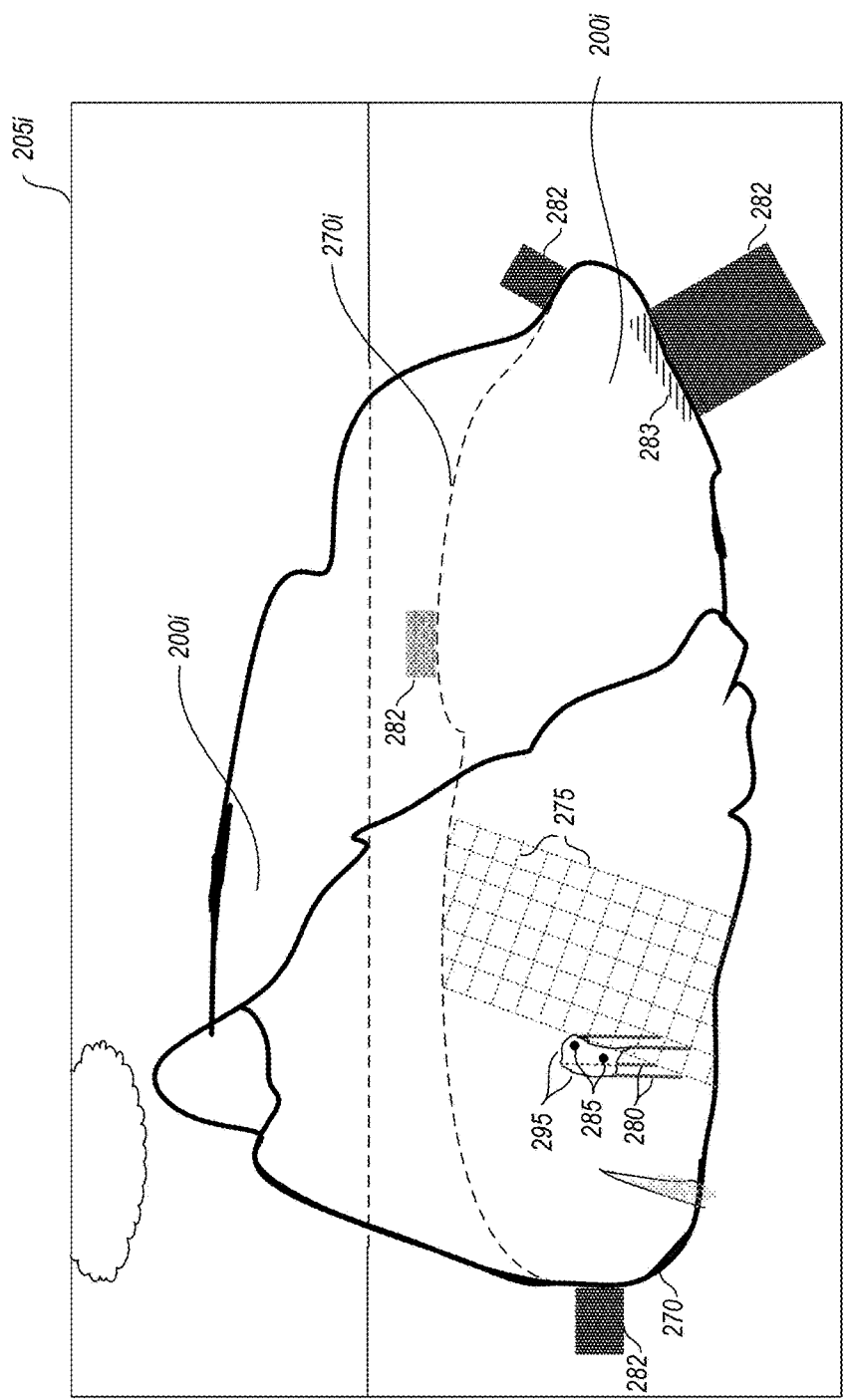

FIG. 2I continues the examples of FIGS. 2A-2H, and illustrates an example image 205i that is similar to image 205h of FIG. 2H, but in which various additional information is illustrated with respect to performing automated verification activities for the computer model(s) of the object and object attribute measurements resulting from the computer model(s). In particular, for the sake of discussion with respect to FIG. 2I, the representation 200i of the stockpile object 200 being modeled represents a rendered surface of a computer model generated from the image data acquired in FIGS. 2A-2H and optionally additional images (not shown) from other vantage points around the exterior of the object, and additional information 275-295 is added in FIG. 2I for the purpose of explaining some of the automated verification activities that may be performed.

As one example of automated verification activities illustrated with respect to FIG. 2I, automated operations may be performed to determine the confidence in a boundary of the modeled object and the underlying surface. In particular, and as discussed in greater detail elsewhere herein, various data points 282 may be acquired from portions of the surface area external to the object (with only partial limited sets of data 282 being shown in FIG. 2I for the sake of illustration), and may be used to generate an initial estimate of a base surface on which the object is situated. With respect to an initial estimate of a boundary or edge 270 of the object (with a non-visible portion 270i being illustrated with respect to the back of the modeled object relative to the current view location), a lower portion 283 of the object above that boundary may be identified (shown in this example for only a small part of the object for the sake of illustration) as part of a search ring in which additional automated operations are performed to refine the edge location and/or identify whether the toe portion of the surface adjacent to the object is likely to be accurately represented as toe (rather than actually as part of the object), such as based at least in part on one or more slope measurements. FIG. 2J illustrates additional example details related to such automated boundary verification activities. Furthermore, in some embodiments and situations, user-supplied information may assist in determining at least some of the boundary or edge 720, such as by a user after images have been acquired (e.g., based on manual input on images displayed via a GUI) and/or as part of the image acquisition process (e.g., by a user directing the image acquisition so that the boundary or edge 720 is at a specified location, such as at the bottom of the acquired images).

As another example of automated verification activities illustrated with respect to FIG. 2I, automated operations may be performed to determine the confidence in data coverage of the modeled object, such as with respect to its surface area and/or volume. In particular, and as discussed in greater detail elsewhere herein, a 2D grid 275 of cells may be generated under the surface of the modeled object (shown in this example for only a small part of the object for the sake of illustration), and a subset 295 of the surface of the modeled object above a particular cell may be examined to determine a quantity of data points 285 that are located in that surface subset 295, although other techniques for representing acquired data and/or data coverage may instead be used in other embodiments. After such operations are performed for each cell, the percentage (or other amount) of cells that are sufficiently supported by image-acquired data may be used as part of determining confidence in resulting surface area and/or volume measurements for the modeled object. FIG. 2J illustrates additional example details related to such automated data coverage verification activities.

FIG. 2J continues the example of FIG. 2I, and illustrates example information 205j that is similar to portions of information 275-295 of FIG. 2H, but in which various additional information is illustrated with respect to performing automated verification activities for the computer model(s) of the object and object attribute measurements resulting from the computer model(s).

In particular, in a manner similar to information 282 and 283 on the lower right side of the object representation of FIG. 2I, related information 282 and 283 is illustrated in FIG. 2J along with additional information 281, 284 and 286-288. The information 282 of FIG. 2J represents a portion of toe surface outside a boundary 281 of a modeled object, and the information 283 of FIG. 2J represents a search ring portion of the modeled object. In this example, contour lines have been added to the search ring portion to provide a visual indication of slope, such that automated assessment and possible refinement of the object boundary may, depending on an amount of slope in an area 284 of lower slope in the search ring (relative to other areas 286 and 287 with higher slope), determine to exclude some or all of the lower-slope area 284 from the modeled object, and move the initial object boundary accordingly, although a revised object boundary is not illustrated in this example. While contour lines are not similarly illustrated for the toe surface 282 in this example, the slope of that toe surface may similarly be evaluated. If particular portions of the toe have a slope that is too high (e.g., relative to a slope, if any, of the overall underlying surface), uncertainty may exist regarding whether those toe portions are actually part of the object, while a sufficiently low slope for other portions of the toe may increase confidence that those toe portions are correctly identified as being external to the object. While particular low-slope and/or high-slope portions of the toe portion are not identified, a subset 288 of the object boundary has been identified as being a portion with associated toe surface that is either sufficiently low to affirm that boundary portion (e.g., as being a "good" boundary) or sufficiently high to disaffirm that boundary portion (e.g., as being a "bad" boundary). When performed for all portions of the modeled object's boundary, a corresponding percentage or other amount of the boundary that is affirmed (or is not affirmed) may be calculated, and used to determine verification (or lack thereof) of the modeled object's boundary and resulting object attribute measurements, such as by determining whether that percentage or other amount satisfies one or more corresponding boundary accuracy thresholds.

In addition, and in a manner similar to the information 275, 280, 285 and 295 of FIG. 2I, related information 280, 285 and 295 is illustrated in FIG. 2J along with additional information 277 and 278a-278g. In particular, the cell 277 of FIG. 2J represents a particular cell in the grid 275 of FIG. 2I, the area 295 continues to represent a portion of the surface of the modeled object above that cell 277, and the data points 285 continue to represent image-acquired data that provide coverage of that surface portion 295. In this example, the column above the 2D cell 277 has further been separated into multiple 3D cells, with the indicators 278a-278g showing the upper boundary of each successive 3D cell in the column from bottom to top. In this example, the surface portion 295 extends through 2 of the 3D cells with upper boundaries 278*d* and 278*e*, and with the 3 3D cells with upper boundaries 278*a*-278*c* being fully below the surface portion 295. The 3D cells of FIG. 2J may be used in some embodiments as part of determining a confidence in sufficient data coverage for a volume measurement for the object. For example, if the data points 285 are determined to be sufficient data coverage for the surface portion 295, the corresponding volumes of at least the 3 3D cells with upper boundaries 278*a*-278*c* may be affirmed as being sufficiently verified, and optionally some or all of the 2 enclosing 3D cells with upper boundaries 278*d* and 278*e* may similarly be marked—alternatively, if the data points 285 are determined to not be sufficient data coverage for the surface portion 295, the corresponding volumes of those 3-5 3D cells may be disaffirmed as not being sufficiently verified. When performed for all 3D cells under the modeled object's surface, a corresponding percentage or other amount of the volume that is affirmed (or is not affirmed) may be calculated, and used to determine verification (or lack thereof) of the modeled object's volume measurement, such as by determining whether that percentage or other amount satisfies one or more corresponding volume data coverage thresholds. As discussed in greater detail elsewhere herein, other embodiments may determine sufficient data coverage for such 3D cells in other manners, including based on an individualized probability that is determined for each cell of it being sufficiently covered by the image-acquired data.

As noted above, once a set of images to represent a pile or other object (e.g., a structure) are selected, they may be analyzed to generate a 3D model of the object, such as a 3D point cloud, and such techniques may further be used to model multiple piles or other objects at a common site. In some embodiments, an automated above-ground object extraction method (e.g., for stockpile extraction) starts with a 3D point cloud of a surveyed site (e.g., a bulk materials site for stockpiles), and proceeds as follows. An automatic classifier is used to label points as either object (example described here is a pile), near ground (ground close to object) or far ground (ground farther away from the object). After classifying points, the labeled points are placed in a grid, and each grid cell is analyzed with respect to a threshold according to its likelihood of being a near, far or in-between ground point. Points that are more than likely ground and form large contiguous areas are candidate ground areas. A region-growing operation (e.g., a flood fill operation) is used to filter out ground points that are mislabeled (e.g., on the tops of buildings or other tall, flat objects). Finally, ground points that are within the filled, contiguous ground areas and have probability of being ground greater than a threshold are selected. Although a grid is used to accumulate probability information from multiple points in a given location in this example, other approaches are possible, such as continuous spatial probability representations, extremely fine grids where each point contributes probability in its local neighborhood with the contribution of a given point falling off the farther the grid cell is from the point, etc. A multi-resolution, nonlinear optimization is then used to fit a (gridded) point surface to the filtered ground points, although other techniques may be used in other embodiments, such as a parametric surface fit to the points. The ground surface finding approach used in this example extracts the ground surface from the (labeled) point cloud, using constraints for the optimization that encourage the surface to be close to the filtered ground points in height, smoothly vary and to be below the point cloud (it will be appreciated that in the absence of a constraint to be below the point cloud, fitting a surface to the ground points may allow the surface to pass through and over the point cloud in areas with large terrain height variation). The (multi-resolution) surface fitting used in this example first fits a surface with a larger point spacing to the points and then does a second fine grained surface fit, with the low resolution surface fit allowing the method to quickly converge to the gross shape of the site at a low computational cost, and the final, high resolution fit filling in the details. In other embodiments, a single step may instead be used, with a high grid resolution fit that is typically computationally expensive because the propagation of the height corrections between distant points takes more iterations of the solver than performing it hierarchically. Points may be present in the surface around the boundary of the site, which are constrained by smoothness in the optimization—such points are used in the next phase to force the pile surface to meet the ground outside of the reconstructed area, ensuring that no volume is added by the difference in the surfaces outside of the reconstructed area. Now that a ground surface exists, the pile surface is calculated. Taking the difference of these two surfaces provides the pile height. The same (multi-resolution) non-linear optimization is used in this example to fit the pile surface as the ground surface, with the boundary points from the ground surface being added here as constraints to the pile surface. These point constraints at the border penalize the pile surface deviating in height both above and below the ground surface points and force the two surfaces to have the same height outside the reconstructed area.

Alternatively, when calculating statistics about the extracted piles, one could mask out any points outside the reconstructed area to achieve a similar purpose. It is preferable to ensure that only 3D points within the reconstructed point cloud are used in visualization, generating summary statistics such as volume, etc. The final stage in stockpile extraction is to subtract the pile and ground surfaces to get an above bare earth height map of the site, with all of the connected components higher than a threshold level being found, and a watershed algorithm then used to extend these connected components down until they either run into each other or would grow into a region lower than a minimum height threshold. A final classification is performed based on pile boundary shape and color to exclude non-pile components, as certain parts of a site might not be used to store stockpiles. For example, a company may have a policy to never store stockpiles pushed up against safety berms or high walls, and if so, a geo-referenced storage area mask may be used along with geo-referencing data in the point cloud to exclude contours that could not be piles. In cases in which two materials are stored together in a stockpile that runs together, the piles may be separated in various manners (e.g., based at least in part on feedback or instructions from a human operator regarding how to separate out the piles) or instead treated as a single combined pile. Another possibility is to use a machine learning method, e.g. classifier, leveraging texture from the original images and the camera poses found in object from motion to separate out these piles—this would involve training a classifier to find separate piles in the images and then back projecting those pile outlines onto the 3D point cloud. Additionally, if prior data about the site is available (such as a bare earth model, geo-referenced material mask, geo-registered labeled point cloud, etc.), it may be incorporated into the final ground/pile/other classification. More specifically, once a site has been labeled, future collects of that site can be aligned into the same coordinate system of this dataset (as discussed elsewhere herein), and then benefit from that initial labeling when attempting to determine the point classification of those future collects.

FIGS. 10A-10J and 11A-11K provide additional example details related to automated data analysis activities for determining and tracking information about changing object measurements over time, such as based on differences in different computer models generated for an object for different times, and for displaying and controlling information about changing object measurements over time, as well as other information about particular example embodiments. Various details are included in the example embodiments described below with respect to FIGS. 10A to 11K, but it will be appreciated that other embodiments may differ in various manners from these examples. In addition, further details related to some aspects of generating and verifying computer models are included in U.S. Provisional Patent Application No. 62/467,692, filed Mar. 6, 2017 and entitled "Determining Changes In Object Measurements Over Time Using Mobile Device Images," which is hereby incorporated by reference in its entirety, including with respect to FIGS. 10-1 to 10-25 and 2K1-2M and corresponding text in that application.

In the examples discussed with respect to FIGS. 10A to 11K, the automated MDIA system captures, identifies, analyzes, quantifies and presents to a user the dynamic change of a temporally surveyed site, such as a bulk materials storage site with one or more pile objects monitored over time. The MDIA system allows users to frequently, or in some cases continuously, update a representation of their storage site, extract information about the state of their site, and monitor changes to their site. The monitored site information (e.g., geometry, material, semantic change, etc.) may include, but is not limited to, the volume or tonnage of the different materials stored, their location, their 3D shape, temperature, moisture content and material type (e.g., sand, gravel, topsoil, pine bark, etc.).

The described techniques provide a complete solution to align in 3D the different site representations over time and/or the captured images over time, detect changes in 3D representation, texture or other quantities of interest, and form associations between bulk material stockpiles over time. The described techniques further provide functionality for visualizing changes in stockpiles or other objects, providing insights into how a user's inventory changes as they add, move and remove material.

Attempts to manually handle large and frequent data collects (or collections) are not successful, as adding a temporal dimension multiplies the data volume by the temporal capture frequency. Instead, the described automated techniques allow such functionality to be provided, including in at least some embodiments by using machine learning techniques to automatically extract stockpiles from 3D point cloud(s) and its associated images with camera calibration (rotation, translation and intrinsic calibration) that is known or determined (e.g., via autocalibration). Thus, use of these described techniques enable high frequency monitoring of temporally surveyed sites, such as bulk material site(s), to identify, understand, quantify, analyze, and present to a user its changes over time.

When a user captures imagery of the same location over time, the captured information can be leveraged to perform temporal analysis. In the context of a site with various stockpiles of material (such as an aggregates, mulch, or construction site etc.), or a pit from which material is being extracted, this analysis and/or visualization may include, but is not limited to, the following: detecting and quantifying the change in volume of the stockpiles; analyzing the progress of material being removed from a pit, and measuring its fill volume; and tracking the location and movement of material across the site.

Figure 10A:
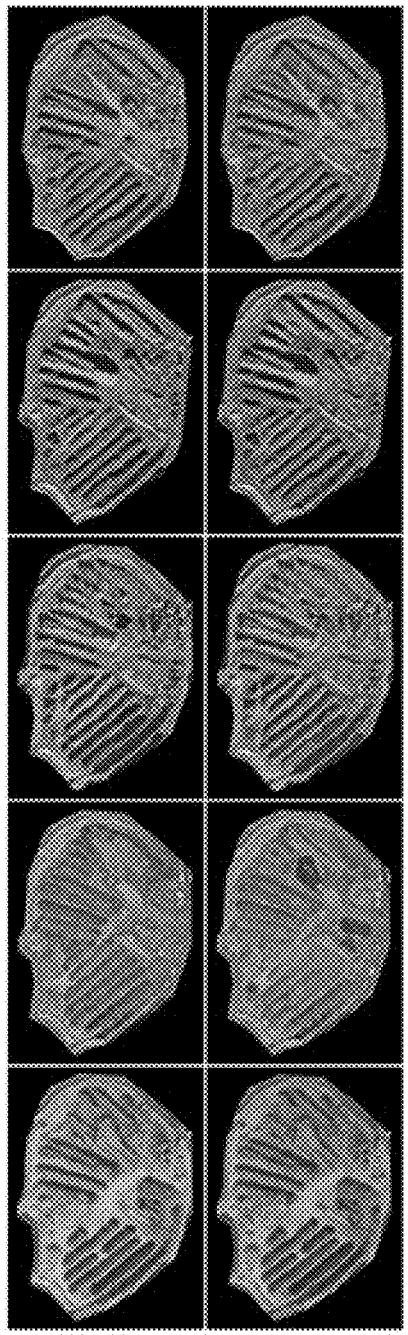

FIG. 10A provides an example visualization that can be performed when the temporal dynamics of a site are analyzed. Here, the top row of images denote several image collections (or "collects") of the same site on different dates, where the sites have all been registered into the same spatiotemporal space. The bottom row indicates the relative change that has occurred on the site since the previous dataset. Areas of the site that have increased in elevation are colored green, while those areas that have decreased in elevation are colored red. The saturation of the color provides an indication about the magnitude of the elevation difference.

In order to compare images and/or resulting generated 3D computer models for two different times to provide such a comparison, the images and/or models are first determined to correspond to the same one or more objects, and are aligned (also referred to as "registered") so that particular features or portions of the object(s) are associated together in the different images and/or models. Such techniques may include aligning all of the captured images into a common 3D coordinate system, and then analyzing the differences between different sets of images and/or their resulting computer models, where each set was captured at a common time. By aligning the images in a common 3D coordinate system, the reconstructed 3D models may be used to provide a foundation on which reasoning and analysis is performed.

Preprocessing

To prepare a dataset for inclusion in the temporal analysis, it is first reconstructed to determine the relative poses of the images and the relative location of the site's geometry. To do so, a photogrammetric reconstruction pipeline is described herein that generates a 3D representation of the scene's geometry (e.g., sparse or dense point cloud, triangle mesh, surface or volumetric representation, etc.). Additionally, 3D camera poses and their correspondence with the representation of the scene's geometry may optionally be used.

Figure 10B:
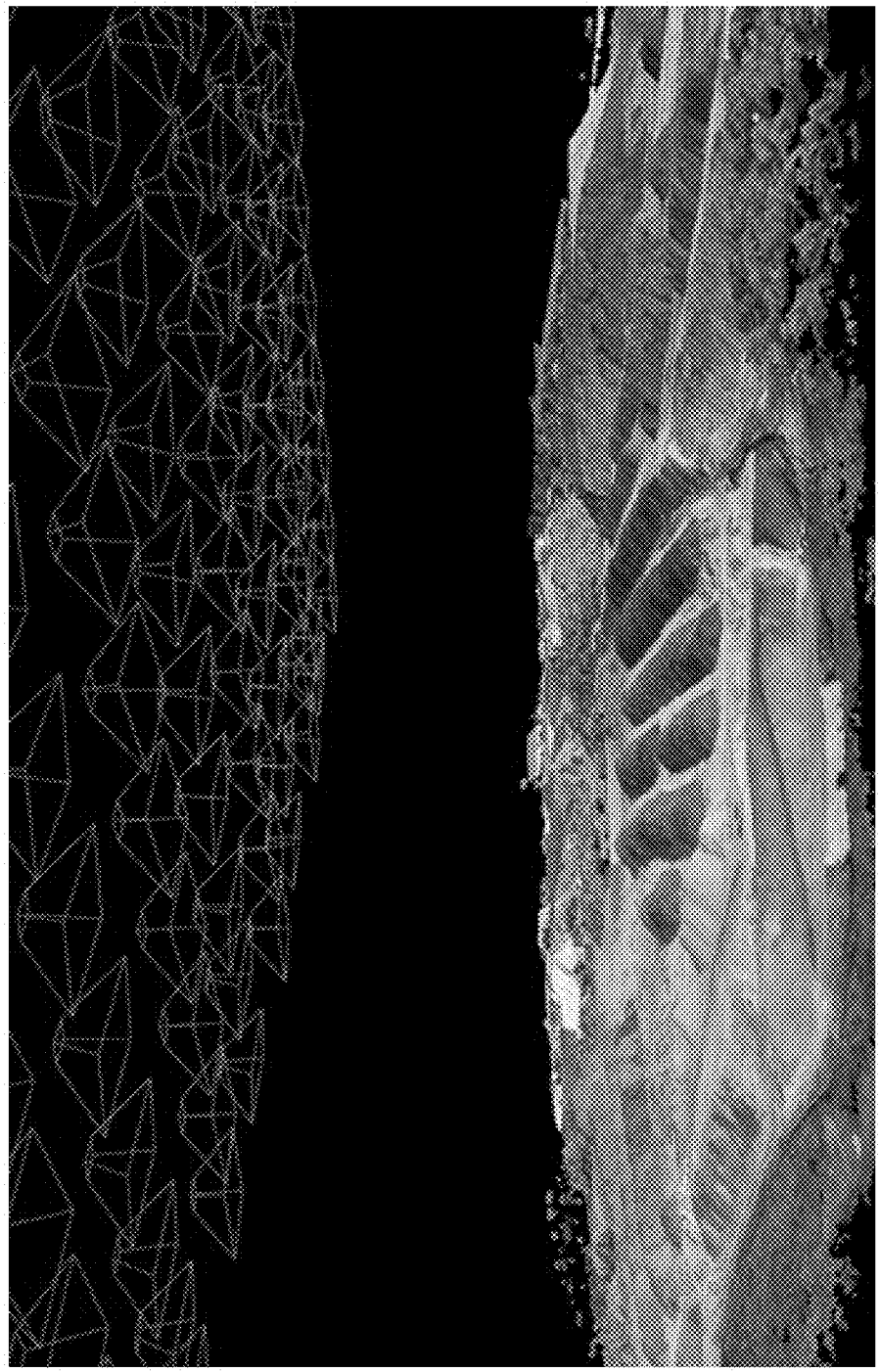

FIG. 10B illustrates an example component of the input 3D reconstruction. Shown here is the dense point cloud of the site (bottom) as well as the relative poses for the cameras (green pyramids at top).

Reconstruction Alignment

In at least some embodiments and situations, including situations in which multiple objects are co-located near each other at a single site, an object being captured in multiple images may need to be identified, such as to distinguish it from other nearby objects. Such object identification may be performed in various manners based at least in part on an analysis of the images, including to compare object information in the images to object information in other previously acquired images at a different time (e.g., to determine that the object visually represented in the images is a same object as the object visually represented in the other previously acquired images), compare object information from a computer model generated from the images to object information in one or more other previously generated computer models from other images (e.g., to select one or more other such computer models as matching or otherwise corresponding to a currently generated computer model, such as to determine a match between two computer models using at least one of location, a type of material, an appearance feature between the first and second computer models, a structural feature between the first and second computer models, a shape of the objects, etc.), etc. Additional details are included below related to identifying an object captured in one or more images.

Given multiple independent 3D computer model reconstructions of a single object or the same site (each captured at a different point in time), they are next aligned into the same coordinate system. This may be implemented as a multi-step process, which includes the following: optionally determine an initial, approximate alignment between the sites; find corresponding locations between the geometry of the sites for which corresponding portions of the 3D computer model reconstructions are associated; optionally identify planar ground regions within the sites; and estimate a smooth warping to finely align the sites using the constraints provided by site-to-site correspondences and planar ground regions. If performed (e.g., depending on the availability of data), obtaining an initial alignment of the sites simplifies later processing. For two or more generated computer models, their alignment may be performed in various manners in various embodiments, including one or more of the following: associating multiple corresponding portions of the first and second computer models together based at least in part on determining relationships between the multiple corresponding portions; determining and matching three-dimensional locations of points for the object(s) represented by the computer models (e.g., such that matching locations are within a defined distance threshold), such as by analyzing location information associated with images used to create the models and/or retrieving location information associated with predefined additional ground points visible in such images and/or identifying and matching regions with multiple locations in the images and/or resulting computer models; determining and matching one or more appearance features visible in such images and placing appearance features that correspond with each other in different computer models at same locations in one or more coordinate systems used for the computer models (e.g., for appearance features on the surfaces of the objects, for predefined points visible in the environment around the object, for planar ground areas in the environment having corresponding shapes, etc.); etc. In addition, one computer model may be deformed or otherwise transformed to match another similar computer model (e.g., for the same object at different times), including to do one or more of the following: use constraints identified for one or both computer models during an initial alignment to modify at least one of a shape or location of the one of the computer models to correspond to the other of the computer models as a final alignment; determining locations and orientations of one or more devices used to acquire the images used to create at least one of the computer models, and altering such determined locations and orientations to minimize re-projection errors of portions of a computer model resulting from those images; etc. Furthermore, in at least some embodiments two or more of the object identification and computer model generation and computer model alignment are performed together at substantially the same time, including in situations in which images are received with geotags or other location information that enables at least initial or tentative object identification and/or alignment from such location information (e.g., based at least in part on relationships determined between corresponding portions of the resulting generated computer models). Additional details are included below related to performing alignment of at least two computer models.

Initial Alignment—Image Geotags

For example, if image geotags are available (such as those often embedded by commercial unmanned aerial vehicles), then an initial alignment can be obtained by rigidly transforming the 3D reconstruction, such that the recovered camera poses closely match their corresponding geotags. This rigid alignment is achieved using, for example, a robust estimation method (such as, but not limited to, RANSAC, MLESAC, Hough transform, or their many variants) that estimates a similarity transform between the recovered 3D camera positions and the 3D coordinates represented by the image geotags. If the robust method fails (e.g., if the geotags are sufficiently noisy), then a least-squares approach can be leveraged to obtain an approximate alignment between the cameras and their geotags. An alternative strategy would be to use an iterative approach to alignment, leveraging such techniques as ICP or non-linear refinement.

Figure 10C:
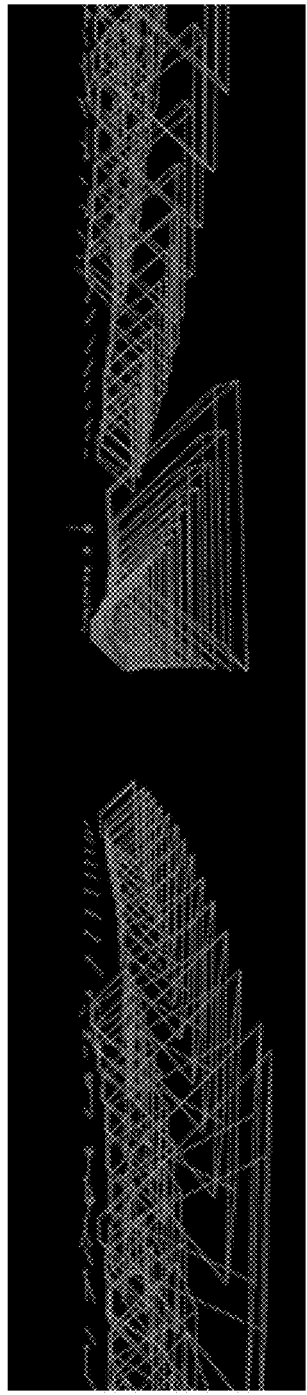

FIG. 10C provides an example of an initial alignment obtained by image geotags. Here, each camera position (green pyramid) is associated with its GPS position (magenta circle) in order to estimate a similarity transform to align the sets of coordinates.

Once an initial, rigid alignment is achieved, a refinement may be performed that allows the 3D reconstruction to deform slightly to better align with the geotags (e.g., remove curvature, adjust scale, modify camera intrinsics, etc.). Note that this initial refinement is optional, but often helps with the convergence behavior of the refinement. The refinement is formulated as a non-linear error mitigation, e.g. a bundle adjustment, where the residual is computed as a camera position's radial deviation from the trajectory defined by the sequential geotag positions. Other possible residuals are a camera position's absolute deviation from its associated geotag, a weighted distance between the positions based on a priori or measured insights into the error distribution of the GPS measurements, or other strategies that seek to combine the 3D reconstructed camera positions with image geotags in order to create a more accurate solution.

One possibility of the non-linear error mitigation method is a trajectory-based approach, such as to take the form of defining the error in terms of a camera's radial deviation from the trajectory defined by the sequential geotag positions. To define the trajectory, linear segments of the camera's path are identified by finding three consecutive camera poses that are roughly collinear (enforcing a similar direction of flight). Additionally, a constraint may optionally be imposed that the cameras' associated geotags should also be roughly collinear. For each of these 3-camera segments, a residual measurement for the middle camera's position is added, which measures its radial deviation from the line segments between the first and second, and second and third cameras' GPS positions. For camera positions falling outside the line segments, radial constraints may optionally be imposed with respect to the endpoints of the line segments.

When forming the trajectory-based approach, parameters may be added to the optimization that model an airframe bias (structured error in the GPS positions relative to the camera's pose, and optionally, direction of movement). Additionally, a GPS bias may be modeled that may occur when the GPS receiver is turned off and then back on again (which results in a structured error for each separate flight of the site).

This trajectory based approach is one specific example, and could be reformulated to model a smoother camera trajectory, incorporate other measurements from sensors (such as ground-based tracking units, inertial sensors on the camera's platform, etc), or other modifications.

Initial Alignment—Ground Control Points

If image geotags are not available, known ground control points (GCPs) within the site can alternatively be leveraged.

These ground control points have a known GPS position and unique appearance (typically high-contrast targets that have been permanently placed on the site and surveyed). Thus, by identifying the 2D observation position of these ground control points in the images, the GCPs' positions within the site may be triangulated. Then, a rigid similarity transform is estimated between the triangulated GCP positions within the site and their known GPS coordinates. Here, a robust estimator, e.g. a RANSAC-based method, can again be employed, as it effectively deals with outlier measurements.

To identify the 2D observations in the image, an automatic method may be used that attempts to detect the GCPs' unique appearance in the image. Alternatively, a human-in-the-loop approach could be employed in some other embodiments, where a user can manually supply this information, e.g. by clicking on the GCPs' positions within the images.

Given this initial rigid alignment, the solution is further refined by utilizing a nonlinear error mitigation, such as a bundle adjustment operation, which minimizes the distance between the triangulated GCP positions and their known GPS coordinates. This could additionally be reformulated as minimizing the reprojection errors between 2D observations of the 3D GCPs' positions, or other strategies which seek to generate an accurate alignment between the 3D reconstruction and known (geotagged) locations within the scene.

Figure 10D:
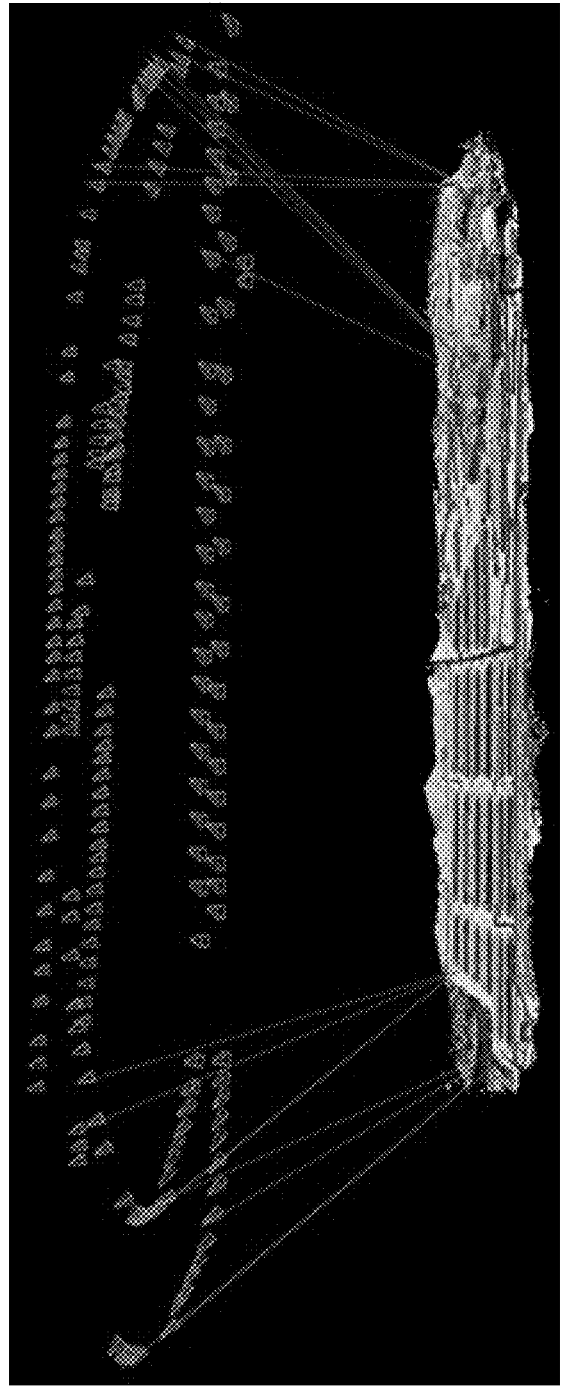

FIG. 10D illustrates example ground control point observations. Red lines denote the viewing rays along which the ground control points on the site were viewed in the images (green pyramids).

Initial Alignment—Image and Geometry Descriptors

If both geotags and ground control points are unavailable, another method may be used to align a site to a reference 3D reconstruction of the location, by attempting to find correspondences between 2D image-based features or between parts of the 3D geometry. To find these correspondences, image-based or geometry-based descriptors are used. A descriptor is a numeric representation of the local 2D or 3D neighborhood of a point, and summarizes such things as texture, curvature, variance, and other local characteristics, e.g. depth, etc. Once a set of descriptors is created for each dataset to be aligned, similar descriptors (candidate correspondences) are found by comparing the numeric representations of those descriptors, and selecting those that are most similar. These candidate correspondences are then filtered using a robust estimator, for example a RANSAC, for a (piecewise or smooth continuous) 3D similarity transformation estimation phase. The resulting transform is then used to approximately align the datasets.

Figure 10E:
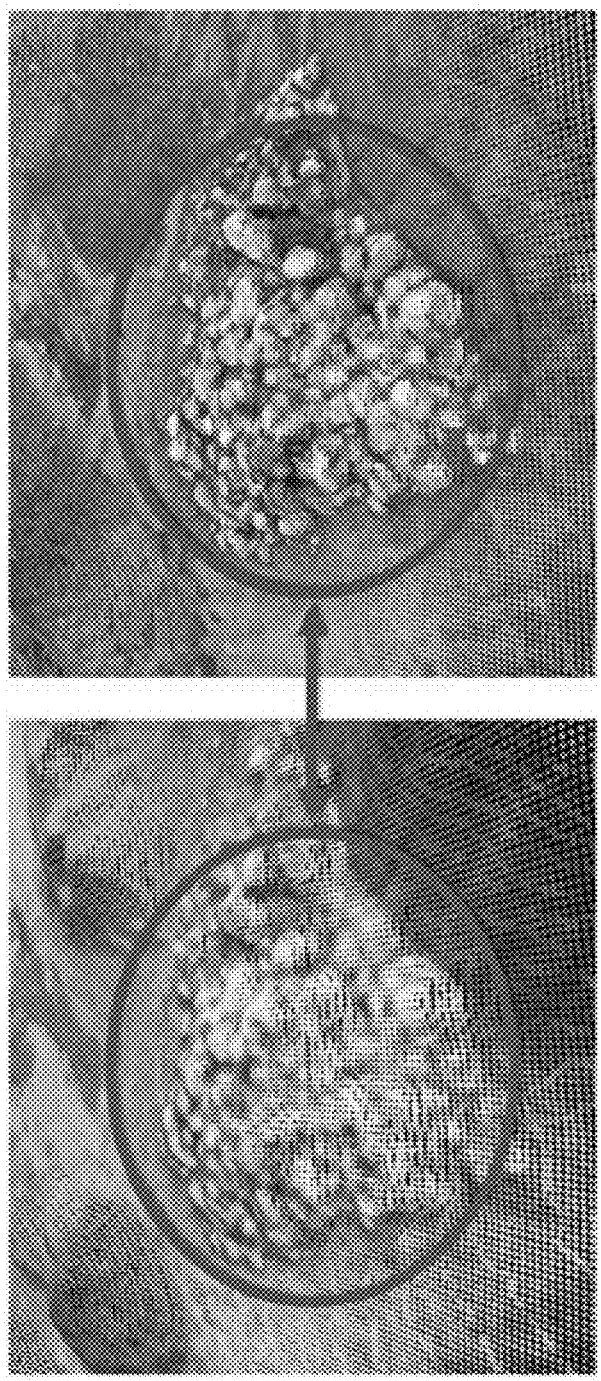

FIG. 10E illustrates an example part of the site that has not changed between two collects. This pile of rocks exhibits a unique appearance and 3D shape, and the resulting descriptors would be highly similar.

Site Correspondences

This phase detects corresponding parts of the site that have not changed, and forms a set of constraints to use to align those parts of the site together. While ground control points and geometry descriptors fall into this category of site-to-site correspondences, this step preferably finds a significant number of these correspondences, with these correspondences being as accurate as possible.

To do so, patches of unique geometry are first identified within the currently reconstructed site. Here, the uniqueness of the patch refers to the characteristic that it is unambiguous in its shape, and has no rotational or translational symmetry (a planar patch would be ambiguous). This uses a 3D region of interest detector, which identifies parts of the geometry with high curvature along multiple axes.

Once a set of these geometry patches are identified, they are independently aligned to the reference site's reconstruction, using an alignment transform estimator, for example the iterative closest point (ICP) algorithm. Here, ICP is initialized using the alignment found in the initial alignment phase. Other (robust) estimators may similarly be suitable to perform this task.

Once ICP converges, the quality of the patch's alignment is scored. As the goal is to identify parts of the site that have not changed, alignments of patches where any part of the patch deviates significantly from the corresponding patch in the reference dataset may be rejected—if so, only those patches that maintain a very close alignment across the entire patch are retained as valid correspondences.

An additional way to find correspondences would be the image and geometry descriptors from the previous stage of initial alignment estimation. Both method can be employed in parallel, or either one alone may be used, although the ICP based patch alignment may provide finer control on the ability to reject patch correspondences that do not exactly align.

FIG. 10F illustrates example corresponding patches for two sites, where the patches have very close alignments. Corresponding patches are denoted by circles of the same color.

Planar Ground Detection

While the site correspondences discussed above define direct one-to-one mappings between unique parts of the sites, no constraints were added in those examples for large planar regions such as the ground. However, in the final alignment of the sites, one would expect that the ground surfaces should align closely or perfectly (assuming that they haven't changed). Toward this end, a further optional step to the alignment pipeline may explicitly detect the ground of the site, and constrain it to align with the ground of the other site, or more generally align temporally invariant surfaces or scene elements to each other.

To initially identify the ground in both datasets, a ground detection routine may be used, as discussed below with respect to automatic pile extraction techniques. Then, regions of the site where the ground has not changed are found, so that their alignment can be later enforced. To find these unchanged regions, both datasets are scanned, and any ground points that do not have a sufficiently invariant local neighborhood are removed, e.g. for stockpile sites locally planar surfaces. In general, the invariant surface characteristics will vary with the application area, and can be objects or natural features in the environment. Given the resulting regions of invariant points, the intersection of these regions are found (those parts of the site that are planar in both datasets)—this intersection leverages the initial approximate site alignment found earlier in the alignment pipeline. While the initial alignment may have some registration error, as long as that expected error is no greater than the radius of the local invariant region, e.g. local planar region, then a valid alignment can still be found between the intersecting regions (and their invariant neighborhoods).

FIG. 10G illustrates an example illustration of corresponding ground regions between two datasets.

Final Alignment

Given the previous detections of correspondences between two sites and their resulting 3D computer models, either through local geometry alignment or local planar regions, these correspondences are formulated as constraints within a bundle adjustment operation. The goal is to deform one dataset such that it aligns with a previously determined reference reconstruction of the site. This reference reconstruction can be the first reconstruction of the site, any later reconstruction, a 3D representation of the site obtained from other techniques, etc. The reference reconstruction may additionally be augmented with reference measurements such as ground control point constraints, distance or angular measurements between fixed objects, or constraints which limit the scene's geometry. However the reference reconstruction is determined, it provides a coordinate system with which the current reconstruction will be aligned.

Using the site correspondences, they are parameterized as constraints in non-linear error mitigation, e.g. bundle adjustment, by minimizing the residual between the corresponding locations (this can be formulated as a distance, angular, or other error measure). For improved accuracy, surface characteristics such as geometric normals and local neighborhoods may be incorporated. For example, instead of utilizing point-to-point distance constraints, point-to-plane constraints may be leveraged, where a point in one dataset should lie within the local planar neighborhood of the other dataset's surface representation. Similar to the site correspondence constraints, the coplanar ground constraints may be formulated as minimizing a residual function, which seeks to achieve an accurate alignment between two roughly locally planar neighborhoods of the corresponding 3D representations. One way in which this can be formulated is in point-to-plane, or plane-to-plane distances, which minimize the deviation between the two local surfaces.

During this deformation process, discontinuities, or large, exaggerated transforms, are avoided, such as by imposing a smoothness constraint on the deformations that are possible. To efficiently and compactly represent this smoothness constraint, deformation amounts (magnitudes and directions) may be estimated only at vertices of a large, fixed 3D grid (where grid cells are typically 10 to 50 meters on each side). Given these deformation vectors defined on a regular grid, they may be smoothly interpolated in 3D to define the currently estimated deformation at every point in 3D space for the site. Thus, when constructing the non-linear, e.g. bundle adjustment, based alignment, the possible motion of the scene's geometry is parameterized using this regular grid of deformations. Alternatively, smoothness can be enforced explicitly through smoothness constraints (where neighboring deformations should be similar), through sparsity constraints (where points of inflection or surface variation should be sparse in their arrangement), or through other techniques which constrain the realm of possible scene deformations. Additionally, instead of representing the scene's deformation as an explicit deformation field, the scene's geometry may instead be allowed to deform, and constraints on the scene's connectivity, curvature, and other characteristics may be imposed to limit the amount of deformation that is permissible.

Figure 10H:
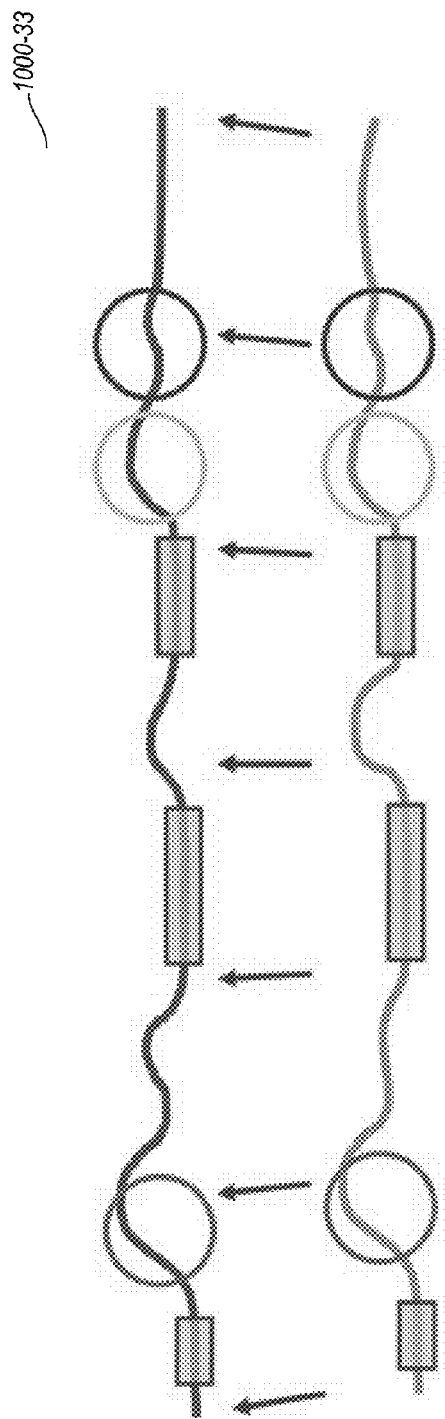
Figure 11A:
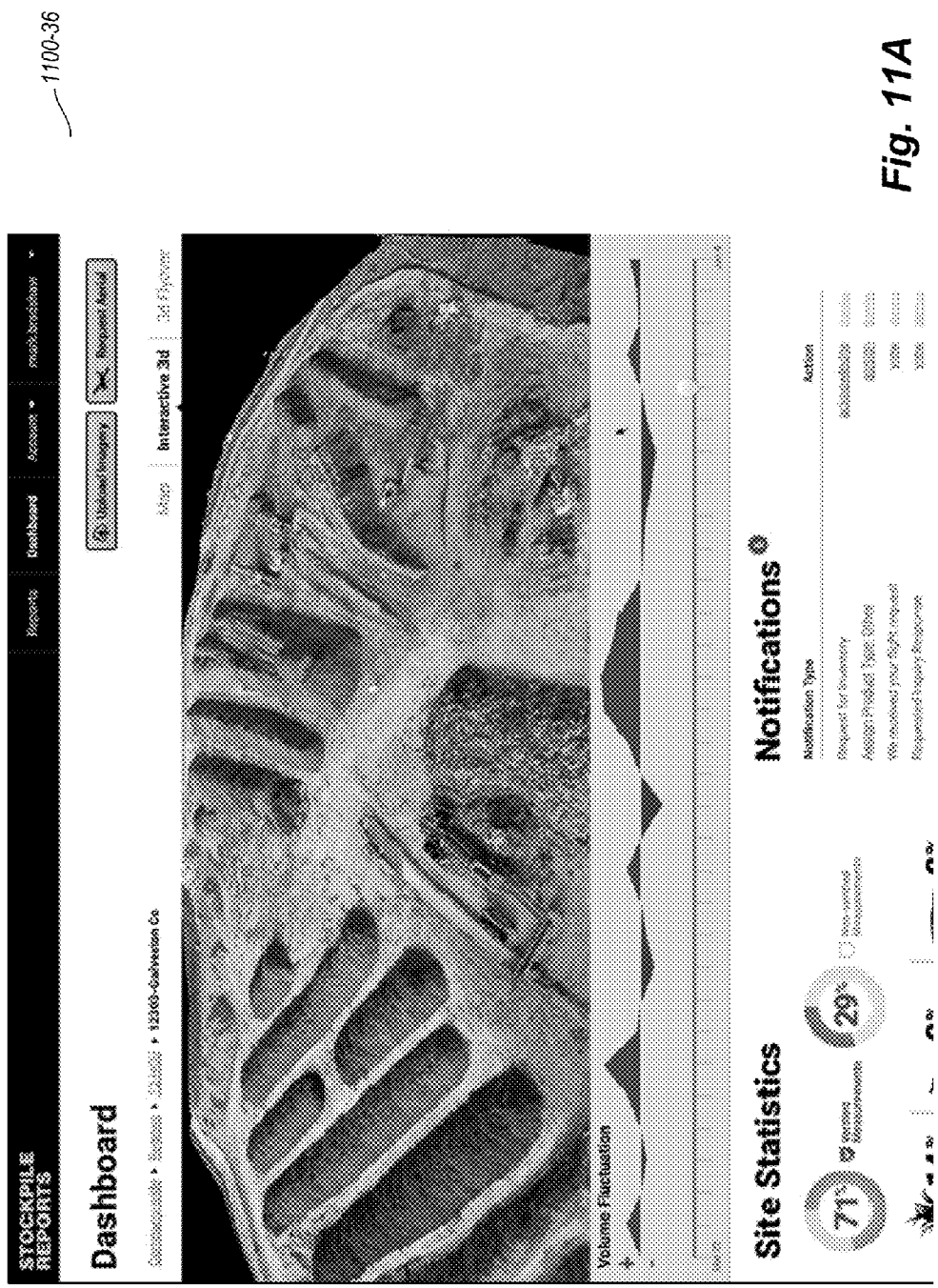
Figure 11B:
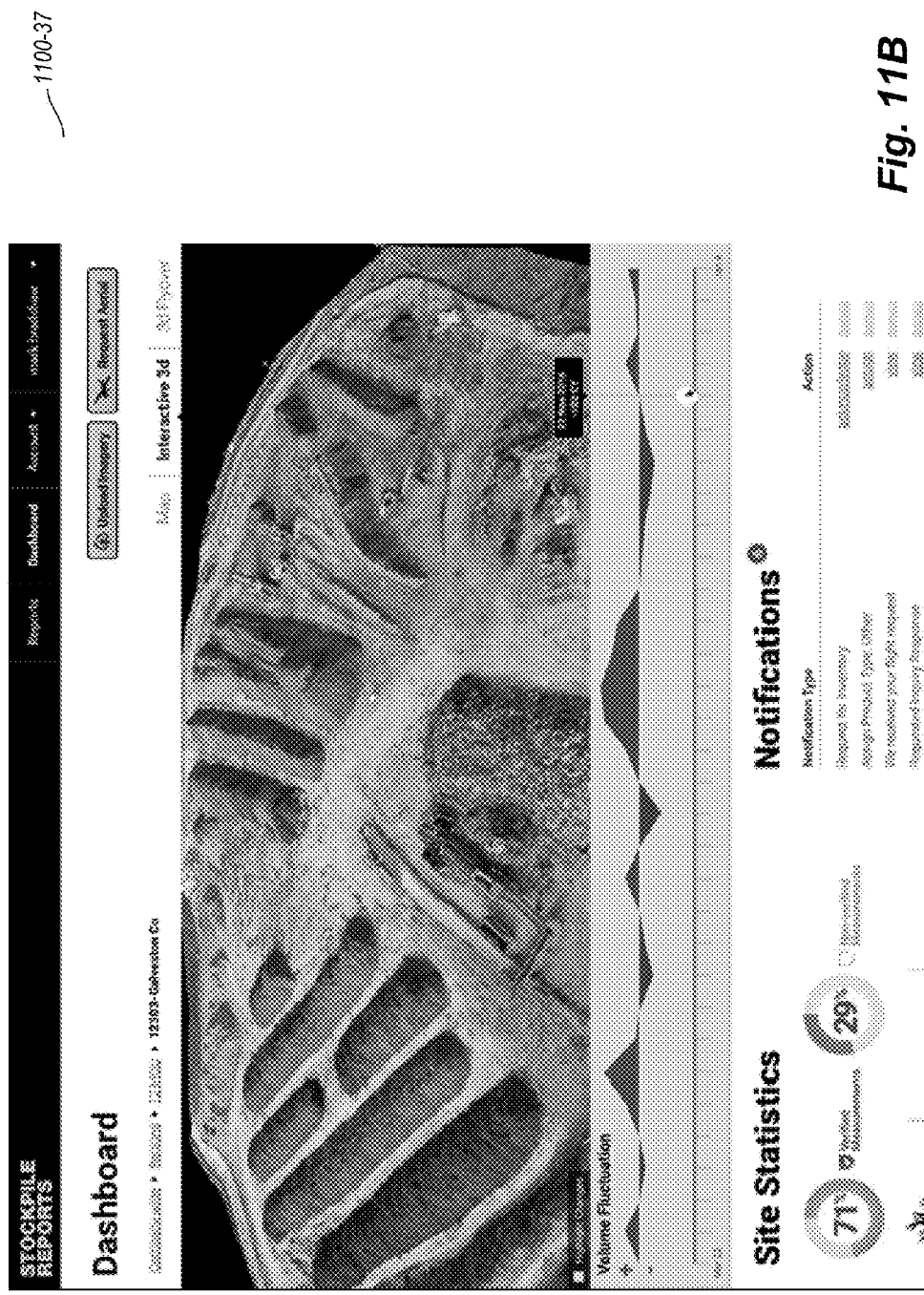
Figure 11C:
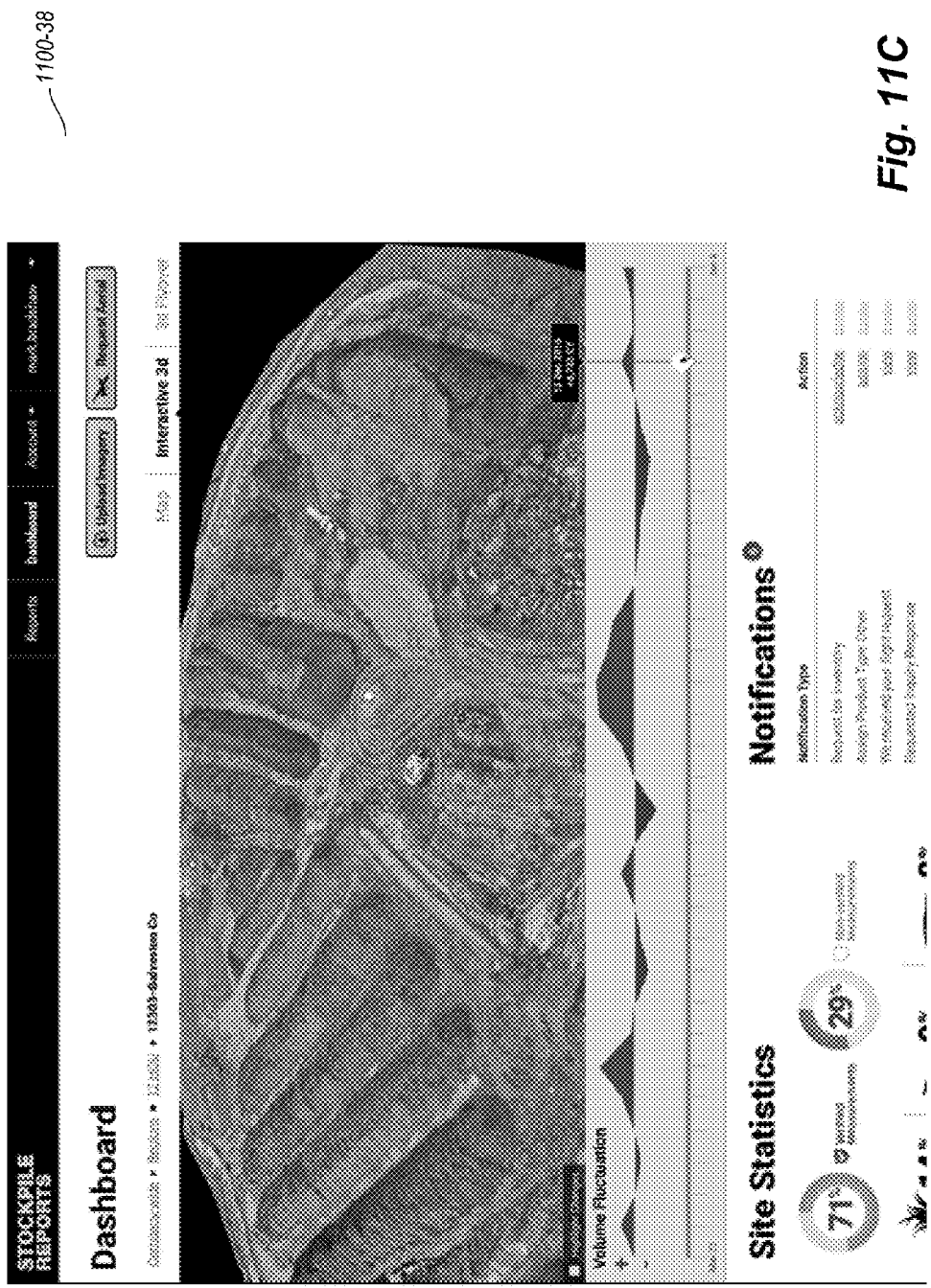
Figure 11D:
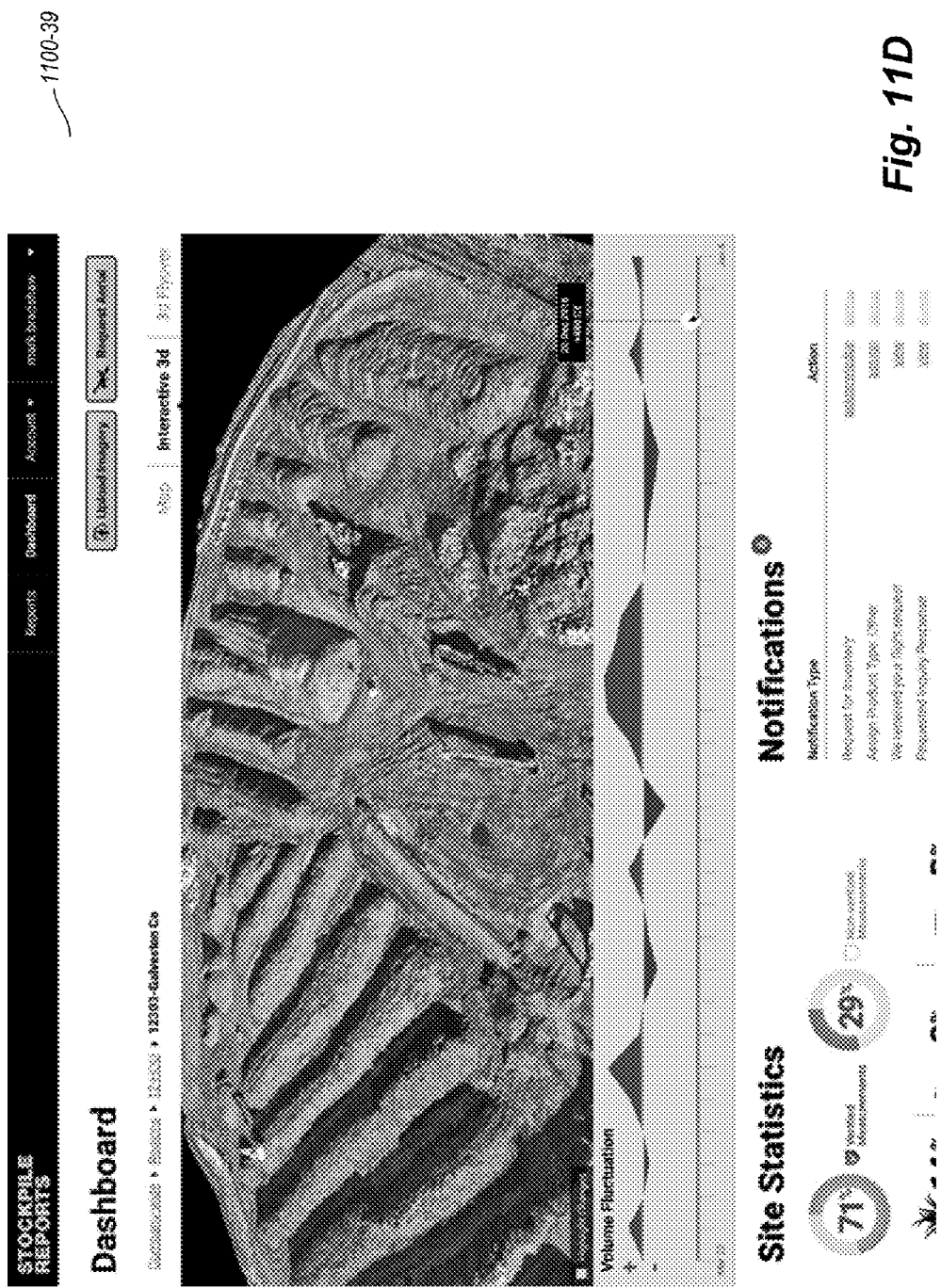
Figure 11F:
Figure 11G:
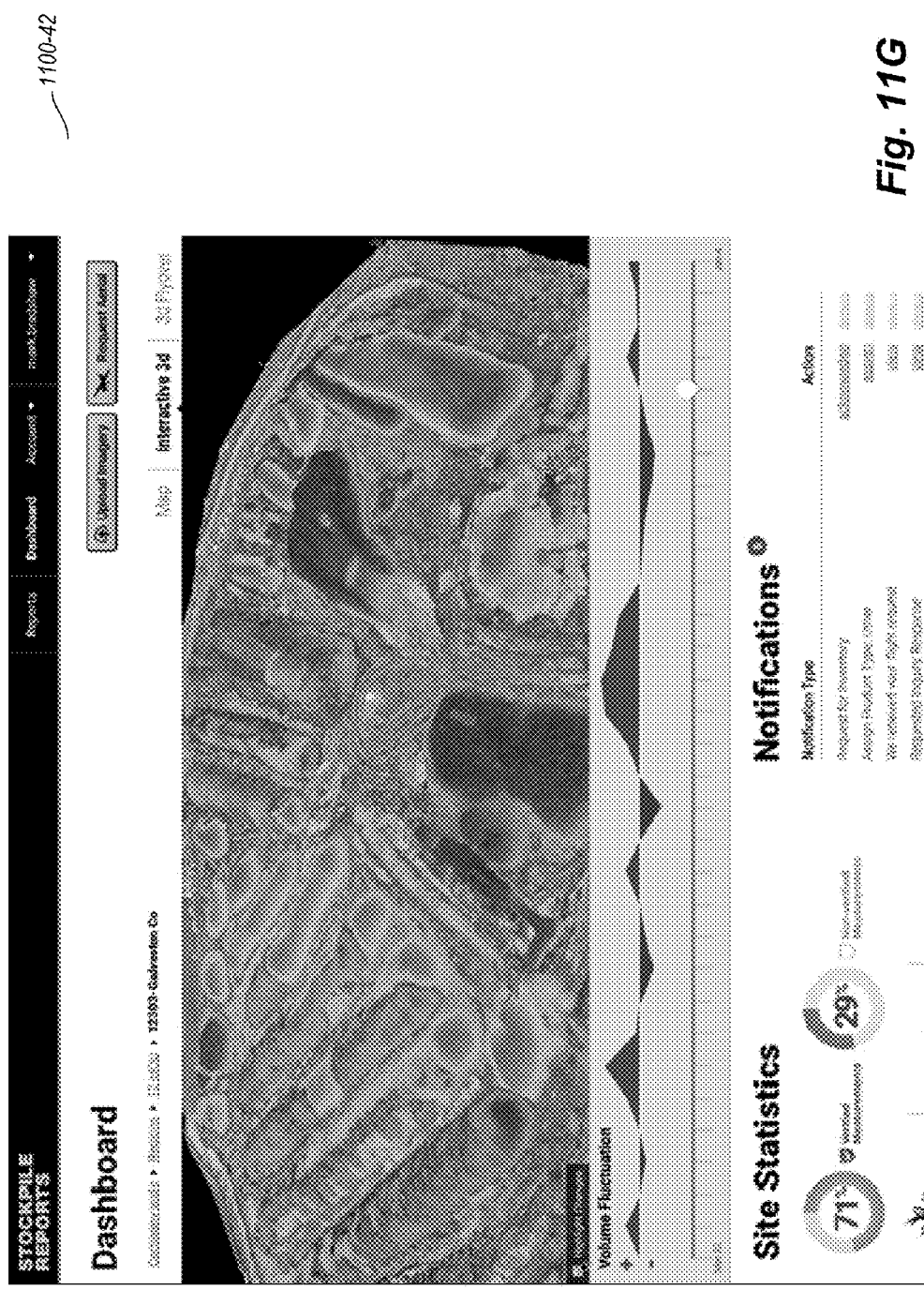
Figure 11H:
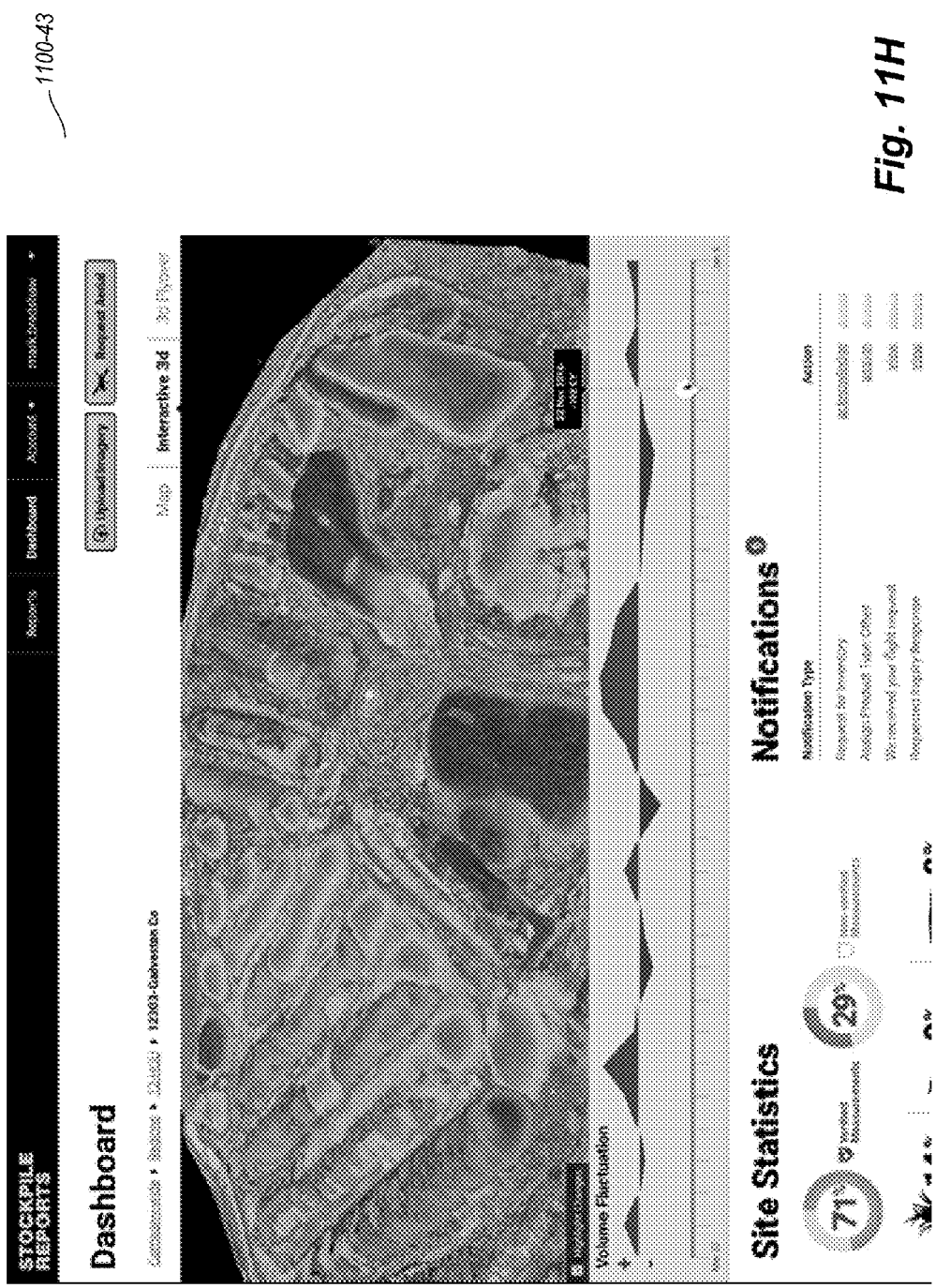
Figure 11I:
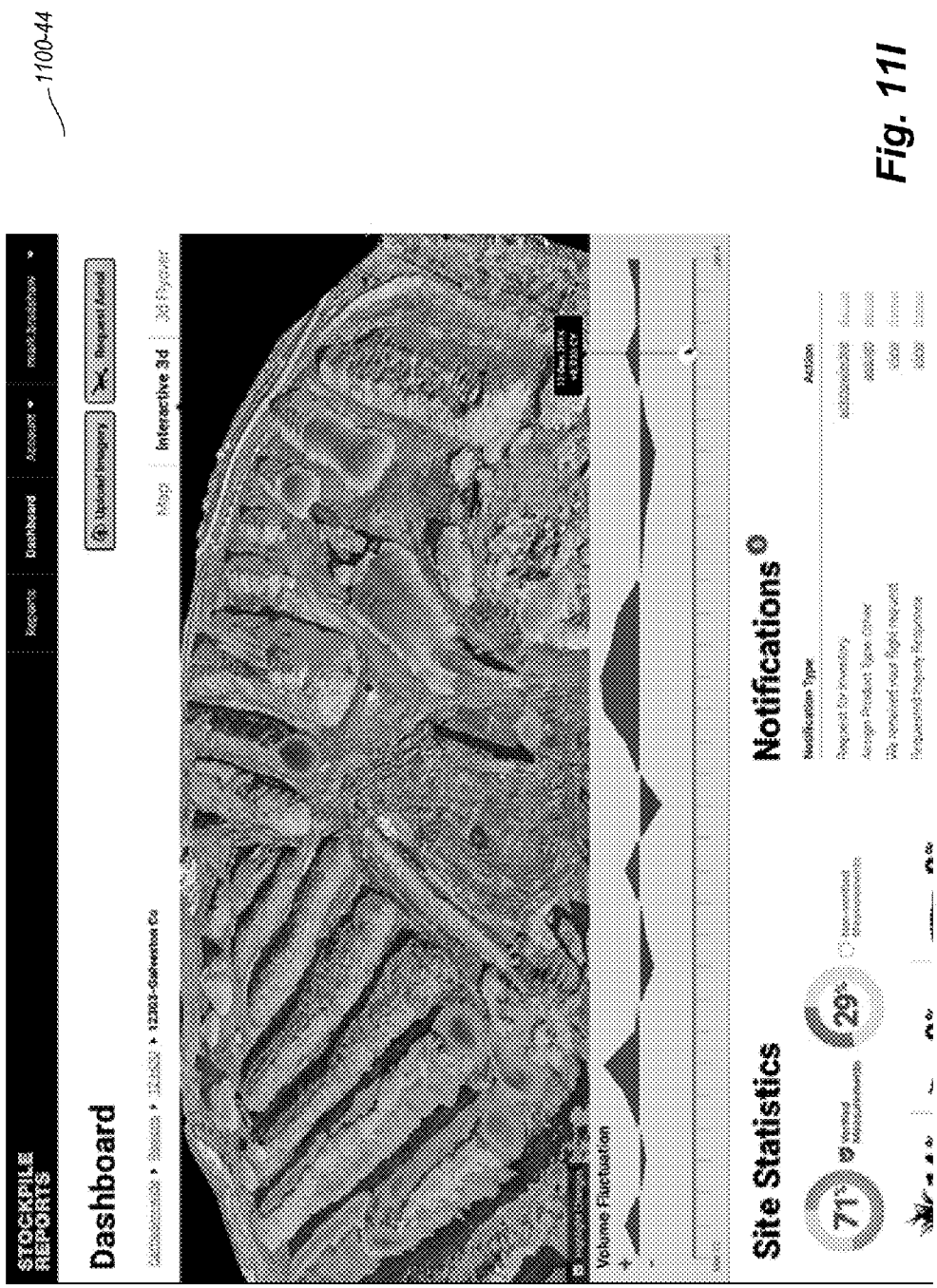
Figure 11J:
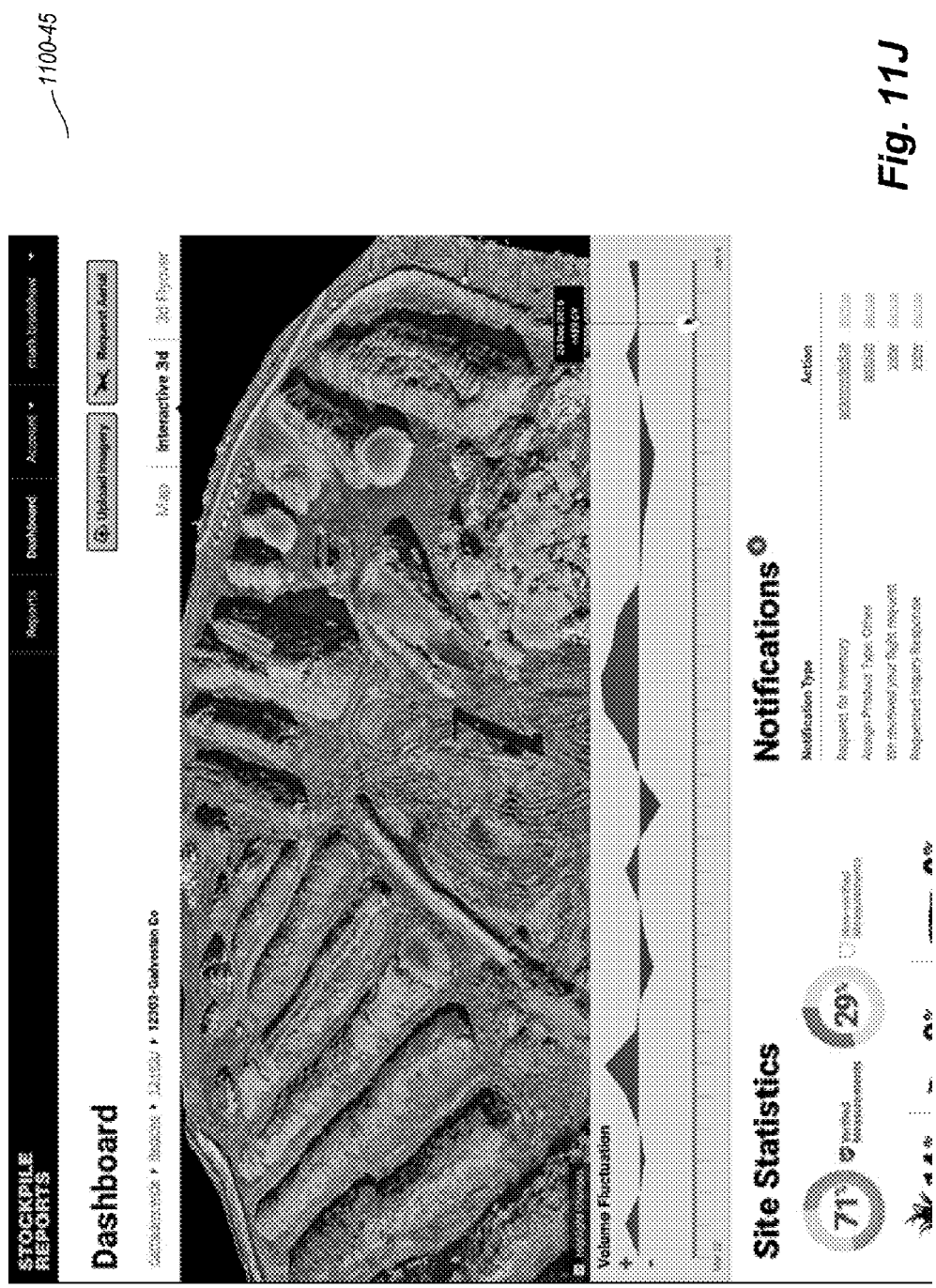

FIG. 10H provides an example illustration of the deformation field acting on the site's geometry, as well as the constraints working to align them. The red arrows denote deformation vectors defined on a regular grid. Blue rectangles are coplanar ground regions, and colored circles are corresponding unique 3D patches between the sites.

Finally, a bundle adjustment constraint is included that the cameras should minimize the reprojection errors of their observed 3D points. In this manner, as the site deforms, the camera poses and intrinsics may be altered to match the new geometry of the scene. In order to achieve this, the non-linear optimization, e.g. bundle adjustment, operates not only on the sparse 3D points (from which reprojection errors are computed), but optionally also on the dense 3D point cloud or triangle mesh (where the site correspondences and coplanar ground constraints are defined). Both of these geometries are deformed simultaneously using the same deformation field, which allows the various constraints to operate in a combined, consistent system.

Alignment of Multiple Collects Over Time

While the examples above have discussed only two datasets (the current dataset that is being analyzed, and a reference dataset to which the current one is aligned), use of pairwise alignments computed between the current collect and the one previous to it may in some situations allow the scaling of the site to drift over time. One solution to this is to always align a new dataset to the same, original reconstruction of the site. That way, the scaling of the site will remain consistent as there is a constant reference for the deformation. However, this technique has the drawback that the reference reconstruction may become no longer relevant, if the content of the site has changed drastically over time. This issue may be mitigated by, for example, the use of ground control points or other temporally stationary points of interest (like buildings or permanent structures). If the alignment of these parts of the site remains accurate over time, then the scaling of the site will remain consistent. In addition, while some examples above discuss alignment of two datasets (a current dataset that is being analyzed, and a reference dataset to which the current one is aligned), in other embodiments more than two datasets may be aligned to each other, such as to align the current dataset to an arbitrary number of previous, reference datasets (e.g., all of which are already aligned) or resulting models, and optionally to give differing weights to at least some datasets (e.g., to decrease the weight given to a dataset as its age, or lack of recency, increases). The benefit of this approach is that older datasets, while potentially less relevant, may still contribute to the alignment and be used to constrain the drift in a scene via their stationary points of interest and planar ground regions, while more recent datasets (which are frequently more relevant) help constrain the alignment via their more numerous site correspondences (as there is less change in the scene's geometry between the current dataset and these more recent datasets).

Change Detection

Once two (or more) datasets are aligned (e.g., a new dataset with a reference coordinate system of a previous dataset), changes in the site's geometry may be determined, such as directly from the current (or most recent) dataset relative to one or more earlier datasets, and/or by comparing computer models generated from the images for the datasets and aligned with each other (e.g., by comparing one or more corresponding portions of two such aligned computer models, including using the alignment to identify such corresponding portions). One way to accomplish this is to compute the nearest distance between every point of the current collect (either a point in the dense point cloud, or a position along the triangulated mesh) and the geometry on which the comparison is being performed. However, this approach suffers from artifacts, in that the nearest geometry may not always be in the same consistent direction or even the nearest point in the new reconstruction. Alternatively, another way to quantify the difference is to measure the nearest distance only along a scene-specific fixed direction, e.g. within the vertical direction of the dataset (perpendicular to the ground plane) for stockpiles. In this manner, the output set of distances between the reconstructions matches the change in elevation between the datasets.

FIG. 10I provides an example illustration of the effect of allowing the distance computation to be in any direction instead of constraining it to be along a specific direction, e.g.

the Z axis here. On the left, the elevation differences between the two surfaces are distorted because the distances (red arrows) to the nearest points on the surface above are not in a constant direction. When constraining the distance vectors to be computed along the Z axis (or perpendicular to the ground plane, as shown in the right illustration), the computed distances accurately characterize the difference in elevations between the surfaces. To avoid quantization artifacts, and to accelerate the distance computation, the nearest distance determination may be performed using a kd-tree and radius-based query. If so, each point in the reference dataset is projected to the plane perpendicular to the specific direction, e.g. the ground plane (e.g., XY plane) for the up vector, and then indexed into a kd-tree. Then, for each point in the current dataset, a radius-based query (with a typical radius of 0.1 to 1.0 meters) is performed. This retrieves all points in the reference dataset that were within the specified radius within the XY plane. Then, to determine the amount of change for that part of the site, the query point's distance value along the direction is compared to the distance values of the retrieved coordinates. The maximum Z difference is returned as the final distance for the examples discussed here, but other statistics such as minimum, median, or mean may be employed to compute the final value. One benefit of using the maximum is that it more accurately represents the case when a column of points is present in one dataset and not the other. For example, if the reference dataset contained a column of points, and the query point in the new dataset corresponded to the base of the column, then the minimum distance would be minimal, as the points at the base of the column would agree in Z value. However, if the maximum distance is computed, then the distance will be the height of the column, as the query point will be compared to the point at the top of the column.

Another efficient way to compute change detection between two datasets is through the use of geo-registered elevation maps (e.g., GeoTIFFs, raster images with geographic information, or other data formats). Such elevation maps represent the height of the terrain at a particular geographic point relative to some base surface or elevation. These maps may be computed by, for example, fitting a smooth surface to the dense 3D point cloud, by using the 3D triangular mesh, or other schemes that determine the elevation of the terrain. Depending on the particular application, particular parts of the scene may be excluded when computing the site's elevation map. For instance, if the elevation of the bare earth surface is being modeled, objects such as trees, equipment, or buildings may be excluded from the elevation map. Once an elevation map is computed for each dataset, change in the datasets can be detected by subtracting the heights of corresponding geographic positions.

FIG. 10J provides an example illustration of a radius-based nearest-neighbor query and the effect of the distance measure between a query point and the returned neighbors. This example shows two sample surfaces, the query points on the bottom surface (red circles), and the returned nearest-neighbor points using a radius-based query (red rectangular regions). For the middle query point, the minimum, maximum, median, and mean distance between the points all equate to the same value. However, for the left and right examples, these quantities will vary. Different embodiments may used different summary metrics to capture the desired difference.

To further enhance the usefulness of the change detection, semantics and other attributes may be handled, such as if the height of the geometry has not changed, but the content creating that geometry is different. For example, if the pile in one collect is replaced by equipment that is exactly the same height, then the computed height difference will be minimal. However, by defining, tracking, and comparing the sites' contents, differences that are not only geometric in nature may be detected and highlighted.

Pile Association

Pile association links consecutive measurements of the same physical pile or other object over time. For inventory purposes an object (also referred to as a "structure" in this discussion) may be identified by its location and additional attributes such as, for example, the material it is made of. The MDIA system assigns a unique ID ("identifier") to each pile, and in some embodiments each pile or other object may have one or more unique labels or names (whether generated automatically by the system and/or manually specified by a user), such as for use when displaying or presenting or otherwise providing information about the object to one or more users. Over time material is added to and removed from the pile, which changes its shape and appearance. The lifespan of piles varies greatly. They may appear and disappear from one measurement to another. Some static piles may never change. Additionally, a pile may be split-up and two or more piles may be merged into one.

To associate an object measurement to a specific object, its attributes (e.g. material), location and possibly shape are matched to previous measurements of the same object. For a given measurement, the association process may use, among other things, the object's images, its point cloud, surface model, orthographic image, and volume measurement. Seasonal factors like illumination and moisture content affect the appearance of the object, and image quality and vantage point also affect the quality of the data.

The association process has a first automated stage that uses a classifier to produce candidate material and object identities, and may optionally be done in a batch mode. If the confidence in the results is not sufficient or if it is ambiguous, a human operator may optionally provide further information in a second stage, such as to approve and/or refine the results of the classifier in the first stage by adding or excluding pile materials and locations. In such a second stage, a GUI may be used to present the user with the input data (object images, derived material chips, etc.) along with exemplars of matched material chips, object locations, object id, and historical data from previous measurements (images, volumes, locations, etc.). If no object association is made, the modified data is then fed back into the first stage.

Automated Material Matching

The material of a pile may be identified by automated texture and color analysis. The MDIA system may, for example, first create a material database made of image chips collected from the images of piles over time. The chips are used to train a material classifier. Given a set of input chips from a pile, the classifier outputs most likely material classes along with exemplar chips from the material database. In addition to image chips, the material database may store additional information examples, such as site ID, object ID, object location, pile footprint, and date and time of day—such information may improve the classifier's site-specific and season-specific classification accuracy. In some embodiments, a hierarchy of classifiers may be used to refine a set of candidate materials.

Location Matching

The location of a pile may be determined by comparing the position of its centroid with the centroid of previous measurements. The match may be further refined by matching the shape of the pile with those of previous neighboring measurements.

There are different types of shape descriptors, such as 2D rasterized footprint, rasterized height maps, local and global point cloud detectors, etc. The shape matching process for 2D rasterized footprint is further discussed, but other descriptors that have an overlap measure may be used. Normalized cross-correlation is a suitable measure for 2D rasterized footprints.

If the footprints overlap between a new measurement with the last measurement in the same location, then the MDIA system may assign the previous measurement's object ID to the new one, with the confidence in this initial match being a function of the overlap measure. The MDIA system may further confirm or reject the match by comparing the new footprint to those of older measurements. This technique is particularly advantageous to identify static objects.

The MDIA system may further be configured to perform initial matches exclusively with the latest historical dataset, and/or to search within a time window that encompasses several datasets.

If the new measurement overlaps with several separate previous measurements taken at the same time and the same material, the MDIA system may detect an object merge, e.g. merging piles. Likewise if two new measurements overlap with a single previous measurement then the MDIA system may detect an object split, e.g. a pile split. New measurements with no match correspond to new objects. In some embodiments, user input may be used to confirm such new objects.

Some objects may be so small that their footprint is at the scale of the co-registration error between the current dataset and the historical measurements. If so, the matching may be performed by adding random offsets and rotations to the footprint with a given search window before comparing it to historical ones.

In some embodiments, a single classifier may be used to determine material, position and shape matching.

Visualization

Using 3D renderings generated at different points in time, a visual representation may be provided of where the addition and removal of materials took place. For example, FIGS. 11A-11F depict the user adjusting dates using a using a user-selectable date slider of a displayed GUI to see 3D renderings changing over time (e.g., using one or more times specified with the slider), thus providing a progression of changes over time. In addition, the user may use one or more user-selectable controls of such a GUI to specify one or more other types of information to display (e.g., a visual representation of the exterior of one or more objects from one or more computer models that represent the object(s), including in some cases to illustrate types of materials or other appearance features; a visual representation of boundaries of one or more such objects; a visual representation of a change for one or more such objects between two or more times, such as for a change in volume or at least one structural change or another indicated type of change for one or more other object attributes including location, temperature, moisture type of material, etc., and such as for individual object changes and/or an aggregate change for all objects co-located at a site; an animation of one or more such changes over two or more times; etc.), and/or one or more such types of information may be displayed by default or otherwise without user selection in some embodiments and situations. For example, a Volume Fluctuation graph is displayed above the date slider showing the gross total/aggregate volume of change, communicating whether the site's total/aggregate volume has increased or decreased over the given time range. Additionally, the user can choose to toggle a Highlight Changes view in the example GUI, such as by selecting a corresponding displayed user-selectable control, to depict a 'heat map' of specifically where the volumes of material were added or removed from the designated points in time, including to illustrate structural changes within portions of an object (e.g., by using a color, such as green, and/or one or more other effects to visually identify where material is added, and by using another color, such as red, and/or one or more other different visual effects to visually identify where material is removed). FIGS. 11G-11K further depict the user changing the point in time in such a heat map view to see specifically where materials volume was added or removed from the given site, including changes in structure to particular piles and portions of those piles. Additionally, when viewing a heat map of change on a site, contours of one or more particular piles can be overlaid to more quickly quantify the amount of change that has occurred. However, an annotated color-bar mapping heat map colors to elevation change (or other visual reference) also serves a similar purpose. In addition, when transitioning between consecutive datasets (e.g., by using the slider or otherwise advancing from one time at which images were collected and one or more corresponding pile model(s) created to a next time at which additional images were collected and one or more additional corresponding pile model(s) created), various visual effects can be employed. For instance, one approach is to blend between the imagery or heat maps over a short period as the transition is occurring. Other strategies leverage the 3D data associated with each dataset, enabling the geometry to morph (interpolate) between two datasets, yielding not only animated textures (imagery) but also animated geometry, including to successively animate changes through a series or succession of several computer models and associated times (e.g., all times/models, all times/models between user-specified start and end times, all times/models that satisfy one or more user-specified criteria, etc.). For example, by performing an animated sequence for two or more times and associated computer models, the additions and subtractions in materials may be viewed over time as they change. It will be appreciated that various additional types of user-selectable controls and information may be displayed or otherwise provided in other embodiments.

It will be appreciated that the details discussed with respect to the examples of FIGS. 2A-2J, 10A-10J, and 11A-11K are provided for illustrative purposes, and that the described techniques are not limited to these example details.

Figure 3:
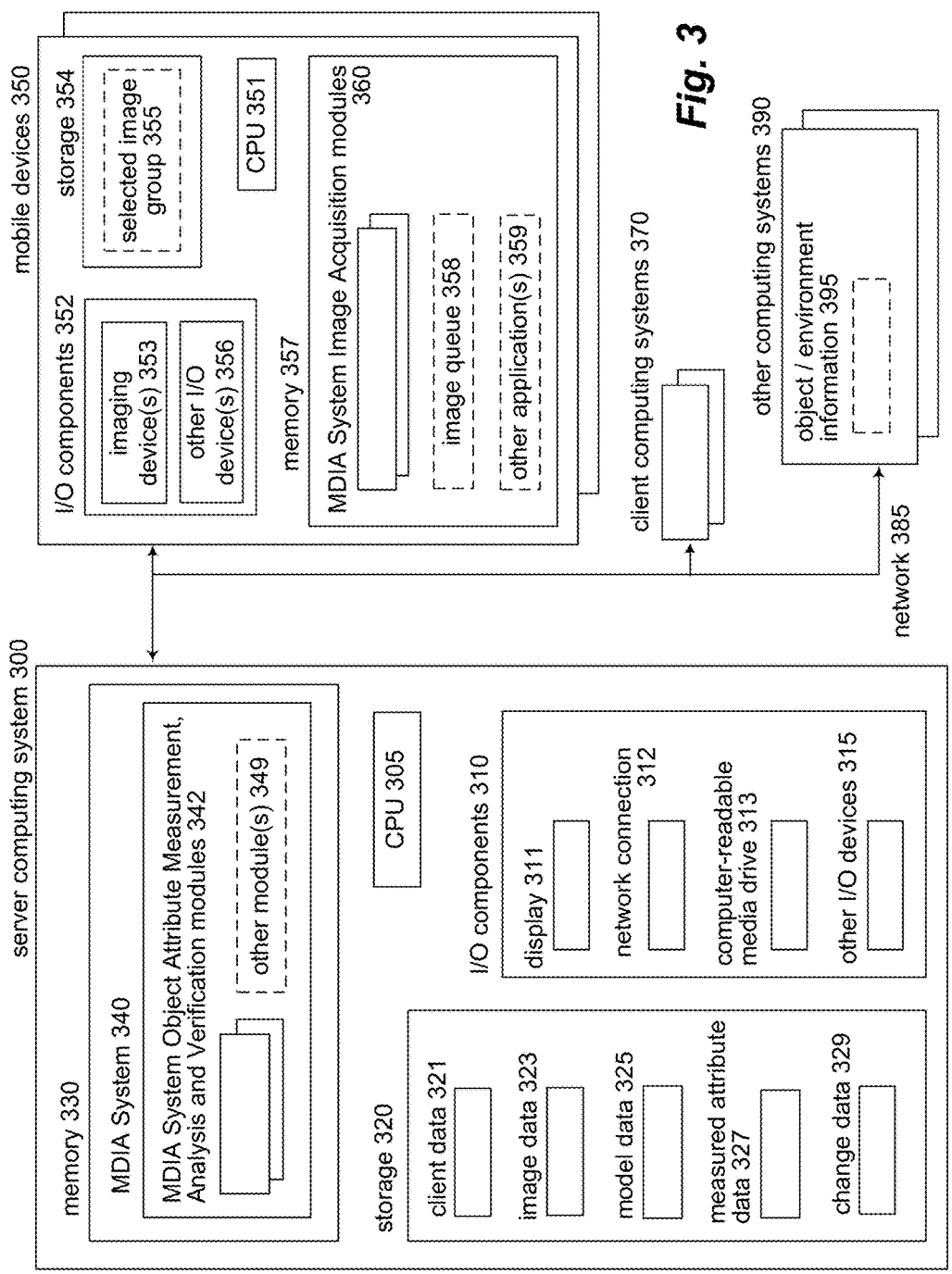
FIG. 3 is a block diagram illustrating a computing system suitable for executing embodiments of a described system for analyzing images acquired via mobile devices to assess volume and/or other attributes of objects included in the images.

FIG. 3 is a block diagram illustrating an embodiment of a server computing system 300 that is suitable for performing at least some of the described techniques, such as by executing an embodiment of a MDIA system 340 that provides a mobile device image analysis service available to various clients. The example server computing system 300 includes one or more central processing unit ("CPU") processors 305, various input/output ("I/O") components 310, storage 320, and memory 330, although in other embodiments multiple such server computing systems may operate together to execute the system 340 in a distributed manner. Illustrated I/O components in this example embodiment include a display 311, a network connection 312, a computer-readable media drive 313, and other I/O devices 315 (e.g., keyboards, mice or other pointing devices, microphones, speakers, etc.)—such I/O components may enable a variety of types of interaction types, including, for example, voice control, gesture control, etc.

One or more mobile devices 350 are similarly illustrated as each having one or more CPU processors 351, one or more I/O components 352, memory 357, and storage 354. For example, each such mobile device may include one or more image capture devices 353 and other I/O devices 356, although particular such other I/O devices are not illustrated. In this example, one or more MDIA system image acquisition components 360 are executing in memory 357 of the mobile device (e.g., as part of one or more software applications provided by the MDIA system 340 or the entity operating the system 340), such as one or more of the image acquisition components 168 of FIG. 1—one or more other software applications 359 may also optionally be executing on the mobile device (e.g., to allow wireless communication with the server computing system 300 and/or other systems). As the mobile device performs image acquisition capabilities, it may optionally create and use a temporary image queue 358 in memory as part of performing image selection activities, and/or may store some or all of the acquired images on storage 354—in this example, the storage 354 may optionally include multiple images selected for an image group 355 to represent an object whose images are being acquired.

The other computing systems 370 and 390 may similarly include some or all of the same types of components as the server computing system 300 and/or mobile devices 350, but such components are not illustrated in this example for the sake of brevity. The server computing system 300 and mobile devices 350, and the MDIA system 340 and the system 340 components 342, 349 and 360, may also communicate with each other and/or other computing devices and systems in various manners, including via one or more networks 385 (e.g., the Internet, one or more cellular telephone networks, etc.).

In the illustrated embodiment, at least a portion of the MDIA system 340 is executing in memory 330 of the server computing system 300, and in this example includes one or more MDIA system object attribute measurement, analysis and verification components 342, such as one or more of the object attribute measurement, analysis and verification components 169 of FIG. 1—one or more other components 349 (e.g., MDIA system image acquisition components) and/or other software applications (not shown) may also optionally be executing in the memory 330, including in some embodiments to execute all of the MDIA system on the server computing system. Similarly, while not illustrated in this example, in other embodiments, all of the MDIA system may optionally execute in the memory 357 of a mobile device, such as to enable the mobile device to perform all of the described techniques without interacting with the server computing system 300. Additional details are discussed elsewhere herein related to types of automated operations that various of the MDIA system components may perform. The system 340 and/or the system components 342, 360 and 349 may in some embodiments include software instructions that, when executed, program or otherwise configure the processor(s) 305 and the server computing system(s) 300, and/or the processor(s) 351 and the mobile device(s) 350, to perform automated operations that implement at least some of the described techniques.

The MDIA system 340 and its components may obtain and use various information as part of its automated operations, such as client data 321, image data 323, model data 325, measured attributed data 327 and change data 329 on storage 320 of the server computing system 300—such data and its use may be similar to that described with respect to data 161-165 of FIG. 1 and/or elsewhere herein. For example, the MDIA system 340 may obtain various types of client-related information from users or other entities that act as clients of the system 340, such as by interacting with corresponding client computing systems 370 (e.g., via a corresponding optional component 349 that enables clients to register with the system 340 and/or to provide other types of client-specific information), and may store some or all of such information in client data 321 on storage 320. While not illustrated here, in other embodiments some or all of the MDIA system 340 may execute on behalf of a single client or a single entity (e.g., an organization with multiple employees or other members). In addition, the MDIA system may further obtain and use additional types of data in at least some embodiments, such as information about particular objects, object types (e.g., materials) and/or object environments from one or more other computing systems 390. Such other information may be used in various manners when analyzing images, determining object attribute measurements and/or presenting corresponding information to clients, as discussed elsewhere herein.

It will be appreciated that the illustrated computing systems and device are merely illustrative and are not intended to limit the scope of the present invention. For example, computing system 300 and/or mobile devices 350 may be connected to other devices that are not illustrated, including through one or more networks such as the Internet or via the Web. More generally, a "client" or "server" computing system or device may comprise any combination of hardware that can interact and perform the described types of functionality, such as when programmed or otherwise configured with software, including without limitation desktop computers, laptop computers, slate computers, tablet computers, embedded computers, specialized hardware such as ASICs or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate inter-communication capabilities. For example, the illustrated system 340 and/or its components may include executable software instructions and/or data structures in at least some embodiments, which when loaded on and/or executed by particular computing systems or devices may be used to program or otherwise configure those systems or devices, such as to configure processors of those systems or devices. Alternatively, in other embodiments, some or all of the software components and/or systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity. Furthermore, the functionality provided by the illustrated system components may in some embodiments be combined in fewer components or distributed in additional components. Similarly, in some embodiments the functionality of some of the illustrated components may not be provided and/or other additional functionality may be available.

Thus, in at least some embodiments, the illustrated components and/or systems are software-based components/systems including software instructions that, when executed by the CPU(s) 305 and/or CPU(s) 351 and/or other processor means, program the processor(s) to automatically perform the described operations for that component/system. Furthermore, in some embodiments, some or all of the components and/or systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, components or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
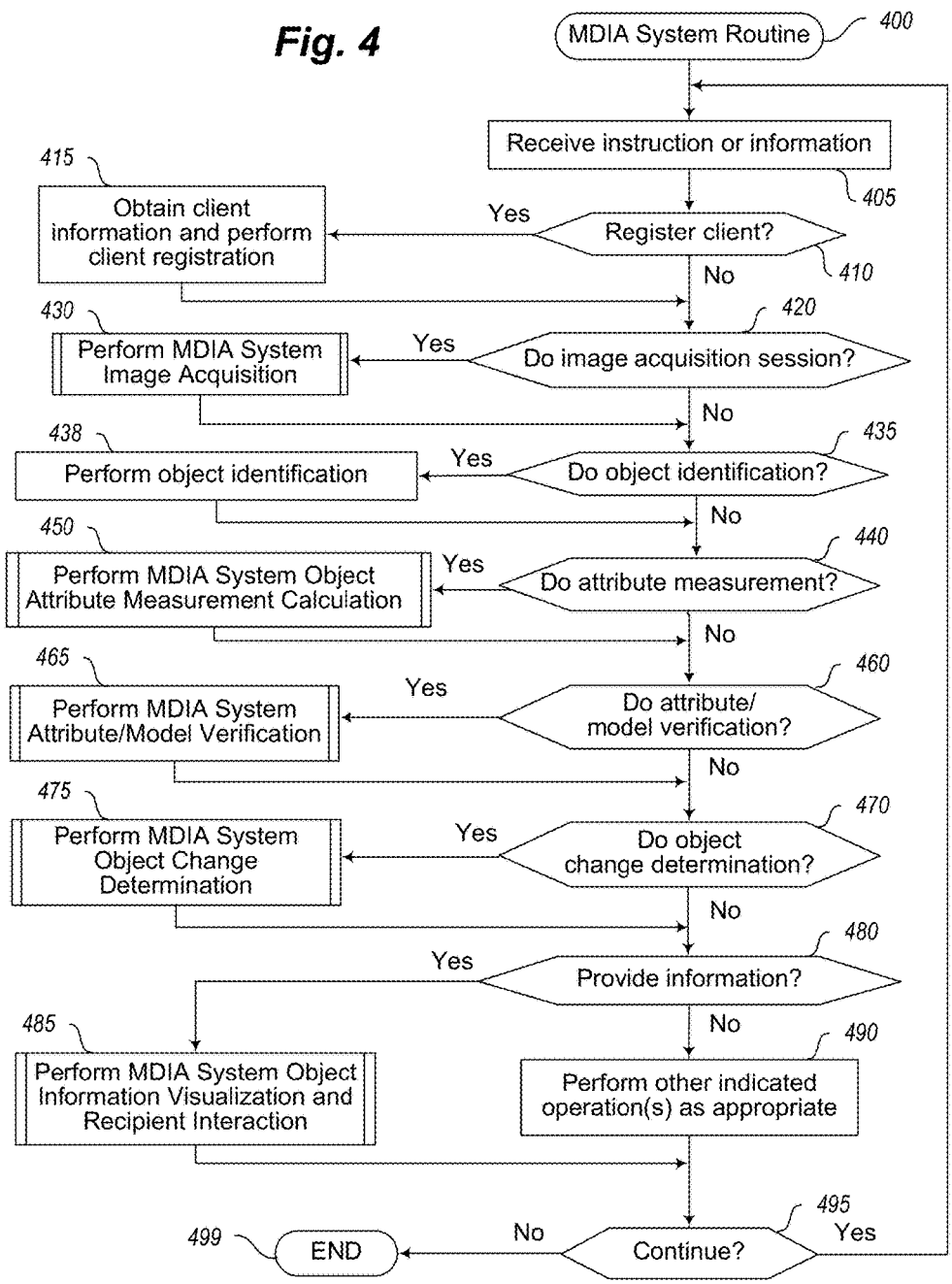
FIG. 4 is an example flow diagram of an illustrated embodiment of a Mobile Device Image Analysis (MDIA) System routine.

FIG. 4 is an example flow diagram of an illustrated embodiment of a MDIA (Mobile Device Image Analysis) System routine 400. The routine may be provided by, for example, execution of an embodiment of the MDIA System 160 of FIG. 1, the MDIA System 340 of FIG. 3, and/or the MDIA System discussed with respect to FIGS. 2A-2J and 10A to 11K, such as to perform activities for clients of a MDIA Service being provided by the MDIA System, including to acquire and analyze images via mobile devices to identify one or more objects represented in a group of acquired images (e.g., with respect to previously modeled objects), to estimate measurements for one or more attributes of an object included in the images, to determine changes in objects and object attribute measurements over time, to perform automated verification of such attribute measurements in various manners, and to present information to users about various types of acquired and determined information. It will be appreciated that the routine 400 may be performed by one or more configured devices or systems, including in multiple locations, such as if a mobile device used to acquire images performs at least some of the portions of the routine 400, while one or more remote server systems perform additional portions of the routine.

The routine begins in block 405, where instructions or information is received. The routine continues to block 410 to determine whether an instruction is received to register a new client of the MDIA Service and/or to modify existing information for such a client, and if so continues to block 415 to obtain corresponding client information and to perform a registration for the client. In at least some embodiments, the client information obtained may include information about, for example, notification preferences or other instructions (e.g., for use in providing information to a client about one or more analyzed attributes for an object of interest to the client, such as based on images of the object supplied by the client), and/or other types of client preferences and information (e.g., mobile devices that are registered for the client to provide image information, user representatives of the client who are authorized to perform particular activities, etc.). As discussed below with respect to block 485, the routine may in some embodiments display a GUI ("graphical user interface") to present various types of information to a user representative of a client or other user. While not illustrated in this example routine, the routine may further, in at least some embodiments, provide the same or different user interfaces via which a user may further interact with the MDIA System, such as via which the user may perform other activities (e.g., to register a client and/or obtain information about previous activities performed for the client). Such GUI(s) or other user interface(s) may, for example, be provided over the Internet or other network to one or more computing devices of the client's user representative, such as via a Web browser executing on those client devices, and/or may be provided at least in part by an application program of the MDIA System that is downloaded to and executed on a mobile device or other configured device of the client's user representative (e.g., a client-side application that includes one or more components of the MDIA System, such as components 360 of FIG. 3). Additional details are included herein related to example GUI screens that may be used in some embodiments.

After block 415, or if it is instead determined in block 410 that the information or instructions received in block 405 are not to register client information, the routine continues to block 420 to determine whether instructions or information have been received related to performing image acquisition for one or more objects of interest, such as on behalf of a client that has just been registered in block 415 or instead for a previously registered client. For example, such a received indication may be based on a human user indicating via a mobile device or other configured device to the MDIA System that an image acquisition session is about to begin for one or more objects of interest, based on such a mobile device beginning to supply one or more acquired images as part of a new image acquisition session, based on the MDIA System providing a reminder or other instructions to a human user to begin an image acquisition session (e.g., in accordance with previously defined instructions for a corresponding client), etc. If so, the routine continues to block 430 to execute an MDIA System Image Acquisition routine, such as by executing one or more image acquisition components of the MDIA System. One example of such an MDIA System Image Acquisition routine is discussed in greater detail with respect to FIGS. 5A-5B.

After block 430, or if it is instead determined in block 420 that the instructions or information received in block 405 are not related to performing an image acquisition session, the routine continues to block 435 to determine whether the information or instructions received in block 405 correspond to performing object identification for a group of acquired images, such as to attempt to match those one or more objects to one or more previously modeled objects (e.g., to determine if an object represented by a group of acquired images corresponds to a changed object that was previously modeled, or is instead a new object). In some embodiments and situations, such automated object identification may not be performed, such as if the group of acquired images are known to represent a particular object (e.g., if a single object is repeatedly modeled at different times to determine changes in the object, if user input or other information specifies the object(s) for the images without performing automated identification, etc.). Additional details are described elsewhere herein regarding performing such object identification.

After block 438, or if it is instead determined in block 435 that the instructions or information received in block 405 are not related to identifying one or more objects for a group of acquired images, the routine continues to block 440 to determine whether the information or instructions received in block 405 correspond to calculating or otherwise estimating one or more attribute measurements for one or more objects of interest, such as for images just acquired with respect to block 430 or instead with respect to previously acquired and stored images. If so, the routine continues to block 450 to perform an MDIA System Object Attribute Measurement routine, such as by executing one or more object attribute measurement components of the MDIA System. One example of such an MDIA System Object Attribute Measurement routine is illustrated in greater detail with respect to FIG. 6.

After block 450, or if it is instead determined in block 440 that the instructions or information received in block 405 are not related to performing attribute measurements, the routine continues to block 460 to determine whether the information or instructions received in block 405 correspond to verifying one or more attribute measurements and/or the corresponding computer model(s) for one or more objects of interest, such as for attribute measurements just calculated with respect to block 450 or instead with respect to previously acquired and stored attribute measurements. If so, the routine continues to block 465 to perform an MDIA System Attribute/Model Verification routine, such as by executing one or more corresponding verification components of the MDIA System. One example of such an MDIA System Object Attribute Verification routine is illustrated in greater detail with respect to FIG. 7.

After block 465, or if it is instead determined in block 460 that the instructions or information received in block 405 are not related to performing automated operations to verify attribute measurements, the routine continues to block 470 to determine whether the instructions or information received in block 405 include or determining change information over one or more times for one or more objects (and/or for a location that includes one or more objects), whether for attribute measurements just performed with respect to block 450 or instead for previously determined object attribute information. If so, the routine continues to block 475 to perform an MDIA System Object Change Determination routine, such as by executing one or more corresponding information change determination components of the MDIA System. One example of such an MDIA System Object Change Determination routine is illustrated in greater detail with respect to FIG. 8.

After block 475, or if it is instead determined in block 470 that the instructions or information received in block 405 are not related to performing automated operations to determine change information for one or more objects, the routine continues to block 480 to determine whether the instructions or information received in block 405 include providing measured attribute information and/or determined change information and/or verified attribute measurements to a client and/or other source, whether for attribute measurements just performed with respect to block 450 or instead for previously determined object attribute information, and/or for change information determination just performed with respect to block 475 or instead for previously determined change information, and/or for attribute measurement verification just performed with respect to block 465 or instead for previously determined object attribute verification information. If so, the routine continues to block 485 to perform an MDIA System Object Information Visualization and Recipient Interaction routine, such as by executing one or more corresponding information visualization and/or recipient interaction components of the MDIA System. One example of such an MDIA System Object Information Visualization and Recipient Interaction routine is illustrated in greater detail with respect to FIG. 9, corresponding to using a GUI to perform interactions with one or more users. While not illustrated in FIG. 9, in other embodiments such a routine may include generating and providing one or more reports for a client or other user (whether in addition to or instead of performing user interactions via a GUI), such as by retrieving corresponding information of interest, optionally formatting the information in an indicated manner, and providing it to the user—as previously noted, in some embodiments, the providing and/or formatting of information for a client may be performed in manners previously indicated by the client, such as with respect to preferences specified by the client. Such reports are able to be provided to the client in various manners (e.g., an electronic report sent over one or more networks via one or more electronic communications, a paper-based report, etc.).

If it is instead determined in block 480 that the information or instructions received in block 405 are not to provide measured attribute information via a GUI presentation or other display, the routine continues instead to block 490 to perform one or more other indicated operations as appropriate. For example, the operations performed with respect to block 490 may include requesting or otherwise receiving additional information of one or more types about objects and/or their environments, with such additional information optionally being used as part of blocks 430 and/or 450. In addition, the operations performed with respect to block 490 may, in at least some embodiments, allow a client to perform a variety of other types of actions with respect to the MDIA System, such as to schedule notifications or activities for future times, to retrieve and monitor information about previous activities, etc. While not illustrated here, in some embodiments the routine may perform further interactions with a client or other end user, such as before, during or after providing information to the client in blocks 485 and/or 490, as discussed in greater detail elsewhere herein.

After blocks 485 or 490, the routine continues to block 495 to determine whether to continue, such as until an explicit indication to terminate is received. If it is determined to continue, the routine returns to block 405, and otherwise continues to block 499 and ends.

Figure 5A:
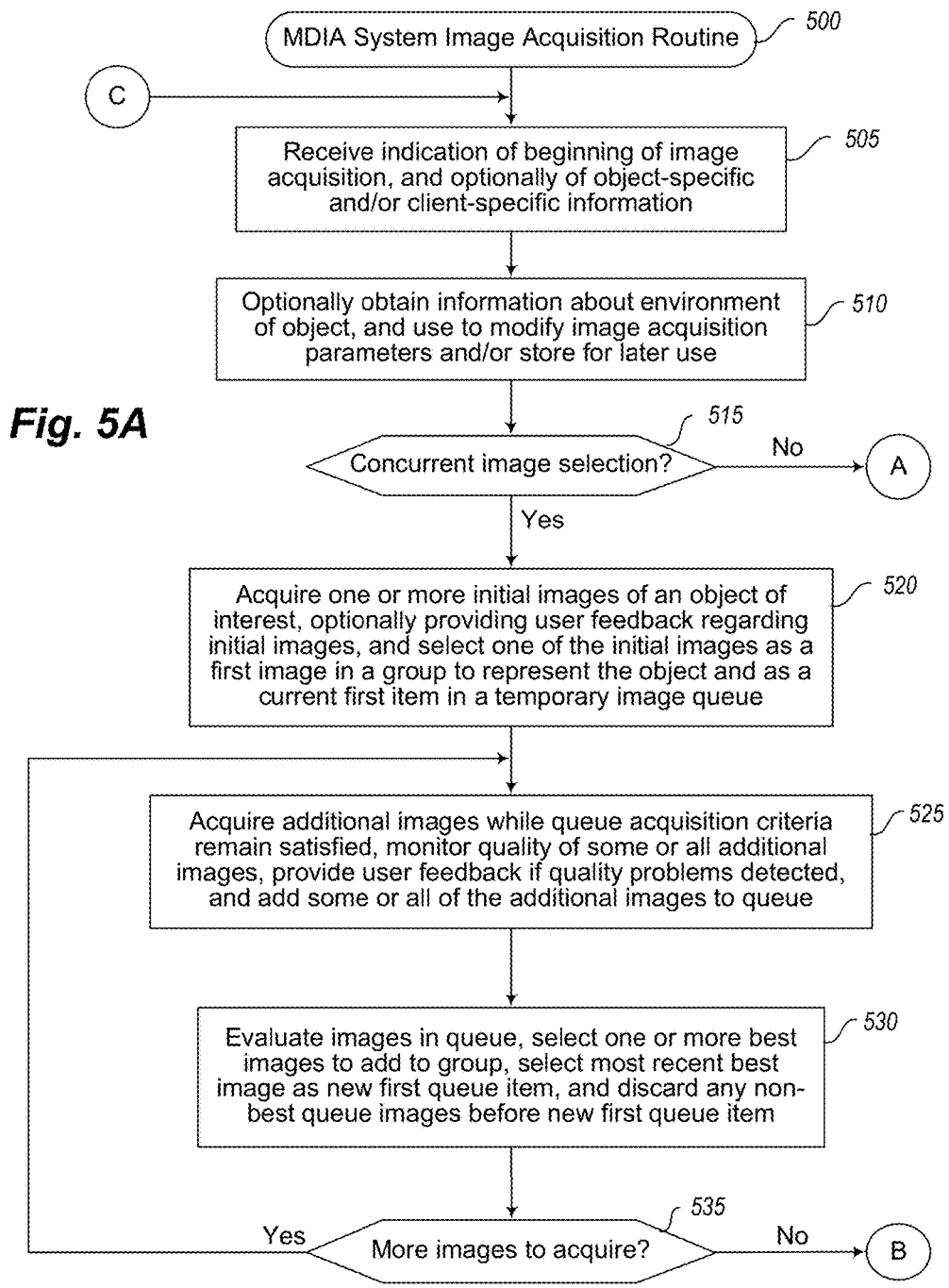
FIGS. 5A-5B are an example flow diagram of an illustrated embodiment of an MDIA System Image Acquisition routine.
Figure 5B:
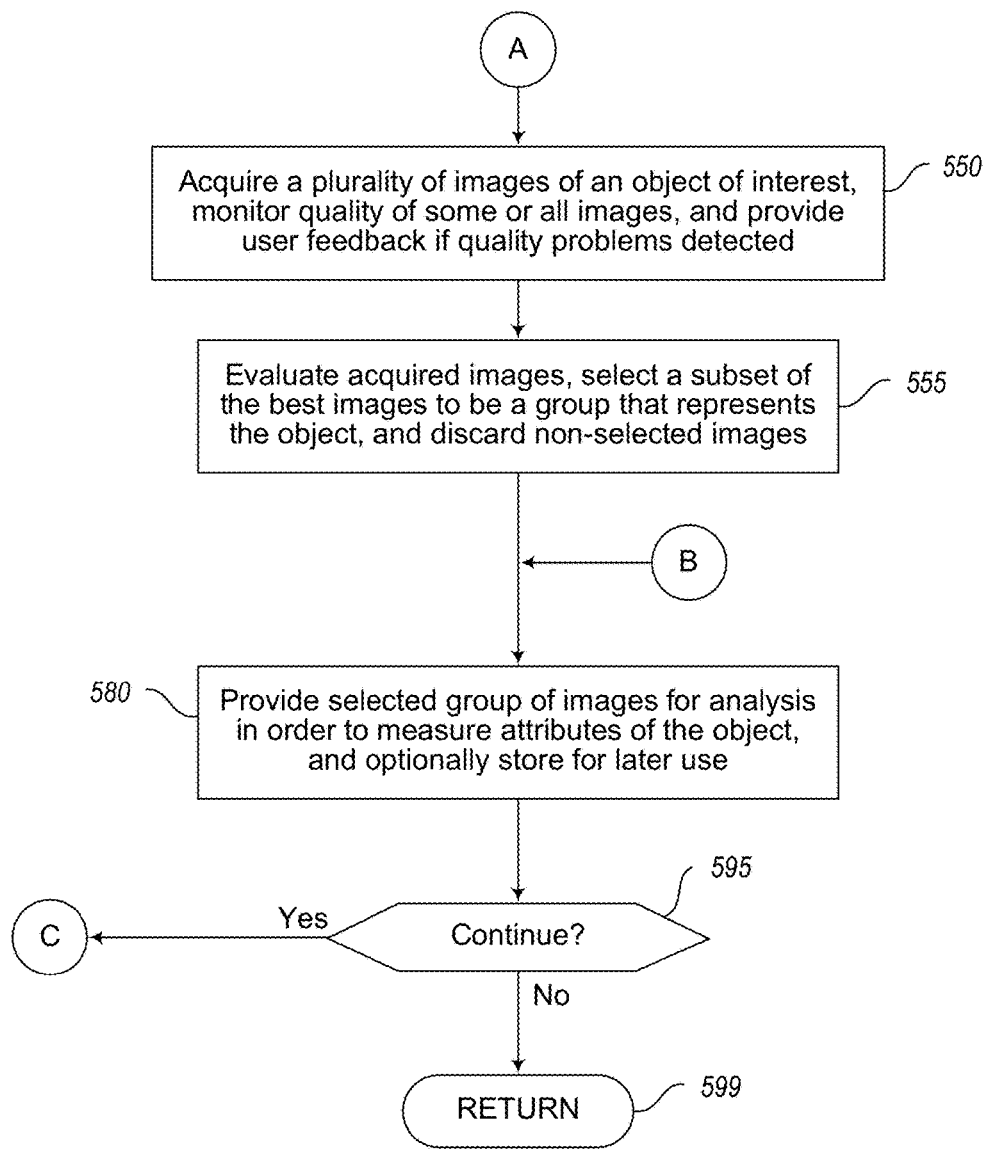

FIGS. 5A and 5B are an example flow diagram of an illustrated embodiment of a MDIA System Image Acquisition routine 500. The routine may be performed by, for example, the MDIA System 160 of FIG. 1, one or more of the MDIA System Image Acquisition components 360 of FIG. 3, and/or the MDIA System discussed with respect to FIGS. 2A-2H, such as to perform an image acquisition session that involves acquiring a variety of images of one or more objects of interest via one or more mobile devices, selecting at least some of the acquired images to be a group that represents the objects of interest for additional processing, and optionally providing user feedback to a human user operator of the mobile device(s), including based on monitored image quality. The routine may be invoked in various manners in various embodiments and situations, including with respect to block 430 of FIG. 4. In the illustrated embodiment, a plurality of images are acquired in a session, and a subset of those images are selected to be the group representing one or more objects of interest, although in other embodiments all acquired images may be selected and used as such a group. In addition, in the illustrated embodiment, the image selection may be performed dynamically and concurrently with the image acquisition or may be performed after all of the images have been acquired, although in other embodiments only one of these two image selection alternatives may be used.

In the illustrated embodiment, the routine 500 begins at block 505, where an indication is received (e.g., from an operator of a mobile device) of a beginning of an image acquisition session, and other object-specific and/or client-specific information may further be obtained and associated with the acquired images in at least some embodiments. For example, in embodiments in which the MDIA System provides services to multiple clients, a current mobile device operator may verbally or otherwise indicate a client identifier or other indication of a current client with which the images are to be associated, although in other embodiments, the later transmission or other providing of the images to a remote server for further processing may instead include such client-related information (e.g., based on a mobile device performing the transmission). In a similar manner, the mobile device operator may include a tag or other information related to one or more objects of interest to be acquired in the images, such as to assist in later identifying those specific objects (e.g., if a variety of objects exists and will each be acquired in successive image acquisition sessions).

After block 505, the routine continues to block 510 to optionally obtain information about the environment of the object, such as light levels, location, elevation, a deviation from level (if any) of a base surface on which the object of interest rests, etc. While not illustrated here, in some embodiments, such information may further be used in various manners, including to automatically adjust parameters or settings to be used for the image acquisition by the mobile device, as part of later registering the images and a resulting model with respect to location, scale, and/or orientation, etc. The obtained information about the environment in block 510 may further in some embodiments include information about a scale of an object of interest, a distance from the operator to the object, etc., whether measured by one or more capabilities of the mobile device or other equipment at or near the operator, or instead by using artificially introduced objects or information to enable such information to later be determined (e.g., a marker or target or object of known length, height, degree of level, etc., such as a set of cones at specified distance from each other, ground control points, etc.).

After block 510, the routine continues to block 515 to determine whether to perform selection of the group of images for the object concurrently with their acquisition, or instead after all of the images have been acquired. If it is determined to perform the image selection concurrently during image acquisition, the routine continues to block 520, where one or more initial images are acquired for an object of interest, and one of the initial images is selected as a first image in the group, as well as a current first item in an image queue to be used to temporarily store images being acquired until selected images are determined. The operations in block 520 may further include monitoring quality or other aspects of the initial images in some embodiments and situations, such as to ensure that they satisfy one or more minimum thresholds or other minimum standards for the images to include in the group, as well as to optionally provide user feedback to the user if the initial images are not sufficient (to enable reacquisition of additional initial images until a satisfactory image is obtained). In some embodiments, the evaluation or the analysis of the initial images may include determining image aspects such as contrast, sharpness, lighting levels, etc., as well as to identify particular object features for use in later image selection.

After block 520, the routine continues to blocks 525-535 to repeatedly acquire additional images until one or more of those additional images are selected for the group, with other of those additional images being discarded from further use in at least some embodiments and situations. In particular, in block 525, the routine continues to acquire additional images until one or more queue acquisition criteria are reached (e.g., based on a quantity of images, amount of time, amount of distance traveled by the operator, amount of difference between two or more images in the queue, loop closing, etc.). After each of some or all of the additional images are acquired, a quality and/or other aspects of the image is monitored in this embodiment, such as to enable images that do not satisfy minimum thresholds or minimum satisfaction criteria to be discarded from the queue (or not placed in the queue) and/or to enable user feedback to be provided to the user regarding the problems with the images being acquired (e.g., to enable the user to improve the quality of future images that are acquired, whether at different locations or to reacquire one or more of the images that were not satisfactory).

After block 525, the images that are currently in the queue are evaluated, such as to enable one or more of the best images to be selected to be added to the group, based on one or more determined metrics used for the evaluation (e.g., contrast, relative motion between two or more images, lighting levels, coverage of some or all of the object, overlap with one or more prior selected images of the group, etc.). The selection of the best images and/or the determination of when the queue acquisition criteria are satisfied may be performed in various manners in various embodiments, as discussed in greater detail elsewhere herein, including based at least in part on tracking object features across multiple images (e.g., to determine when particular features are no longer present). After one or more such best images are selected, the selected best images are added to the group, and other item images in the queue before the most recent such best image are discarded in the illustrated embodiment, although in other embodiments such other images may be retained but not included in the group. After block 530, the routine continues to block 535 to determine whether there are more images to acquire in this session, such as until an entire exterior of one or more objects of interest has been captured, or otherwise until the image acquisition session is determined to be completed. If there are more images to acquire, the routine returns to block 525, and otherwise continues to block 580. Furthermore, after the image acquisition session is completed, various types of housekeeping operations may be performed, such as to delete the temporary queue, to remove some or all of the acquired images from the mobile device (e.g., after they are provided to a remote server in block 580), etc.

If it is instead determined in block 515 that the image selection will occur after all of the images have been acquired, the routine continues instead to block 550, where a plurality of images are acquired of an object of interest, and in block 555 are evaluated to select a subset of the best images to use as the group to represent the object. The selection of the best images may be performed in various manners in various embodiments, as discussed in greater detail elsewhere herein, including by generating graph information corresponding to overlapping images and doing a least-cost path traversal of the graph. In the illustrated embodiment, the non-selected images are discarded, although in other embodiments may be retained but not included in the selected group. As part of the acquisition in block 550, the routine may in some embodiments perform monitoring of image quality or other attributes, and/or provide corresponding user feedback, in a manner similar to that discussed with respect to blocks 520 and 525.

After block 555, the routine continues to block 580, where the selected group of images from the concurrent or non-concurrent image selection processes is provided as output of the routine for additional analysis in order to measure one or more attributes of the object, with such images optionally being stored for later use. As discussed in greater detail elsewhere, in some embodiments, some or all of the image acquisition activity discussed with respect to routine 500 may occur on one or more mobile devices that are used to acquire the images, such as under control of one or more components of the MDIA System (e.g., as part of a client-side application executing on the mobile devices), and if so, the providing operations performed in block 580 may include transmitting or otherwise providing the selected group of images to one or more remote server systems, although in other embodiments, all operations of the MDIA system may be performed by one or more configured devices (e.g., by the mobile device) without such transmittal to a remote server system.

After block 580, the routine continues to block 595 to determine whether to continue, such as until an explicit indication to terminate is received, or instead based on the completion of the routine after an invocation performed by another routine (e.g., such as in block 430 of FIG. 4). If it is determined to continue, the routine returns to block 505, and otherwise continues to block 599 and returns.

Figure 6:
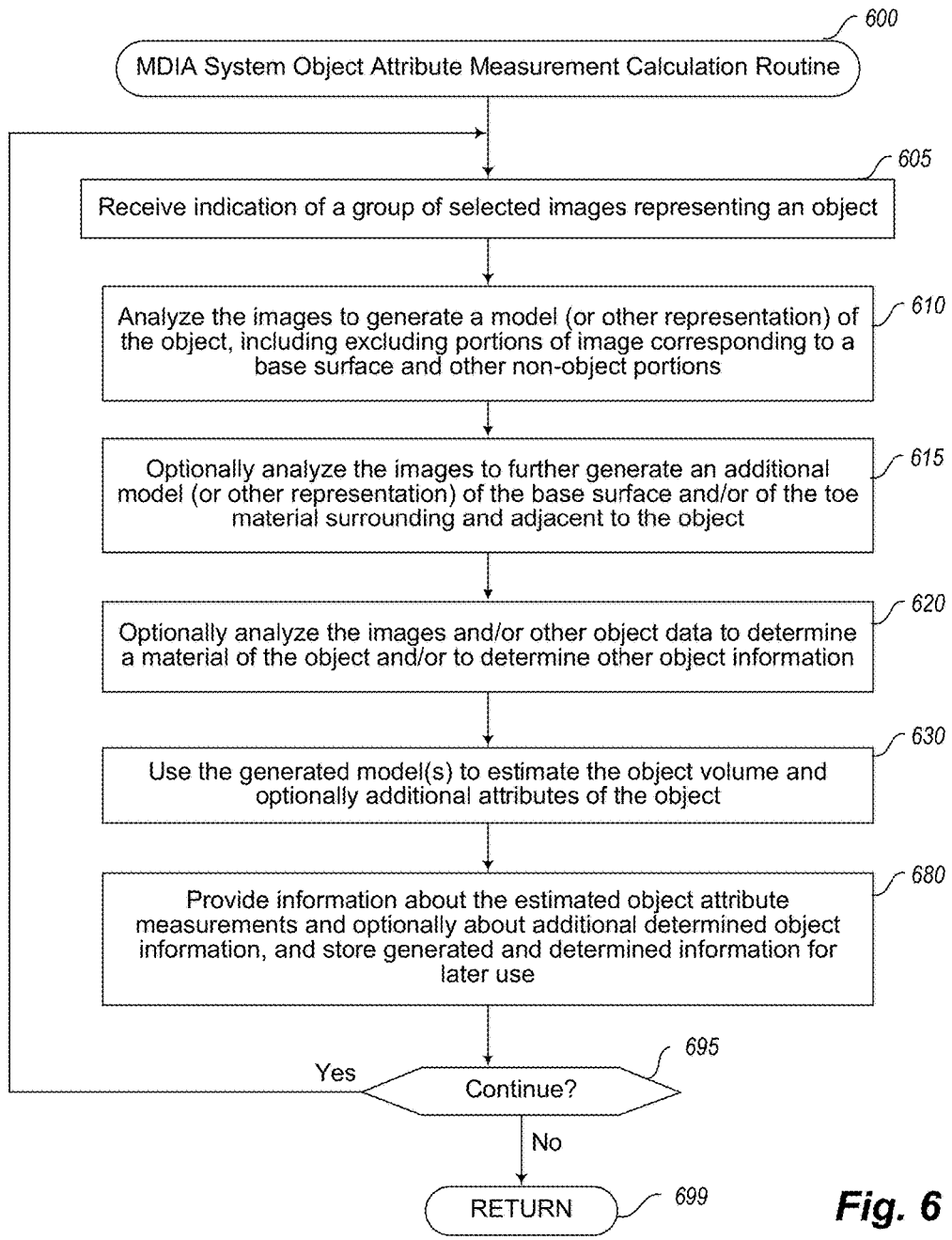
FIG. 6 is an example flow diagram of an illustrated embodiment of an MDIA System Object Attribute Measurement routine.

FIG. 6 is an example flow diagram of an illustrated embodiment of a MDIA System Object Attribute Measurement routine 600. The routine may be performed by, for example, execution of the MDIA System 160 of FIG. 1, the MDIA System Object Attribute Measurement components 342 of FIG. 3, and/or the MDIA System discussed with respect to FIGS. 2A-2H, such as to analyze a selected group of images that represents an object in order to determine one or more measurements for attributes of interest for the object, as well as to provide corresponding information to a client. The routine 600 may be invoked in various manners in various embodiments and situations, including with respect to block 450 of FIG. 4. In addition, while the illustrated embodiment of the routine 600 includes generating a model and using that model to measure attributes of interest, the attribute measurement activities may be performed in other manners in other embodiments.

The routine 600 begins at block 605, where an indication is received of a group of selected images that represent one or more objects of interest. The routine continues to block 610 to analyze the images to generate a model or other representation of the object, such as by generating a point cloud model in which portions of the images of the selected group that correspond to the object are separated from other portions of the images that are not part of the object (e.g., part of a base plane or other base service on which the object rests). Such a point cloud may include a mesh of numerous 3D data points representing the surface of the object that are extracted from data of the images, and additional interpolation or other fitting of the object surface between the 3D data points. The generating of the point cloud model may further be based in some embodiments at least in part on tracking particular object features through multiple of the selected images, and using such information from the multiple images to determine relative 3D location of each feature with respect to one or more other features. After block 610, the routine continues to block 615 to optionally further generate an additional model or other representation of some or all of the base surface on which the object is situated, such as to represent the 'toe' material of the base surface that is immediately outside and adjacent to the object's boundaries where it meets the underlying surface. The routine then continues to block 620 to further optionally analyze the images and/or other object data corresponding to the object or its environment to determine additional information about the object, such as to determine the material of the object. While blocks 610, 615 and 620 each refer to analyzing the images to determine different types of information, it will be appreciated that, in some embodiments, some or all analysis of the images will occur only once or simultaneously to obtain multiple types of information and/or to generate multiple models representing different types of information in the models.

In block 630, the routine then uses the generated model to estimate the object volume, and to optionally calculate or otherwise estimate measurement values for other attributes of the object, such as contour lines or other surface area information, weight, radioactivity, etc.—such attribute measurement estimation may in some situations involve information determined in block 620, such as to use a determined type of material and other information about a unit weight for the material by volume to determine the weight of the overall object based on its estimated volume and determined material type. In some embodiments, the operations performed with respect to one or more of blocks 610, 620, and 630 may further include further manipulating or modifying the generated model in various manners, such as to fit a bare earth model and/or a surface model to the point cloud model. In other embodiments, other types of models may be determined and used, non exclusive examples of which include occupancy graphs, an octree or volumetric representations based on voxels, etc.

As one specific example, the calculation of volume of an object may be performed based on measuring the amount of space between the surface of the pile and the ground it sits on, referred to generally in this specific example as the top and base surfaces, respectively. For example, even if the object is irregular and/or porous (e.g., a stockpile of construction aggregate materials) or the surfaces are otherwise approximate, the object may be modeled as having a fixed surface. Thus, the top and base surfaces may be treated as meeting along a boundary (e.g., to form a watertight solid that approximates the shape and volume of the pile), with this boundary referred to as the toe in this specific example. The solid may, for example, be represented with a boundary model formed of the two surfaces in polygonal or parametric form, or as a volumetric model such a 2½D height fields or a 3D voxel grid. The model may contain the pile itself, as well as optionally containing parts of the surrounding environment.

Using such a model, the volume computation may start with a step that segments the model into two components, with the first component containing the part of the model that represents the object, and the second component containing the remainder of the model. If the model is volumetric (such that the volume can be computed directly), then the object volume is obtained by computing the volume of the object component. Otherwise, the object component may be further segmented to isolate the top surface, base surface and toe components. In some embodiments, the model may be generated in the form of a 3D point cloud. The points of such a 3D point cloud model may be sampled from the top surface, the toe, and the surfaces of the surrounding environment, while the base surface is not sampled due to being a contact surface. The point cloud may, for example, be expressed in a Cartesian coordinate system, where the local vertical is aligned with the z up axis (i.e. pointing away from the center of the Earth, for an object resting on the ground). Given an object point cloud, the corresponding volume may be computed first by segmenting the points into top surface, toe and environment components. Then, z-aligned height fields may be fitted to the toe and surface components (e.g., in a smooth and statistically robust manner). Finally the object volume may be obtained by computing the integral of the difference between the top and toe fields. Alternatively, if a bare earth model of the environment (e.g., of the base surface on which the object sits) is available, then the volume may be obtained by computing the integral of the difference between the top field and a field derived from the bare earth model. If the object rests on complex terrain or man-made structures, then 3D models of these structures may be used to aid segmentation and field fitting. The models may be pre-existing or derived from the same point cloud. Finally, the point cloud may be pre-processed prior to segmentation. Pre-processing may include de-noising, removal of artifacts, simplification, scaling, leveling, geo-referencing, etc. Such artifacts may, for example, represent data that is added to one or more images but does not have a corresponding source in the object or environment, such as for artificially introduced data based on an imaging error or other problem, as described in greater detail elsewhere herein. The point cloud may also, in some embodiments and situations, contain reflectance and/or color information, and/or other meta-data that may be used volume computation. While the volume computation process may be fully automated in some embodiments and situations, in other embodiments and situations some human input may be provided as part of the process.

After block 630, the routine continues to block 680 to provide information about the estimated object attribute measurements as output of the routine, such as to another routine from which the routine 600 was invoked (e.g., routine 400). The routine optionally includes additional determined object information from block 620 as well in the provided information, and further stores the generated and determined information for later use.

After block 680, the routine continues to block 695 to determine whether to continue, such as until an explicit indication to terminate is received, or instead based on the completion of the routine after an invocation performed by another routine (e.g., such as in block 450 of FIG. 4). If it is determined to continue, the routine returns to block 605, and otherwise continues to block 699 and returns.

Figure 7:
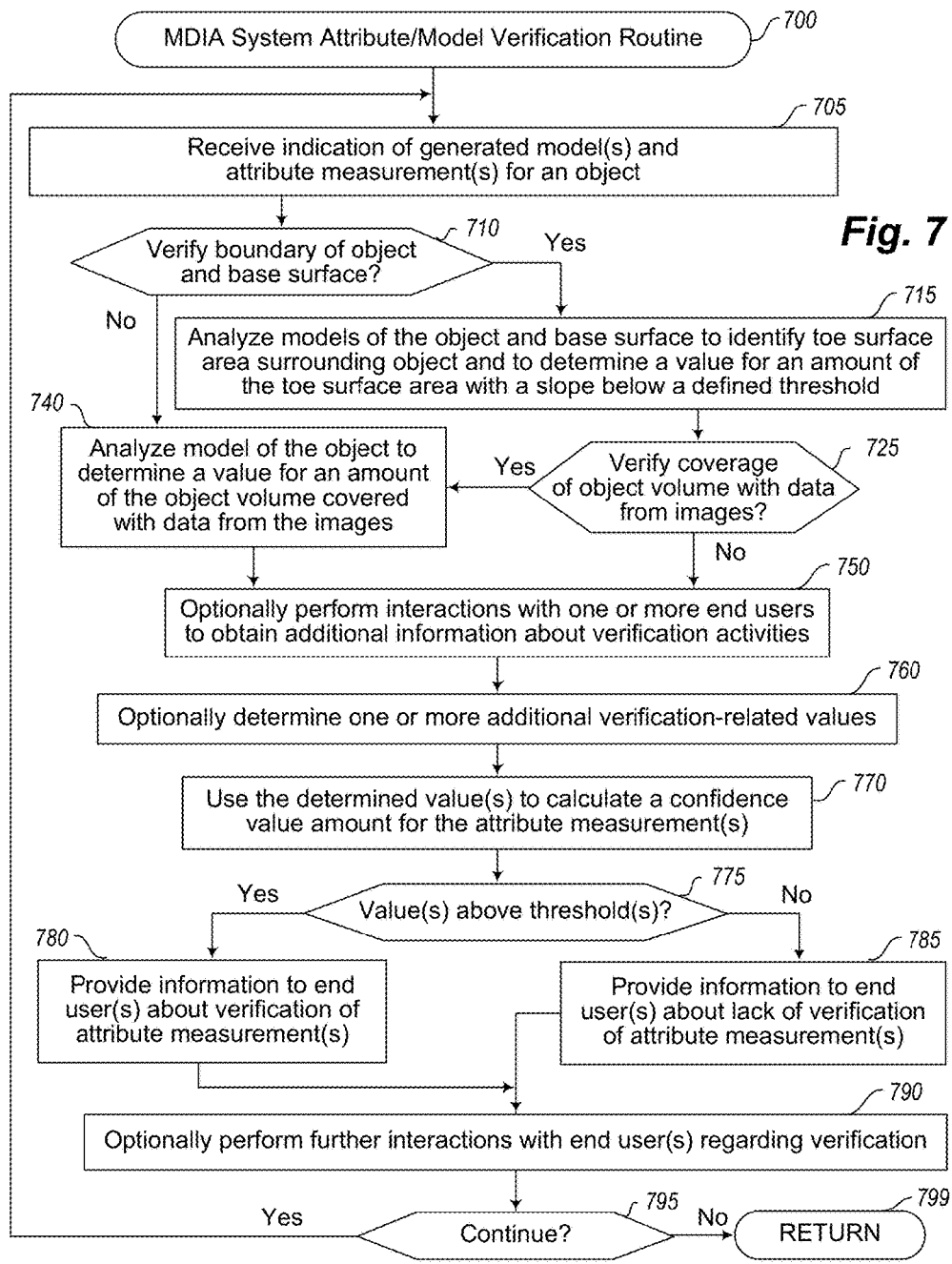
FIG. 7 is an example flow diagram of an illustrated embodiment of an MDIA System Measurement Verification routine.

FIG. 7 is an example flow diagram of an illustrated embodiment of an MDIA System Attribute/Model Verification routine 700. The routine may be performed by, for example, execution of the MDIA System 160 of FIG. 1, the MDIA System Object Attribute Verification components 342 of FIG. 3, and/or the MDIA System discussed with respect to FIGS. 2A-2J, such as to perform automated operations to verify object attribute measurements and/or corresponding generated computer model(s), as well as to provide corresponding information to a client. The routine 700 may be invoked in various manners in various embodiments and situations, including with respect to block 465 of FIG. 4. In addition, while the illustrated embodiment of the routine 700 includes performing attribute measurement verification in particular manners, the attribute measurement verification activities may be performed in other manners in other embodiments.

The routine 700 begins at block 705, where an indication is received of one or more generated computer model(s) and corresponding attribute measurements for which to perform automated verification activities. The routine continues to block 710 to determine whether to perform automated operations related to determining confidence in a boundary of a modeled object, and if so continues to block 715 to perform corresponding activities. In particular, the routine in block 715 performs an analysis of the computer models) of an object and underlying surface to identify toe surface area adjacent to the object boundary and to determine a percentage or other amount of the toe area that has a sufficiently low slope to indicate that the corresponding boundary is verified, with a verification (or lack thereof) of the overall object boundary being subsequently determined in block 770 based on the determined percentage or other amount. Additional details are included elsewhere herein related to determining confidence in a boundary of a modeled object.

After block 715, the routine continues to block 725 to determine whether to perform automated operations related to determining confidence in data coverage of a modeled object with respect to the object's volume and/or other indicated attribute measurements. If so, or if it is instead determined in block 710 not to perform automated operations related to determining confidence in a boundary of a modeled object, the routine continues to block 740. In block 740, the routine performs an analysis of the computer model(s) of an object to determine a percentage or other amount of the volume and/or surface of a modeled object that is sufficiently covered by image-acquired data, with a verification (or lack thereof) of the overall data coverage and optionally corresponding object attribute measurements being subsequently determined in block 770 based on the determined percentage or other amount. Additional details are included elsewhere herein related to determining confidence in data coverage of a modeled object.

After block 740, or if it is instead determined in block 725 not to perform automated operations related to determining confidence in data coverage of a modeled object, the routine continues to block 750 to optionally perform interactions with one or more end users to obtain additional information about the verification activities to be performed, as discussed in greater detail elsewhere herein. After block 750, the routine in block 760 optionally determines one or more additional verification-related values based on other types of verification-related activities (e.g., related to detecting and assessing vegetation obscuring the object, water adjacent to the object, one or more other overlapping or otherwise adjacent objects, etc.), optionally using information from block 750. In block 770, the routine then uses the determined values from blocks 715 and/or 740 and/or 760 to make an overall determination of a verification-related value with respect to one or more object attribute measurements, such as based on a weighted combination of multiple distinct verification-related values, although in other embodiments multiple distinct verification-related values may instead be used without such combination into an overall value. If the overall value (and/or individual value(s)) are determined in block 775 to exceed a corresponding threshold, the routine continues to block 780 to provide information to an end user or other recipient about the one or more object attribute measurements being verified, and otherwise continues to block 785 to provide information to the end user or other recipient about the one or more object attribute measurements not being verified (whether they affirmatively lack verification, or are not sufficiently certain to be automatically verified). After blocks 780 or 785, the routine continues to block 790 to optionally perform one or more further interactions with one or more end users related to the verification-related activities, such as to receive manual input to override or supplement the verification determination of blocks 770 and 775, to perform the verification-related activities of blocks 715 and/or 740 and/or 760, etc.

After block 790, the routine continues to block 795 to determine whether to continue, such as until an explicit indication to terminate is received, or instead based on the completion of the routine after an invocation performed by another routine (e.g., such as in block 465 of FIG. 4). If it is determined to continue, the routine returns to block 705, and otherwise continues to block 799 and returns.

Figure 8:
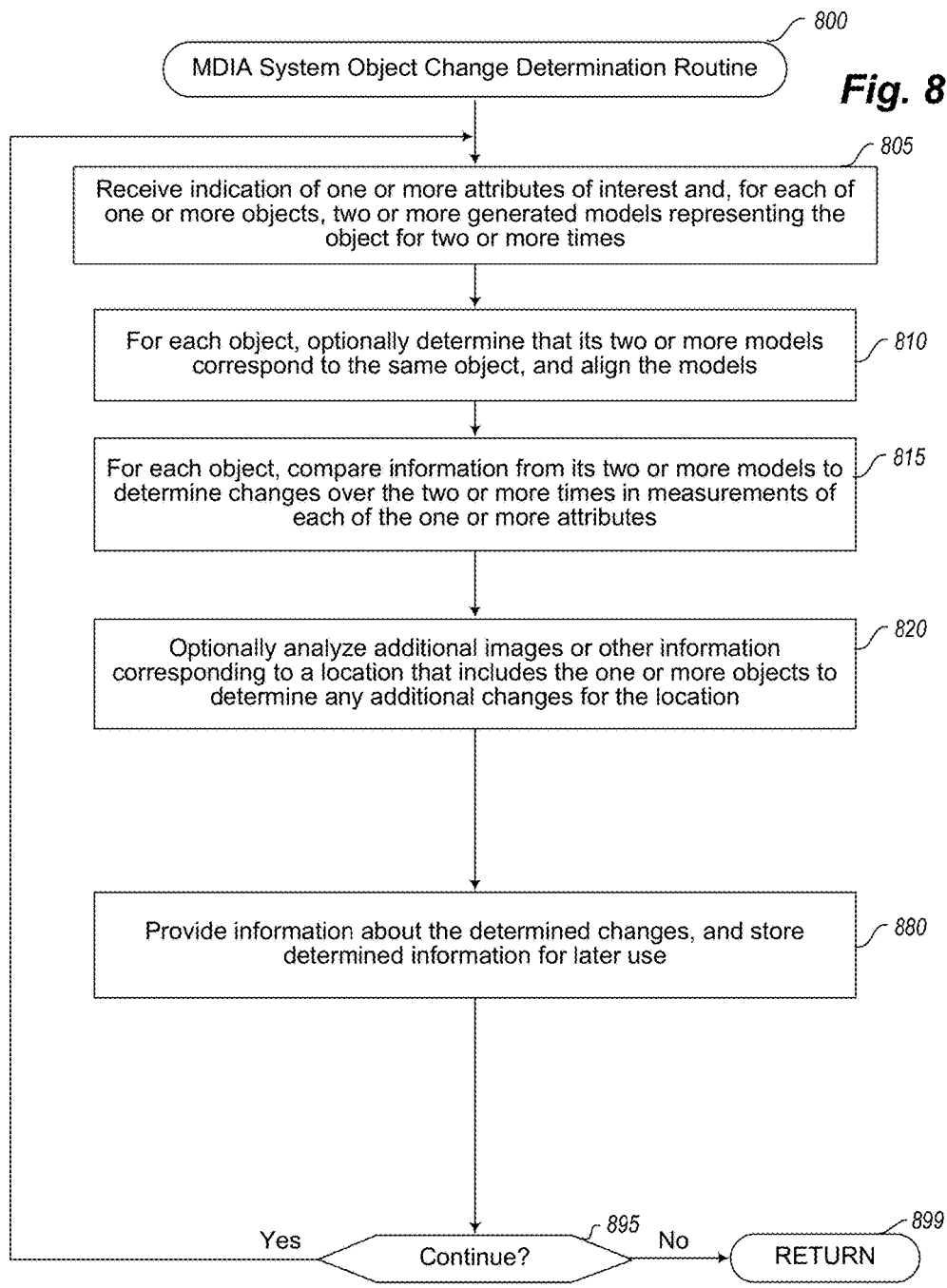
FIG. 8 is an example flow diagram of an illustrated embodiment of an MDIA System Measurement Change Determination routine.

FIG. 8 is an example flow diagram of an illustrated embodiment of a MDIA System Object Change Determination routine 800. The routine may be performed by, for example, execution of the MDIA System 160 of FIG. 1, the MDIA System Object Change Determination components 342 of FIG. 3, and/or the MDIA System discussed with respect to FIGS. 10A-10J, such as to analyze two or more generated models for two or more different times for each of one or more objects in order to determine changes over time, as well as to provide corresponding information to a client. The routine 800 may be invoked in various manners in various embodiments and situations, including with respect to block 475 of FIG. 4. In addition, while the illustrated embodiment of the routine 800 includes comparing generated models, the change determination activities may be performed in other manners in other embodiments.

The routine 800 begins at block 805, where an indication is received of one or more attributes of interest for which change information is to be determined for one or more objects, and of two or more generated models for each object that represent the object at different times. The routine continues to block 810 to, for each object, align its models if they are not already aligned (with each other or with respect to a common reference system), including to first optionally determine that the models correspond to the same single object if not previously performed. After block 810, the routine continues to block 815 to, for each object, compare information from its two or more models to determine changes over the two or more times for each of the attributes of interest. The routine then continues to block 820 to further optionally analyze additional images and/or other object data corresponding to the object or its environment to determine additional change information, such as to determine changes on a site-wide basis with multiple objects (e.g., new objects, objects that have been removed or merged, etc.).

After block 820, the routine continues to block 880 to provide information about the determined changes as output of the routine, such as to another routine from which the routine 800 was invoked (e.g., routine 400). The routine further stores the determined change information for later use. After block 880, the routine continues to block 895 to determine whether to continue, such as until an explicit indication to terminate is received, or instead based on the completion of the routine after an invocation performed by another routine (e.g., such as in block 475 of FIG. 4). If it is determined to continue, the routine returns to block 805, and otherwise continues to block 899 and returns.

Figure 9:
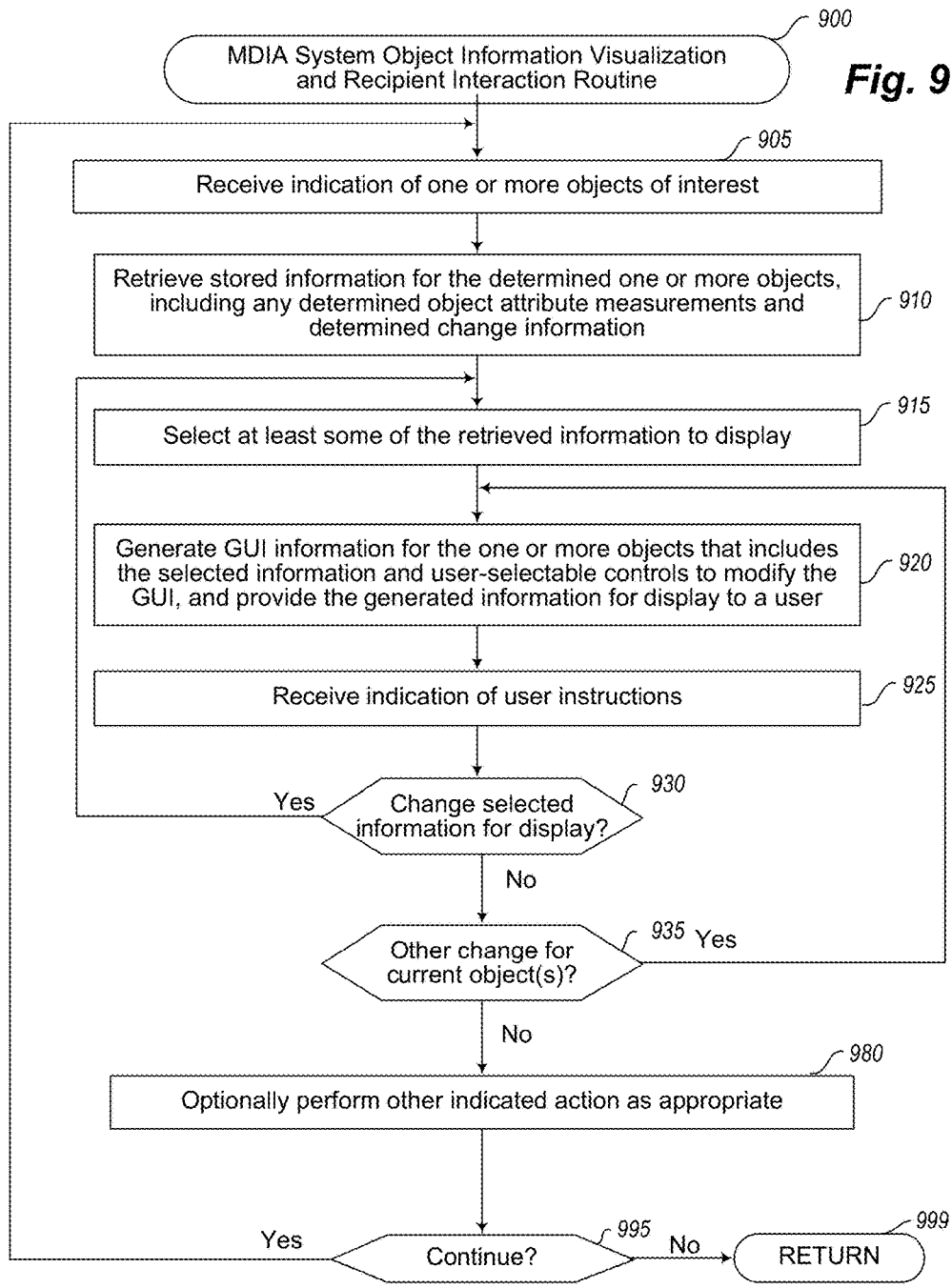
FIG. 9 is an example flow diagram of an illustrated embodiment of an MDIA System Measurement Information Visualization routine.

FIG. 9 is an example flow diagram of an illustrated embodiment of a MDIA System Object Information Visualization routine 900. The routine may be performed by, for example, execution of the MDIA System 160 of FIG. 1, the MDIA System Object Change Determination components 342 of FIG. 3, and/or the MDIA System discussed with respect to FIGS. 11A-11K, such as to present information of various types to one or more users via one or more GUI screens, such as determined change information and/or or determined information for one or more objects. The routine 900 may be invoked in various manners in various embodiments and situations, including with respect to block 485 of FIG. 4. In addition, while the illustrated embodiment of the routine 900 includes presenting particular types of information, the presentation activities may be performed in other manners in other embodiments, including for other types of information.

The routine 900 begins at block 905, where an indication is received of one or more objects of interest for which to present information, and optionally of one or more types of information of interest (e.g., particular attributes; particular times; particular types of information, such as change information; etc.). The routine continues to block 910 to retrieve stored information for the one or more objects, such as all determined information, or instead particular types of information as specified in block 905. After block 910, the routine continues to block 915 to select at least some of the retrieved information for display (e.g., using defaults, user preferences, instructions received in block 905, etc.), and then proceeds to block 920 to generate and provide one or more GUI screens for display to one or more users with the selected information and with additional user-selectable controls to allow the user to modify the display. It will be appreciated that such GUI information may, for example, be displayed on the computer system that performs the routine (e.g., a mobile device of a user), or instead may be performed by one or more server computer systems that are remote from one or more client devices of the user on which the information is displayed, with such generated information being transmitted over one or more computer networks from the server system(s) to the client device(s).

After block 920, the routine continues to block 925 to receive user instructions, and to optionally perform one or more loops with respect to blocks 915-935 to modify the information presented in the GUI in accordance with the user instructions and/or based on new data that becomes available while the GUI is displayed (e.g., new determined change information, new attribute measurements, etc.). After block 925, the routine continues to block 930 to determine whether the user instruction corresponds to changing some or all of the selected information for the current one or more objects of interest (e.g., to change one or more times for which change information is displayed, to change a type of information displayed, etc.), and if so returns to block 915 to select new corresponding information for display in an updated modified GUI. If it is instead determined in block 930 that the user instructions are not to change selected information for the current one or more objects of interest, the routine continues instead to block 935 to determine if the user instructions correspond to other changes or actions to perform for the current objects (e.g., to take an action that does not change the selected information or modify the GUI, to take an action that modifies the GUI without changing the selected types of information, etc.), and if so returns to block 920 to update the GUI display if appropriate, and otherwise to continue to block 925 to wait for an additional user instruction. If it is instead determined in block 935 that the user instructions are not to make changes other than for the current objects, the routine continues instead to block 980 to optionally perform one or other indicated operations (e.g., to update stored preference information for the user or other stored information for the user, etc.).

After block 980, the routine continues to block 995 to determine whether to continue, such as until an explicit indication to terminate is received, or instead based on the completion of the routine after an invocation performed by another routine (e.g., such as in block 485 of FIG. 4). If it is determined to continue, the routine returns to block 905, and otherwise continues to block 999 and returns.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
  acquiring, at a first time, and from one or more devices moving around an exterior of a pile of material on a site with multiple material piles, a plurality of images of the exterior using image acquisition capabilities of the one or more devices;
  generating, by one or more configured devices and based at least in part on analyzing at least some of the plurality of images, a first computer model to represent the exterior for the first time;
  determining, by the one or more configured devices, one or more changes in the pile of material from an earlier second time before the first time, including:
    selecting, by the one or more configured devices, a second computer model from multiple additional models for the multiple material piles at the earlier second time, wherein the selecting includes identifying the second computer model as representing an earlier exterior of the pile of material at the earlier second time based at least in part on determining a match between the first and second computer models using at least one of location, a type of material, an appearance feature between the first and second computer models, or a structural feature between the first and second computer models;
    aligning, by the one or more configured devices, the first and second computer models, including associating multiple corresponding portions of the first and second computer models together based at least in part on determining relationships between the multiple corresponding portions; and
    identifying, by the one or more configured devices, the determined one or more changes from differences between the aligned first and second computer models, including comparing the multiple corresponding portions of the first and second computer models; and
  providing, by the one or more configured devices and via one or more electronic communications sent over one or more computer networks, information identifying the determined one or more changes in the pile of material from the earlier second time.

2. The computer-implemented method of claim 1 wherein the providing of the information identifying the determined one or more changes in the pile of material from the earlier second time includes:
  initiating, by the one or more configured devices, display of a graphical user interface to a user on a client device of the user;
  receiving, by the one or more configured devices, and via selections by the user of one or more user-selectable controls included in the displayed graphical user interface, information indicating two or more times that includes the earlier second time and the first time;
  generating, by the one or more configured devices, a visual representation of the exterior of the pile of material from at least one of the first and second computer models, a visual representation of at least one structural change within the pile of material between the two or more times, and a visual representation of a change in volume for the pile of material between the two or more times; and
  causing, by the one or more configured devices, display of the generated visual representations to the user in the displayed graphical user interface.

3. The computer-implemented method of claim 2 wherein the one or more configured devices are separate from the one or more devices with the image acquisition capabilities and from the client device, and wherein the one or more devices with the image acquisition capabilities include at least one of an automated drone that flies around at least some of the pile of material, an airplane that flies in view of at least some of the pile of material, a satellite that travels above within view of the pile of material, a mobile device carried by a human, or an automated drone that drives around at least some of the pile of material.

4. A computer-implemented method comprising:
  acquiring, at a first time, a plurality of images of an object using image acquisition capabilities of one or more devices, wherein the object is one of a plurality of objects at a site;
  generating, by one or more configured computing devices, and using an additional plurality of images of the plurality of objects for a second time earlier than the first time, a plurality of computer models that represent the plurality of objects at the second time;
  generating, by the one or more configured computing devices and based at least in part on analyzing at least some of the plurality of images, a first computer model that represents the object for the first time and that is aligned with a second computer model from the plurality of computer models, wherein the second computer model represents the object for the second time, wherein alignment of the first and second computer models is based at least in part on relationships determined between corresponding portions of the first and second computer models, and wherein performing of the alignment includes identifying the second computer model as representing a same object as the first computer model based at least in part on analysis of at least some of the plurality of images and of the additional plurality of images;
  determining, by the one or more configured computing devices, one or more changes in the object from the second time to the first time, including identifying differences between the first and second computer models based at least in part on the alignment of the first and second computer models; and providing, by the one or more configured computing devices, information identifying the determined one or more changes in the object from the second time to the first time.

5. The computer-implemented method of claim 4 further comprising determining, by the one or more configured computing devices, a first volume of the object from the first computer model and a second volume of the object from the second computer model, wherein the determining of the one or more changes includes determining a change in volume between the first and second volumes, and wherein the providing of the information includes initiating, by the one or more configured computing devices, display of a graphical user interface to a user that visually illustrates the determined change in volume in response to selection by the user of one or more user-selectable controls in the displayed graphical user interface.

6. The computer-implemented method of claim 4 wherein the determining of the one or more changes includes determining a change in a structure of the object from the second time to the first time based on the differences between the first and second computer models, and wherein the providing of the information includes initiating, by the one or more configured computing devices, display of a graphical user interface to a user that visually illustrates the determined change in the structure in response to selection by the user of one or more user-selectable controls in the displayed graphical user interface.

7. The computer-implemented method of claim 4 wherein the determining of the one or more changes includes determining, based on the differences between the first and second computer models, a change for the object from the second time to the first time in at least one of location, temperature, moisture or type of material, and wherein the providing of the information includes initiating, by the one or more configured computing devices, display of a graphical user interface to a user that visually illustrates the determined change in the object.

8. The computer-implemented method of claim 4 wherein the performing of the alignment of the first and second computer models further includes determining multiple first three-dimensional locations of points for the object in the first computer model, determining multiple second three-dimensional locations of points for the object in the second computer model, and determining that corresponding first and second three-dimensional locations are within a defined threshold.

9. The computer-implemented method of claim 8 wherein the determining of the multiple first three-dimensional locations of points for the object in the first computer model includes at least one of analyzing location information associated with the at least some images, or retrieving location information associated with predefined additional ground points visible in the at least some images, or identifying a first region in the first computer model that is represented by two or more of the first three-dimensional locations of points and that corresponds to a second region in the second computer model that is represented by two or more of the second three-dimensional locations of points.

10. The computer-implemented method of claim 4 wherein the performing of the alignment of the first and second computer models further includes determining multiple first appearance features that are visible in the at least some images on a surface of the object, determining multiple second appearance features on the surface of the object that are visible in additional images acquired at the second time and used for generating the second computer model, and placing first and second appearance features that correspond with each other at same locations in one or more coordinate systems used for the first and second computer models.

11. The computer-implemented method of claim 4 wherein the performing of the alignment of the first and second computer models further includes determining multiple first features of an environment around the object that are visible in the at least some images, determining multiple second features of the environment around the object that are visible in additional images acquired at the second time and used for generating the second computer model, and placing first and second features that correspond with each other at same locations in one or more coordinate systems used for the first and second computer models, wherein the first and second features include planar ground areas in the environment of corresponding shapes.

12. The computer-implemented method of claim 4 wherein the performing of the alignment of the first and second computer models further includes using constraints identified for one of the first and second computer models during an initial alignment to modify at least one of a shape or location of the one of the first and second computer models to correspond to the other of the first and second computer models as a final alignment.

13. The computer-implemented method of claim 12 wherein the one of the first and second computer models is the first computer model, and wherein the method further comprises determining locations and orientations of the one or more devices for the at least some images, and altering, as part of modifying the first computer model, the determined locations and orientations to minimize reprojection errors of portions of the first computer model determined from the at least some images.

14. The computer-implemented method of claim 4 wherein the identifying of the second computer model as representing the same object as the first computer model is further based at least in part on using at least one of location of the object in the at least some images, material of the object in the at least some images, or shape of the object in the at least some images.

15. The computer-implemented method of claim 14 wherein the identifying of the second computer model as representing the same object as the first computer model is based at least in part on using the material of the object in the at least some images, and wherein the method further comprises determining the material of the object from the at least some images by using a classifier that analyzes at least one of color or texture of an exterior of the object in the at least some images.

16. The computer-implemented method of claim 4 further comprising:
  determining, by the one or more configured computing devices as part of the generating of the first computer model, and based at least in part on an analysis of the at least some images, a change in a structure of the object from the second time, wherein the determining of the change includes at least one of identifying that the object at the first time is a combination of at least two of the plurality of objects at the second time, or identifying that the object at the first time is one of multiple parts split from one of the plurality of objects at the second time.

17. The computer-implemented method of claim 4 further comprising:
  generating, by the one or more configured computing devices, a plurality of additional computer models for the first time for objects at the site from a further plurality of images for the first time, wherein the plurality of additional computer models includes a third computer model that represents a third object at the site for the first time, and includes a fourth computer model that represents a third object at the site for the first time;

determining, by the one or more configured computing devices, that the third object is a new object that was not present at the site at the second time;

determining, by the one or more configured computing devices, that the fourth object is one of the plurality of objects that has moved to a new location different from a prior location of the fourth object at the second time; and determining, by the one or more configured computing devices, and from an analysis of the further plurality of images, that another of the plurality of objects at the site at the second time is no longer present at the site at the first time.

18. The computer-implemented method of claim 4 wherein the object is a pile of material, and wherein the acquiring of the plurality of images is performed by the one or more devices being moved around an exterior of the pile of material and/or on top of a surface of the pile of material.

19. The computer-implemented method of claim 4 wherein the object is a hole below ground level, and wherein the acquiring of the plurality of images is performed by the one or more devices at multiple locations at ground level and/or within the hole.

20. The computer-implemented method of claim 4 wherein the object is an excavation produced from surface mining, and wherein the acquiring of the plurality of images is performed by the one or more devices at multiple locations surrounding the excavation and/or within the excavation.

21. The computer-implemented method of claim 4 wherein the object is a building or structure, and wherein the acquiring of the plurality of images is performed by the one or more devices being moved around an exterior of the building or structure and/or around an inside of the building or structure.

22. The computer-implemented method of claim 4 wherein the generating of the first computer model includes analyzing, by the one or more configured computing devices, the at least some images to determine a ground level from which the object ascends or descends and to determine a surface of the object above or below the ground level, and wherein the method further comprises:

storing, by the one or more configured computing devices, a representation of the first computer model on one or more storage devices; and analyzing, by the one or more configured computing devices, the first computer model to determine values of one or more attributes of the object at the first time, including measuring a difference in vertical height between the ground level and the surface of the object at multiple locations within the object, and wherein the determining of the one or more changes includes using the determined values of the one or more attributes of the object at the first time.

23. The computer-implemented method of claim 4 wherein the one or more devices include at least one of an automated drone that flies around at least some of the object, an airplane that flies in view of at least some of the object, a satellite that travels above within view of the object, a mobile device carried by a human, or an automated drone that drives around at least some of the object.

24. A system comprising:
one or more hardware processors of one or more computing devices; and
one or more memories with stored instructions that, when executed by at least one of the one or more hardware processors, cause the one or more computing devices to perform automated operations including at least:
generating, based at least in part on analyzing a plurality of images of a surface of an object acquired at a first time using image acquisition capabilities of one or more devices that move around at least some of the object, a first computer model to represent the object for the first time;
determining one or more changes in the object at the first time from a second time that is earlier than the first time, including:
identifying, from a plurality of computer models generated before the first time, a second computer model that represents the object for the second time and is generated from an additional plurality of images of the object for the second time, including automatically analyzing the plurality of images and the additional plurality of images to determine that the object visually represented in the plurality of images is a same object as the object visually represented in the additional plurality of images;
aligning the first and second computer models, including determining relationships between portions of the first and second computer models corresponding to common parts of the object; and
identifying the determined one or more changes from differences between the aligned first and second computer models; and
providing information identifying the determined one or more changes in the object from the second time.

25. The system of claim 24 wherein the object is one of a plurality of objects at a site that are each represented by a generated computer model for the first time and by one or more other generated computer models for one or more other earlier times that include the second time, and wherein the stored instructions are software instructions that cause performance of the providing of the information identifying the determined one or more changes by:
initiating display of a graphical user interface to a user;
receiving, via selections by the user of one or more user-selectable controls included in the displayed graphical user interface, information indicating the second time and the first time and indicating at least one type of change;
generating visual representations that include surfaces of the plurality of objects from generated computer models for at least one of the first time and the second time, that include at least one change within one or more objects of the plurality of objects between the second time and the first time, and that include an aggregate change in volume for the plurality of objects between the second time and the first time, wherein one or more of the generated visual representations correspond to the indicated at least one type of change; and
causing display of the generated visual representations to the user in the displayed graphical user interface.

26. A non-transitory computer-readable medium with stored contents that cause one or more computing devices to perform automated operations including at least:
obtaining, by the one or more computing devices, multiple computer models that represent an object, including a first computer model that is based on analysis of multiple images acquired of the object for a first time, and including a second computer model that is based on analysis of multiple additional images acquired of the object for a second time;

determining, by the one or more computing devices, one or more changes in the object between the first and second times based at least in part on comparing the first and second computer models; and presenting, via a displayed graphical user interface, information to a user about the determined one or more changes in the object, including a visual representation of the object generated from at least one of the first or second computer models, and a visual representation of the determined one or more changes in the object, wherein performance of the presenting of the information to the user includes:

initiating, by the one or more computing devices, display of the graphical user interface to the user;

receiving, by the one or more computing devices, and via selections by the user of one or more user-selectable controls included in the displayed graphical user interface, information indicating the first and second times and indicating at least one type of change;

generating, by the one or more computing devices and in response to the selections by the user, visual representations that include the visual representation of the object and the visual representation of the determined one or more changes in the object, wherein the determined one or more changes include a change in volume for the object between the first and second times and correspond at least in part to the indicated at least one type of change; and causing, by the one or more computing devices, display of the generated visual representations to the user in the displayed graphical user interface.

27. The non-transitory computer-readable medium of claim 26 wherein the object is one of a plurality of objects at a site that are each represented by a generated computer model for the first time and by one or more other generated computer models for one or more other times that include the second time, wherein the generating of the visual representations further includes generating visual representations of the plurality of objects from generated computer models for at least one of the first and second times, and includes generating at least one visual representation of at least one change within one or more objects of the plurality of objects between the first and second times, and includes generating one or more visual representations of an aggregate change in volume for the plurality of objects between the first and second times.

28. The non-transitory computer-readable medium of claim 27 wherein the one or more user-selectable controls include at least one slider control for the user to specify multiple times that include the first and second times and at least one control to initiate an animated display of changes over the multiple times, and wherein the presenting of the information to the user further includes presenting the animated display of changes over the multiple times.

\* \* \* \* \*

UNITED STATES PATENT AND TRADEMARK OFFICE
CERTIFICATE OF CORRECTION

PATENT NO. : 10,186,049 B1
APPLICATION NO. : 15/912406
DATED : January 22, 2019
INVENTOR(S) : David Boardman et al.

Page 1 of 1

It is certified that error appears in the above-identified patent and that said Letters Patent is hereby corrected as shown below:

In the Claims

Column 52, Line 63, Claim 17:
"17. The computer-implemented method of claim 4 further" should read --17. The computer-implemented method of claim 16 further--.

Signed and Sealed this
Twenty-sixth Day of February, 2019

Andrei Iancu
*Director of the United States Patent and Trademark Office*